(12) United States Patent
Heidel et al.

(10) Patent No.: US 11,613,707 B2
(45) Date of Patent: Mar. 28, 2023

(54) METHOD AND SYSTEM FOR SYNTHESIZING FUEL FROM DILUTE CARBON DIOXIDE SOURCE

(71) Applicant: CARBON ENGINEERING LTD., Squamish (CA)

(72) Inventors: Kenton Heidel, Squamish (CA); James Murphy, Squamish (CA); Adrian Corless, Squamish (CA); Geoff Holmes, Squamish (CA); Jenny McCahill, Squamish (CA); Anna Stukas, Squamish (CA); Jane Ritchie, Squamish (CA); Kevin Nold, Squamish (CA)

(73) Assignee: Carbon Engineering Ltd., Squamish (CA)

( * ) Notice: Subject to any disclaimer, the term of this patent is extended or adjusted under 35 U.S.C. 154(b) by 930 days.

(21) Appl. No.: 16/472,379

(22) PCT Filed: Dec. 21, 2017

(86) PCT No.: PCT/CA2017/051581
§ 371 (c)(1),
(2) Date: Jun. 21, 2019

(87) PCT Pub. No.: WO2018/112654
PCT Pub. Date: Jun. 28, 2018

(65) Prior Publication Data
US 2019/0359894 A1    Nov. 28, 2019

Related U.S. Application Data

(60) Provisional application No. 62/438,689, filed on Dec. 23, 2016.

(51) Int. Cl.
*C10G 2/00* (2006.01)
*B01J 6/00* (2006.01)
(Continued)

(52) U.S. Cl.
CPC ............. *C10G 2/50* (2013.01); *B01J 6/004* (2013.01); *B01J 19/0013* (2013.01);
(Continued)

(58) Field of Classification Search
CPC ............. C10G 2/50; C01B 2203/86; C01B 2203/1628; C01B 2203/0811; C01B 2203/062; C01B 2203/0233
See application file for complete search history.

(56) References Cited

U.S. PATENT DOCUMENTS 3,820,965 A    6/1974 New
4,140,602 A    2/1979 Lewis et al.
(Continued)

FOREIGN PATENT DOCUMENTS

CA    2396402 A1    1/2004
CA    2444313 A1    4/2005
(Continued)

OTHER PUBLICATIONS

Extended European Search Report in European Appln. No. 17883064.2, dated Jul. 2, 2020, 6 pages.
(Continued)

*Primary Examiner* — Jafar F Parsa
(74) *Attorney, Agent, or Firm* — Fish & Richardson P.C.

(57) ABSTRACT

A method for producing a synthetic fuel from hydrogen and carbon dioxide comprises extracting hydrogen molecules from hydrogen compounds in a hydrogen feedstock to produce a hydrogen-containing fluid stream; extracting carbon dioxide molecules from a dilute gaseous mixture in a carbon dioxide feedstock to produce a carbon dioxide containing fluid stream; and processing the hydrogen and carbon dioxide containing fluid streams to produce a synthetic fuel. At least some thermal energy and/or material used for at least one of the steps of extracting hydrogen molecules,
(Continued)

extracting carbon dioxide molecules, and processing the hydrogen and carbon dioxide containing fluid streams is obtained from thermal energy and/or material produced by another one of the steps of extracting hydrogen molecules, extracting carbon dioxide molecules, and processing the hydrogen and carbon dioxide containing fluid streams.

26 Claims, 30 Drawing Sheets

(51) Int. Cl.
  *B01J 19/00*     (2006.01)
  *B01J 19/24*     (2006.01)
  *C10L 3/08*     (2006.01)
  *C25B 1/04*     (2021.01)
  *C25B 9/00*     (2021.01)
  *C01B 3/38*     (2006.01)
  *C01B 3/06*     (2006.01)

(52) U.S. Cl.
  CPC ............... *B01J 19/245* (2013.01); *C01B 3/06* (2013.01); *C01B 3/382* (2013.01); *C10L 3/08* (2013.01); *C25B 1/04* (2013.01); *C25B 9/00* (2013.01); *B01J 2219/00117* (2013.01); *B01J 2219/00135* (2013.01); *C01B 2203/0233* (2013.01); *C01B 2203/062* (2013.01); *C01B 2203/0811* (2013.01); *C01B 2203/1628* (2013.01); *C01B 2203/86* (2013.01); *C10G 2300/1022* (2013.01); *C10G 2300/807* (2013.01); *C10L 2200/0492* (2013.01)

(56) References Cited

U.S. PATENT DOCUMENTS

| | | | |
|---|---|---|---|
| 5,128,003 | A | 7/1992 | Murdoch |
| 6,541,141 | B1 | 4/2003 | Frank et al. |
| 6,727,012 | B2 | 4/2004 | Chen et al. |
| 6,818,198 | B2 | 11/2004 | Singh et al. |
| 7,566,441 | B2 | 7/2009 | Daly et al. |
| 7,699,909 | B2 | 4/2010 | Lackner et al. |
| 7,833,328 | B2 | 11/2010 | Lackner et al. |
| 8,062,623 | B2 | 11/2011 | Daly et al. |
| 8,088,197 | B2 | 1/2012 | Wright et al. |
| 8,119,091 | B2 | 2/2012 | Keith et al. |
| 8,133,305 | B2 | 3/2012 | Lackner et al. |
| 8,262,774 | B2 | 9/2012 | Liu |
| 8,435,327 | B2 | 5/2013 | Lackner et al. |
| 8,491,705 | B2 | 7/2013 | Choi et al. |
| 8,696,801 | B2 | 4/2014 | Eisenberger |
| 8,702,847 | B2 | 4/2014 | Lackner et al. |
| 8,728,428 | B1 | 5/2014 | Heidel et al. |
| 8,871,008 | B2 | 10/2014 | Henderson et al. |
| 8,894,747 | B2 | 11/2014 | Eisenberger et al. |
| 8,999,279 | B2 | 4/2015 | Wright et al. |
| 9,034,208 | B1 | 5/2015 | Agee |
| 9,062,257 | B1 | 6/2015 | Agee et al. |
| 9,095,813 | B2 | 8/2015 | Keith et al. |
| 9,126,172 | B2 | 9/2015 | Singh et al. |
| 9,133,074 | B2 | 9/2015 | Jennings et al. |
| 9,180,436 | B1 | 11/2015 | Espinoza et al. |
| 9,205,372 | B2 | 12/2015 | Wright et al. |
| 9,227,153 | B2 | 1/2016 | Eisenberger |
| 9,266,051 | B2 | 2/2016 | Wright et al. |
| 9,266,052 | B2 | 2/2016 | Wright et al. |
| 9,283,510 | B2 | 3/2016 | Lackner |
| 9,321,641 | B1 | 4/2016 | Agee |
| 9,321,655 | B2 | 4/2016 | Singh et al. |
| 9,358,526 | B2 | 6/2016 | Espinoza et al. |
| 9,387,433 | B2 | 7/2016 | Lackner et al. |
| 9,637,393 | B2 | 5/2017 | Heidel et al. |
| 11,390,521 | B2 | 7/2022 | Lewis |
| 2005/0074657 | A1 | 4/2005 | Rusta-Sallehy et al. |
| 2005/0232833 | A1 | 10/2005 | Hardy et al. |
| 2006/0044819 | A1 | 3/2006 | Bul |
| 2007/0244208 | A1 | 10/2007 | Shulenberger et al. |
| 2008/0072496 | A1 | 3/2008 | Yogev et al. |
| 2008/0138265 | A1 | 6/2008 | Lackner et al. |
| 2010/0064890 | A1 | 3/2010 | Keith et al. |
| 2010/0137457 | A1 | 6/2010 | Kaplan |
| 2011/0039956 | A1* | 2/2011 | Raisz ................. C10J 3/02 518/712 |
| 2012/0076711 | A1 | 3/2012 | Gebald et al. |
| 2014/0134088 | A1 | 5/2014 | Gebald et al. |
| 2014/0158939 | A1 | 6/2014 | Rumkumar et al. |
| 2014/0316016 | A1 | 10/2014 | Jennings |
| 2014/0323600 | A1 | 10/2014 | Jennings |
| 2015/0064791 | A1 | 3/2015 | Kong et al. |
| 2015/0122128 | A1 | 5/2015 | Edlund |
| 2015/0140716 | A1 | 5/2015 | Astier et al. |
| 2015/0180752 | A1 | 6/2015 | Albert et al. |
| 2015/0240716 | A1 | 8/2015 | Dietrich |
| 2015/0273385 | A1 | 10/2015 | Eisenberger |
| 2015/0275097 | A1 | 10/2015 | Schuetzle et al. |
| 2015/0283501 | A1 | 10/2015 | Eisenberger |
| 2015/0291888 | A1 | 10/2015 | Schuerzle et al. |
| 2016/0074803 | A1 | 3/2016 | Gebald et al. |
| 2016/0083251 | A1 | 3/2016 | Edlund et al. |
| 2016/0214910 | A1 | 7/2016 | King |
| 2016/0222524 | A1 | 8/2016 | Joshi et al. |
| 2019/0359894 | A1 | 11/2019 | Heidel et al. |

FOREIGN PATENT DOCUMENTS

| | | |
|---|---|---|
| CA | 2853209 A1 | 5/2013 |
| CA | 2913061 A1 | 11/2013 |
| CA | 2936903 A1 | 1/2015 |
| CN | 101525118 | 9/2009 |
| CN | 102099445 A | 6/2011 |
| CN | 102770401 A | 11/2012 |
| CN | 103619790 A | 3/2014 |
| CN | 105163832 A | 12/2015 |
| CN | 105329855 A | 2/2016 |
| DE | 102007030440 A1 | 1/2009 |
| EP | 0487102 | 5/1992 |
| EP | 0864360 A1 | 9/1998 |
| EP | 2457635 | 5/2012 |
| EP | 2463023 A1 | 6/2012 |
| EP | 2491998 A1 | 8/2012 |
| EP | 2668992 A2 | 12/2013 |
| EP | 2682450 | 1/2014 |
| EP | 2782657 A2 | 10/2014 |
| EP | 2682450 T3 | 10/2018 |
| FR | 2912421 | 8/2008 |
| GB | 2459430 A | 10/2009 |
| GB | 2468483 A | 9/2010 |
| GB | 2477801 A | 8/2011 |
| JP | 5254278 A | 5/1977 |
| JP | 5618485 A | 2/1981 |
| JP | 2713684 | 2/1998 |
| JP | 3376380 B2 | 2/2003 |
| JP | 5254278 | 8/2013 |
| JP | 5618485 | 11/2014 |
| JP | 2713684 A | 1/2015 |
| NO | 960955 | 9/1996 |
| RU | 2533710 | 11/2014 |
| WO | WO2006036396 | 4/2006 |
| WO | WO2006044819 | 4/2006 |
| WO | WO2006099573 A1 | 9/2006 |
| WO | WO2006099575 A2 | 9/2006 |
| WO | WO2010112982 A1 | 10/2010 |
| WO | WO2015180752 | 12/2015 |
| WO | WO2015185434 | 12/2015 |
| WO | WO2016005226 | 1/2016 |
| WO | WO-2017072649 A1 * | 5/2017 |
| WO | WO2017214687 | 12/2017 |
| WO | WO2018112654 | 6/2018 |

(56) References Cited

OTHER PUBLICATIONS

Kaiser et al., "Production of Liquid Hydrocarbons with CO2 as Carbon Source based on Reverse Water-Gas Shift and Fischer-Tropsch Synthesis," Chemie Ingenieur Technik, 2013 85(4):489-499.
Office Action in Indian Appln. No. 201947029386, dated Jan. 28, 2021, 6 pages.
Office Action in Indian Appln. No. 201947029386, dated Jan. 3, 2022, 2 pages.
Office Action in Israeli Appln. No. 267507, dated Jan. 20, 2022, 4 pages.
Search Report from Brazilian Appln. No. 1120190130780, dated Feb. 15, 2022, 8 pages (with English Translation).
Written Opinion in Singapore Appln. No. 11201905583V, dated Aug. 10, 2020, 5 pages.
Written Opinion in Singapore Appln. No. 11201905583V, dated Mar. 6, 2020, 6 pages.
Pearce, International Search Report for PCT/CA2017/051581, dated Apr. 3, 2018, 5 pages.
Pearce, International Preliminary Report on Patentability for PCT/CA2017/051581, dated Jun. 25, 2019, 6 pages.
Office Action in Brazilian Application No. BR112019013078-0, dated Aug. 11, 2022, 10 pages (with English Translation).
Office Action in Chinese Application No. CN 201780087072, dated Jun. 30, 2022, 32 pages (with English Translation).
Office Action in Saudi Arabian Application No. SA 519402025, dated Jun. 28, 2022, 7 pages (English Translation only).
Office Action in Australian Application No. 2017383560, dated Oct. 21, 2022, 9 pages.

\* cited by examiner

1300

2300

2500

2600

2700

2900

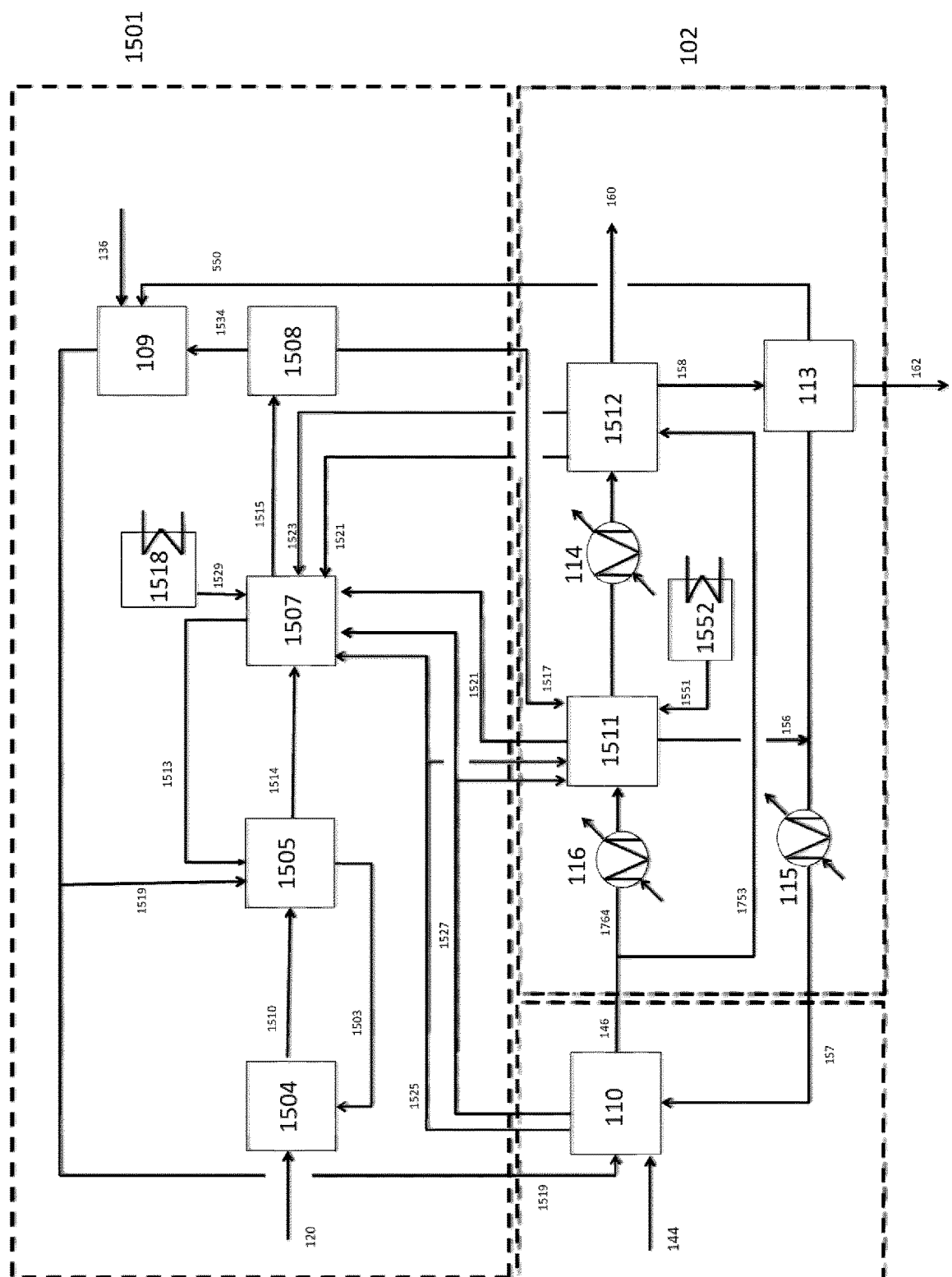

METHOD AND SYSTEM FOR SYNTHESIZING FUEL FROM DILUTE CARBON DIOXIDE SOURCE

FIELD

This disclosure relates generally to a method and a system for synthesizing a fuel from a dilute carbon dioxide ($CO_2$) source.

BACKGROUND

Global incentive for reducing $CO_2$ emissions is gaining momentum. However, emissions reductions in the transportation sector have been acknowledged as being particularly challenging and costly. The vast majority of vehicles, including automobiles, ships, aircraft, and trains, combust high energy density hydrocarbon fuels, and roughly $50 trillion of infrastructure exists globally to produce, distribute, and consume these fuels.

Direct synthesis of liquid hydrocarbon fuels presents a promising approach for reducing $CO_2$ emissions. Also known as "fuel synthesis", "synfuels", or "solar fuels", known fuel synthesis methods involve reacting a source of carbon (such as $CO_2$) with a source of hydrogen to form hydrocarbon molecules. It is an objective of this disclosure to provide a novel method and system for synthesizing fuel from a dilute $CO_2$ source.

SUMMARY

According to one aspect of the disclosure, there is provided a method for producing a synthetic fuel from hydrogen and carbon dioxide. The method comprises: extracting hydrogen molecules from hydrogen feedstock to produce a hydrogen containing feed stream; extracting carbon dioxide molecules from a dilute gaseous mixture in a carbon dioxide feedstock to produce a carbon dioxide containing feed stream;

and processing the hydrogen and carbon dioxide containing feed streams to produce a synthetic fuel. In some aspects, at least some material used in at least one of the foregoing steps is obtained from material produced in another one of the steps. Alternatively or additionally, at least some energy used for at least one of the steps can be obtained from energy produced by another one of the steps.

In the steps of extracting hydrogen molecules and extracting carbon dioxide, the hydrogen feedstock can be water and the dilute gaseous mixture can be air, respectively.

In another aspect of the disclosure, the produced material can include water produced during the step of extracting carbon dioxide molecules or the step of processing the hydrogen and carbon dioxide containing feed streams, and at least some of the water is used for at least some of the hydrogen feedstock. The produced water may be steam. In particular, the step of extracting carbon dioxide molecules can comprise: contacting the dilute gaseous mixture with a carbon dioxide capture solution; precipitating at least some of the captured carbon dioxide into $CaCO_3$ solids; calcining the $CaCO_3$ solids to produce a calciner product gas stream, and extracting water from the calciner product gas stream to produce at least some of the produced water. Further, the step of processing the hydrogen and carbon dioxide containing feed streams can comprise combining and heating the hydrogen and carbon dioxide containing feed streams, producing a syngas stream, and extracting water from the syngas stream to produce at least some of the produced water. The step of extracting carbon dioxide molecules can also comprise feeding at least a portion of the calciner product gas stream to a solid oxide electrolyzer cell used in the step of extracting hydrogen molecules.

The step of extracting carbon dioxide molecules can also comprise using a slaker, wherein the produced material can include water produced during the step of processing the hydrogen and carbon dioxide containing feed streams and at least some of the water produced is used by the slaker.

In another aspect of the disclosure, the produced material can include oxygen molecules produced during the step of extracting hydrogen molecules, and the method can further comprise combusting a fuel using at least a portion of the produced oxygen molecules during at least one of the steps of extracting carbon dioxide molecules and processing the hydrogen and carbon dioxide containing feed streams.

In a further aspect of the disclosure, the combustion of at least a portion of the produced oxygen molecules and the fuel can produce heat for producing a calciner product gas stream during the step of extracting carbon dioxide molecules. Alternatively or additionally, the heat can be used for producing a syngas stream during the step of processing the hydrogen and carbon dioxide containing feed streams.

In yet another aspect of the disclosure, the method can further comprise regenerating a carbon dioxide rich aqueous capture solution during the step of extracting carbon dioxide molecules using at least a portion of the produced oxygen molecules and a fuel. The fuel can be a produced fuel.

The produced material can include a fuel produced during the step of processing the hydrogen and carbon dioxide containing feed stream, and the method can further comprise combusting at least a portion of the produced fuel during at least one of the steps of extracting carbon dioxide molecules and processing the hydrogen and carbon dioxide containing feed streams.

In another aspect of the disclosure, at least some energy for performing the steps of extracting hydrogen molecules, extracting carbon dioxide molecules, and processing the hydrogen and carbon dioxide containing feed streams can be provided by an electricity source.

In a further aspect of the disclosure, the step of extracting carbon dioxide molecules can comprise operating a calciner to produce the carbon dioxide containing feed stream, and wherein the step of processing the hydrogen and carbon dioxide containing feed streams comprises operating a syngas generation reactor (SGR) unit at a pressure selected to enable the SGR unit to receive the carbon dioxide containing feed stream from the calciner without being substantially cooled and compressed between the calciner and the SGR unit. The SGR unit can be operated at a pressure of between 1 and 10 bar and the received carbon dioxide containing feed stream may have a temperature of between 850-900° C.

In yet another aspect of the disclosure, the method can further comprise feeding the carbon dioxide containing feed stream and one or more reactant feed streams into the SGR unit. The one or more reactant feed streams can comprise at least one of a hydrogen reactant feed stream, a $CH_4$ reactant feed stream, a water reactant feed stream, or a Fischer Tropsch light end hydrocarbon reactant feed stream.

The SGR unit can be operated to produce a syngas product stream by one or more of a reverse water gas shift (RWGS) reaction, a steam methane reforming (SMR) reaction, and a direct methane reforming (DMR) reaction.

In another aspect of the disclosure, the syngas product stream can be treated to produce one or more recycle streams that provide reactant to the SGR unit. At least one or more of the recycle streams and the reactant feed streams can be electrically heated.

In yet another aspect of the disclosure, the method can further comprise heating the SGR unit with thermal energy produced by electricity. Alternatively, the SGR unit can be heated with thermal energy produced by combusting an oxidant and a fuel comprising at least one of hydrogen from the hydrogen-containing feed stream, natural gas, or a Fisher Tropsch light end hydrocarbon.

The step of extracting carbon dioxide molecules can comprise heating the calciner with thermal energy produced by combusting an oxidant and a fuel comprising at least one of hydrogen from the hydrogen-containing stream, natural gas, or Fischer Tropsch light end hydrocarbons.

In another aspect of the disclosure, the step of extracting hydrogen molecules can further comprise producing an oxygen containing stream, at least some of which is used as the oxidant by one or both of the SGR unit and the calciner.

In yet another aspect of the disclosure, a $CaCO_3$ material stream can be heated and used in extracting carbon dioxide molecules with thermal energy from a syngas product stream from the SGR unit. The $CaCO_3$ material stream can be directly contacted with the syngas product stream and operating the SGR in a RWGS mode, with one or more of an SMR mode, a DMR mode or a combination thereof.

In another aspect of the disclosure, the method can further comprise heating the calciner with thermal energy produced by electricity.

The step of extracting carbon dioxide molecules can further comprise calcining $CaCO_3$ material in a fluidized bed reactor vessel of the calciner, and discharging a hot CaO solids stream from the calciner. The $CaCO_3$ material can be pre-heated prior to entry into the calciner with thermal energy from a calciner product gas stream. In another aspect of the disclosure, the method can comprise extracting water from the calciner product gas stream, boiling the extracted water to produce steam, then fluidizing the fluidized bed reactor vessel with the steam.

The step of processing the hydrogen and carbon dioxide containing feed streams can comprise operating an SGR unit, and the method can further comprise preheating one or more SGR reactant feed streams before feeding to the SGR unit, with thermal energy from a syngas product stream discharged from the SGR unit. The SGR reactant feed streams can comprise at least one of a carbon dioxide reactant feed stream, a hydrogen reactant feed stream, a $CH_4$ reactant feed stream, a water reactant feed stream, or a Fischer Tropsch light end hydrocarbon reactant feed stream, wherein the carbon dioxide reactant feed stream includes at least some of the carbon dioxide feed stream, and the hydrogen reactant feed stream comprises at least some of the hydrogen containing feed stream.

In a further aspect of the disclosure, the method can comprise combusting an oxidant and a fuel in an SGR burner of the SGR unit and producing a hot burner exhaust stream, then heating at least one of an oxidant feed stream of the SGR burner and a water reactant feed stream to the SGR unit, using thermal energy from the hot burner exhaust stream.

In another aspect of the disclosure, at least a portion of the energy used for extracting the hydrogen molecules, extracting the carbon dioxide molecules, and processing the hydrogen and carbon dioxide containing feed streams is electricity supplied by an external energy source.

In yet another aspect of the disclosure, at least some energy is thermal energy used in at least one of the steps of extracting hydrogen molecules, extracting carbon dioxide molecules, and processing the hydrogen and carbon dioxide containing feed streams.

At least some of the thermal energy used in processing the hydrogen and carbon dioxide containing feed streams can be produced during a calcination operation in extracting carbon dioxide molecules, and the produced thermal energy can be transferred by the carbon dioxide containing feed stream.

In a further aspect of the disclosure, oxygen molecules can be produced during the step of extracting hydrogen molecules, and the method can further comprise heating the oxygen molecules by the thermal energy produced during the step of extracting carbon dioxide molecules.

In the step of extracting carbon dioxide molecules, the heated oxygen molecules and a fuel can be combusted in a combustion operation. The combustion operation can provide heat to a calciner, and some thermal energy from calcium oxide material produced in the calciner can be used to heat the oxygen molecules.

In another aspect of the disclosure, the method further comprises distilling and refining the synthetic fuel, and at least some of the thermal energy produced during the step of extracting carbon dioxide molecules can be used during the distilling and refining of the synthetic fuel or used to generate power.

In yet another aspect of the disclosure, the hydrogen feedstock can comprise water, and the method can further comprise heating at least a portion of the water using at least a portion of the thermal energy produced during the step of extracting carbon dioxide molecules. At least some of the heated water can be produced during the step of extracting carbon dioxide molecules.

The method can further comprise heating a material stream produced during the step of extracting carbon dioxide molecules using at least some of the thermal energy produced during the step of processing the hydrogen and carbon dioxide containing feed streams.

In another aspect of the disclosure, the method can further comprise preheating a material stream flowing into an SGR unit during the step of processing the hydrogen and carbon dioxide containing feed streams, and using thermal energy produced by the SGR unit.

In another aspect of the disclosure, the method further comprises regenerating a sorbent used during the step of extracting carbon dioxide molecules using thermal energy produced during the step of processing the hydrogen and carbon dioxide containing feed streams.

According to an aspect of the disclosure, a system is provided for producing a synthetic fuel from hydrogen and carbon dioxide, comprising: a hydrogen production subsystem configured to extract hydrogen molecules from hydrogen compounds in a hydrogen feedstock to produce a hydrogen containing feed stream; a carbon dioxide capture subsystem configured to extract carbon dioxide molecules from a dilute gaseous mixture in a carbon dioxide feedstock to produce a carbon dioxide containing feed stream; and a synthetic fuel production subsystem configured to process the hydrogen and carbon dioxide containing feed streams to produce a synthetic fuel. In some aspects, at least one of the subsystems is physically coupled to at least another one of the subsystems by a material transfer coupling for transferring at least some material produced in one subsystem to at least another one of the subsystems for use therein.

Alternatively or additionally, at least one of the subsystems can be thermally coupled to at least another one of the subsystems, such that at least some of the thermal energy produced by one subsystem is transferrable to at least another one of the subsystems.

The hydrogen feedstock can be water, the hydrogen production subsystem can comprise an electrolyzer, and the material transfer coupling can comprise an oxidant conduit fluidly coupling the electrolyzer with the carbon dioxide capture subsystem or the synthetic fuel production subsystem, such that oxygen molecules produced by the electrolyzer is transferable via the oxidant conduit to the carbon dioxide capture subsystem or the synthetic fuel production subsystem for use in a combustion operation.

The carbon dioxide capture subsystem can comprise a calciner heater coupled to the oxidant conduit such that at least some of the oxygen molecules are used in a combustion operation in the calciner heater. The synthetic fuel production subsystem can comprise an SGR heater fluidly coupled to the oxidant conduit such that at least some of the oxygen molecules are used in a combustion operation in the SGR heater.

In another aspect of the disclosure, the material transfer coupling can comprise a first water conduit and the synthetic fuel production subsystem can comprise an SGR unit fluidly coupled to the hydrogen production subsystem via the first water conduit such that water produced by the SGR unit is transferable to the hydrogen production subsystem as hydrogen feedstock.

In a further aspect of the disclosure, the material transfer coupling can comprise a second water conduit, the carbon dioxide capture subsystem may comprise a slaker, and the synthetic fuel production subsystem may comprise an SGR unit. The SGR unit can be fluidly coupled to the slaker via the second water conduit such that water produced by the SGR unit is transferable to the slaker.

In yet another aspect of the disclosure, the material transfer coupling can comprise a third water conduit and the carbon dioxide capture subsystem comprises a slaker fluidly coupled to the hydrogen production subsystem by the third water conduit such that water output by the slaker is transferable to the hydrogen production subsystem as hydrogen feedstock.

In another aspect of the disclosure, the material transfer coupling can comprise a fourth water conduit, the calciner can be fluidly coupled to a high temperature solids removal unit by a calciner product conduit, and the high temperature solids removal unit can be fluidly coupled to the hydrogen production subsystem by the fourth water conduit, such that water produced by the calciner is transferable to the hydrogen production subsystem.

In a further aspect of the disclosure, the material transfer coupling can comprise a first fuel conduit, and the carbon dioxide capture subsystem can comprise a calciner fluidly coupled to the synthetic fuel production subsystem by the first fuel conduit such that at least some of the synthetic fuel produced by the synthetic fuel production subsystem is transferable to the calciner for a combustion operation.

The high temperature solids removal unit can comprise a water removal membrane in fluid communication with the calciner product conduit and the fourth water conduit, such that water is extracted from a calciner product stream contacting the water removal membrane, the extracted water is directed into the fourth water conduit, and at least some carbon dioxide in the remaining calciner product stream is directed to a syngas generation reactor of the synthetic fuel production subsystem.

In yet another aspect of the disclosure, the material transfer coupling can comprise a product conduit, the calciner can be coupled to a high temperature solids removal unit by a calciner product conduit, and the high temperature solids removal unit can be coupled to the hydrogen production subsystem by the product conduit, such that product gases produced by the calciner are transferable to the hydrogen production subsystem.

In another aspect of the disclosure, the carbon dioxide capture subsystem can comprise an air contactor and a solution processing unit in fluid communication with the air contactor by a $CO_2$ aqueous capture solution. The $CO_2$ aqueous capture solution can be thermally coupled to the synthetic fuel production subsystem such that heat is transferable from the synthetic fuel production subsystem into the $CO_2$ aqueous capture solution. The carbon dioxide capture system can further comprise a regeneration unit for regenerating a sorbent, and the material transfer conduit can comprise a second fuel conduit that fluidly couples the regeneration unit to a fuel output of the synthetic fuel production subsystem such that at least a portion of the fuel produced by the synthetic fuel production subsystem is transferable to the regeneration unit for a combustion operation. The material transfer conduit can comprise an oxidant conduit that fluidly couples the hydrogen generation subsystem to the regeneration unit such that at least a portion of oxygen molecules produced by the hydrogen generation subsystem is transferable to the regeneration unit for a combustion operation. The synthetic fuel production subsystem can comprise at least one of an SGR unit or a Fischer Tropsch unit fluidly coupled to the regeneration unit such that water produced by at least one of the SGR unit or the Fischer Tropsch unit is transferable to the regeneration unit.

According to another aspect of the disclosure, the hydrogen production subsystem can comprise an electrolyzer, the synthetic fuel production subsystem can comprise an SGR unit, and the carbon dioxide capture subsystem can comprise a calciner, and wherein at least one of the electrolyzer, SGR unit, or calciner are electrically driven or heated. The SGR unit can have an operating pressure selected to enable the SGR unit to receive the carbon dioxide containing feed stream without being substantially cooled and compressed between the calciner and the SGR unit. The SGR unit can have an operating pressure of between 1 and 10 bar and the received carbon dioxide containing feed stream can have a temperature of between 850-900° C. The SGR unit can comprise one or more reactant inlets fluidly coupled to one or more reactant feed streams comprising at least one of a carbon dioxide reactant feed stream, a hydrogen reactant feed stream, a $CH_4$ reactant feed stream, a water reactant feed stream, or a Fischer Tropsch light end hydrocarbon reactant feed stream.

The carbon dioxide reactant feed stream can comprise at least some of the produced carbon dioxide containing feed stream.

In another aspect of the disclosure, the synthetic fuel production subsystem can further comprise a syngas treatment unit that receives a syngas product stream from the SGR unit and outputs one or more recycle streams, wherein the recycle streams comprise at least one of water, hydrogen, or carbon dioxide for use by the SGR unit. The system can further comprise at least one electric heater thermally coupled to one or more of the recycle streams and the reactant feed streams. The electric heater can comprise of at least one of an inline electric heater, electrical heating tape, resistance heating wire, coils or elements.

According to another aspect of the disclosure, the SGR unit can be thermally coupled to an electrical heat source comprising an electrical heater. Alternatively, the SGR unit can comprise an SGR burner and an SGR vessel thermally coupled to the SGR burner, wherein the SGR burner comprises a fuel inlet coupled to the hydrogen containing feed stream to receive hydrogen as fuel for combustion. The SGR burner can produce a hot burner exhaust stream that is thermally coupled to at least one of a heat exchanger for heating an oxidant feed stream of the SGR burner and a boiler for heating a water feed stream to the SGR vessel.

In another aspect of the disclosure, the calciner can comprise a calciner burner and a calciner reactor vessel thermally coupled to the calciner burner, wherein the calciner burner comprises a fuel inlet coupled to the hydrogen containing feed stream to receive hydrogen as fuel for combustion.

In a further aspect of the disclosure, one or both of the fuel inlets of the SGR burner and the calciner burner can be fluidly coupled to one or more of a natural gas stream and a Fischer Tropsch light end hydrocarbon stream. In yet another aspect of the disclosure, the hydrogen production subsystem can comprise an electrolyzer which produces the hydrogen containing feed stream and an oxygen containing stream from the hydrogen feedstock, and wherein the oxygen containing stream can be fluidly coupled to one or both of the SGR burner and the calciner burner to provide at least some of the oxidant for the combustion.

In a further aspect of the disclosure, the carbon dioxide capture subsystem can comprise a calciner, wherein the calciner comprises a fluidized bed reactor vessel. The calciner can comprise a kiln reactor vessel and an electric heating element or a burner thermally coupled to the kiln reactor vessel.

In yet another aspect of the disclosure, the synthetic fuel production subsystem can comprise an SGR unit and a heat exchanger thermally coupled to a syngas product stream from the SGR unit and to a $CaCO_3$ material stream from the carbon dioxide capture subsystem, such that thermal energy is transferrable from the syngas product stream to the $CaCO_3$ material stream. The heat exchanger can comprise at least one of a bubbling fluidized bed (BFB) heat exchanger or a cyclone heat exchanger. The BFB or cyclone heat exchanger can comprise a refractory or ceramic lined vessel inside which the $CaCO_3$ material stream and syngas product stream are in direct contact. The SGR unit can be configured to operate in a RWGS mode, with one or more of an SMR mode, a DMR mode or a combination thereof.

In another aspect of the disclosure, the carbon dioxide capture subsystem can comprise a calciner, and the calciner can be thermally coupled to an electric heat source. The calciner can comprise a fluidized bed reactor vessel with a solids feed inlet for receiving $CaCO_3$ material, a fluidizing stream inlet for receiving a calciner fluidizing fluid comprising steam, a product gas stream outlet for discharging a calciner product gas stream, and a solids product outlet for discharging a produced CaO solids stream. The calciner can further comprise an electric heating element thermally coupled to the reactor vessel for heating the fluidizing stream and $CaCO_3$ material therein. The electric heating element can be encased in a metal sheath extending into a bubbling bed zone of the reactor vessel, or can be thermally coupled to a refractory lined wall of the reactor vessel.

In another aspect of the disclosure, the system can further comprise: a water knockout and solids removal unit; a compressor; and a boiler unit. The water knockout and solids removal unit can have an inlet fluidly coupled to the calciner product gas stream, a water outlet for discharging water removed from the product gas stream, a dust outlet for discharging dust removed from the product gas stream, and a $CO_2$ outlet for discharging a $CO_2$ product stream. The compressor can have an inlet for receiving the $CO_2$ product stream and compressing same. The boiler unit can have an inlet for receiving the discharged water, and an outlet for discharging steam for the calciner fluidizing fluid.

In yet another aspect of the disclosure, the synthetic fuel production subsystem can comprise an SGR unit and a ceramic heat exchanger thermally coupled to a syngas product stream discharged from the SGR unit and to one or more SGR reactant feed streams fed to the SGR unit, such that the one or more SGR reactant feed streams are preheated by thermal energy from the syngas product stream before being fed to the SGR unit. The SGR reactant feed streams can comprise at least one of a carbon dioxide reactant feed stream, a hydrogen reactant feed stream, a $CH_4$ reactant feed stream, a water reactant feed stream, or a Fischer Tropsch light end hydrocarbon reactant feed stream.

In a further aspect of the disclosure, the carbon dioxide capture subsystem can comprise a calciner, the carbon dioxide reactant feed stream can comprise the carbon dioxide containing feed stream produced by the calciner, and the hydrogen reactant feed stream can comprise the hydrogen containing feed stream produced by the hydrogen production subsystem.

In another aspect of the disclosure, the synthetic fuel production subsystem can further comprise a Fischer Tropsch unit having an inlet coupled to the syngas product stream cooled and discharged from the ceramic heat exchanger and at least one outlet for discharging the Fischer Tropsch light end hydrocarbon feed stream and a water stream.

In a further aspect of the disclosure, the carbon dioxide capture subsystem can comprise a calciner having a calciner burner, and the hydrogen production subsystem can comprise an electrolyzer which produces the hydrogen containing feed stream and an oxygen containing stream from the hydrogen feedstock, and wherein the oxygen containing stream is fluidly coupled to at least one of the SGR burner or the calciner burner to provide the oxidant.

The carbon dioxide capture subsystem can comprise a calciner thermally coupled to the synthetic fuel production subsystem such that thermal energy output by the calciner is transferrable to the synthetic fuel production subsystem. The synthetic fuel production subsystem can comprise an SGR unit thermally and fluidly coupled to the calciner, such that heat energy and carbon dioxide output from the calciner is transferrable to the SGR unit. At least one of the calciner and the SGR unit can be fluidly coupled to an oxygen output of the hydrogen production subsystem such that at least some oxygen produced by the hydrogen production subsystem is usable in a combustion operation to heat the at least one of the calciner and the SGR unit. Alternatively, at least one of the calciner and the SGR unit can be fluidly coupled to a hydrogen fuel source such that hydrogen from the hydrogen fuel source is usable in a combustion operation to heat at least one of the calciner and the SGR unit.

In a further aspect of the disclosure, the system can comprise at least one of a distillation and refining unit or a power generation unit fluidly coupled to the system for producing a synthetic fuel from hydrogen and carbon dioxide, wherein the carbon dioxide capture subsystem comprises one or both of a calciner and a slaker, and at least one of the calciner and the slaker is thermally coupled to at least one of the distillation and refining unit or the power generation unit such that thermal energy output by at least one of the calciner and the slaker is transferable to at least one of the distillation and refining unit or the power generation unit.

In another aspect of the disclosure, a material stream from the calciner is thermally coupled to an oxygen stream flowing from the hydrogen production subsystem to the calciner, such that thermal energy output by the calciner is transferable to the oxygen stream.

In yet another aspect of the disclosure, the carbon dioxide capture subsystem can comprise a calciner thermally and fluidly coupled to the hydrogen production subsystem such that thermal energy and a product fluid output by the calciner are transferrable to the hydrogen production subsystem. In another aspect of the disclosure, the calciner can be thermally coupled to a water source which is fluidly coupled to the hydrogen production subsystem, such that thermal energy output by the calciner is usable to generate steam.

In a further aspect of the disclosure, the carbon dioxide capture subsystem can comprise a slaker with a water output that is fluidly and thermally coupled to the hydrogen production subsystem such that water and thermal energy output by the slaker is transferable to the hydrogen production subsystem.

In another aspect of the disclosure, the carbon dioxide capture subsystem may comprise a calciner fluidly coupled to a fuel output of the synthetic fuel production subsystem, such that at least some of the synthetic fuel produced by the synthetic fuel production subsystem is combustible by the calciner to generate thermal energy.

In a further embodiment of the disclosure, the carbon dioxide capture subsystem can comprise a $CaCO_3$ material stream, and the synthetic fuel production subsystem comprises an SGR unit producing a syngas stream and a heat exchanger thermally coupled to the syngas stream and to the material stream, wherein thermal energy generated by the SGR unit and carried by the syngas stream is transferable to the $CaCO_3$ material stream by the heat exchanger.

In another aspect of the disclosure, a product gas output from the calciner is fluidly and thermally coupled to the hydrogen production subsystem, such that product gases and thermal energy produced by the calciner are transferable to the hydrogen production subsystem.

In yet another aspect of the disclosure, a product stream of the calciner is fluidly and thermally coupled to a high temperature solids removal unit, and the high temperature solids removal unit is fluidly and thermally coupled to the hydrogen production subsystem, such that water and thermal energy produced by the calciner is transferable to the hydrogen production subsystem.

The carbon dioxide output of the calciner can be fluidly and thermally coupled to the SGR unit, such that carbon dioxide and heat energy is transferable to the SGR unit.

In another aspect of the disclosure, the synthetic fuel production subsystem can comprise a first heat exchanger and a first SGR unit, wherein the first heat exchanger is fluidly coupled to an SGR feed stream comprising a hydrogen feed stream flowing from the hydrogen production subsystem to the first SGR unit, and thermally coupled to a product stream output of the first SGR unit, such that thermal energy produced by the first SGR unit and carried by a product stream from the first SGR unit is transferable by the first heat exchanger to preheat the feed stream.

In a further aspect of the disclosure, the carbon dioxide capture subsystem can comprise a slaker and the product stream can be fluidly coupled to the slaker such that at least a portion of the water in the product stream is removed in the slaker.

The synthetic fuel production subsystem can further comprise a second heat exchanger fluidly coupled to the product stream, and a second SGR unit fluidly coupled to the product stream and thermally coupled to the heat exchanger such that at least a portion of the thermal energy produced by the second SGR unit is transferable by the second heat exchanger to preheat the product stream upstream of the second SGR unit.

In a further aspect of the disclosure, the carbon dioxide capture subsystem can comprise a calciner and the synthetic fuel production subsystem can comprise a multiple-stage SGR assembly having an inlet in fluid communication with a product outlet of the hydrogen production subsystem and comprising at least two SGR units and high-temperature hydrogen unit stages in a sequential fluid coupling, wherein each high-temperature hydrogen unit removes at least a portion of water from a product stream output by each SGR unit.

In another aspect of the disclosure, the carbon dioxide capture subsystem can comprise an air contactor and a solution processing unit in fluid communication with the air contactor by a $CO_2$ aqueous capture solution, wherein the $CO_2$ aqueous capture solution is thermally coupled to the synthetic fuel production subsystem such that thermal energy is transferable from the synthetic fuel production subsystem into the $CO_2$ aqueous capture solution.

The carbon dioxide capture subsystem can further comprise a regeneration unit comprising a sorbent and is fluidly coupled to the solution processing unit by a rich $CO_2$ aqueous capture solution, and is thermally coupled to the synthetic fuel production subsystem such that thermal energy from the synthetic fuel production subsystem is transferable to the regeneration unit to regenerate the sorbent. The regeneration unit can be fluidly coupled to a fuel output of the synthetic fuel production subsystem such that at least a portion of fuel produced by the synthetic fuel production subsystem is combustible by the regeneration unit. The regeneration unit can also be thermally coupled to the hydrogen production subsystem such that thermal energy produced by the hydrogen production subsystem is transferable to the regeneration unit to regenerate the sorbent.

In a further aspect of the disclosure, at least one of the SGR unit and regeneration unit is thermally coupled to an electrical heat source comprising an electrical heater.

BRIEF DESCRIPTION OF DRAWINGS

FIG. 30 is a schematic block diagram of a system for producing a synthetic fuel from hydrogen and carbon dioxide, according to a twenty-ninth implementation, including another $CO_2$ capture subsystem, and where at least a portion of the energy required in the synthetic fuel production subsystem and the $CO_2$ capture subsystem is derived from electric sources.

DETAILED DESCRIPTION

Overview

Figure 1:
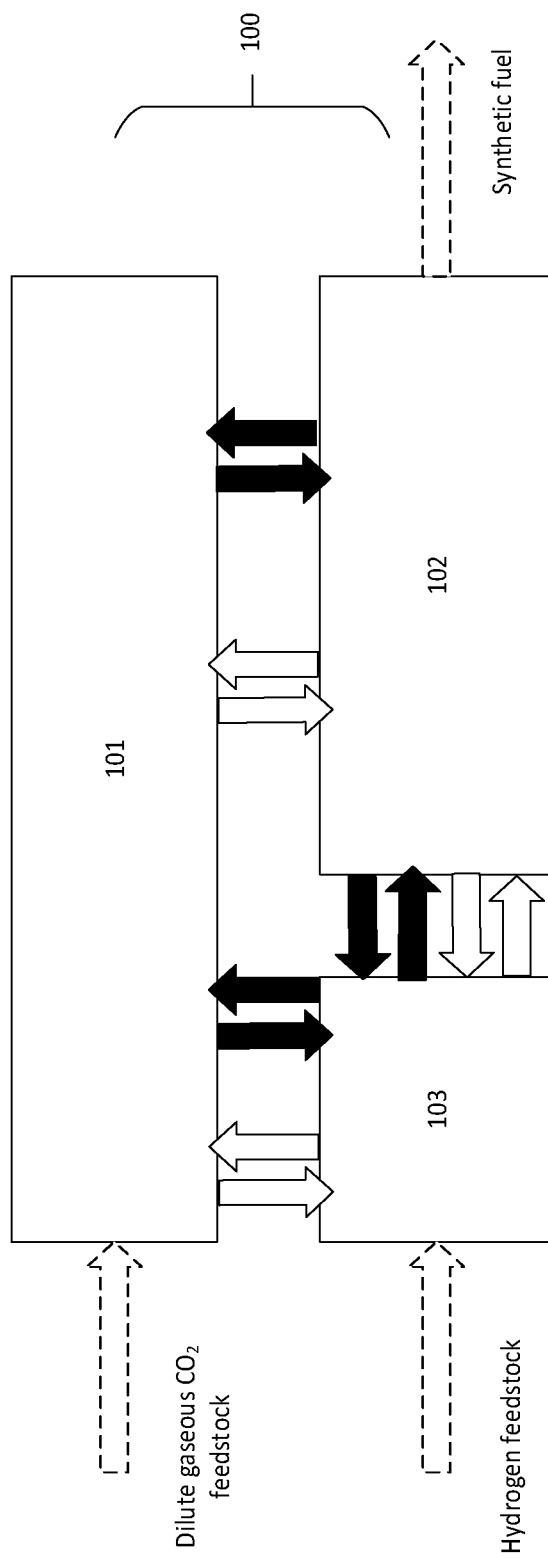
FIG. 1 is a schematic block diagram of a system for producing a synthetic fuel from hydrogen and carbon dioxide including a $CO_2$ capture subsystem, a hydrogen production sub-system, and a synthetic fuel production subsystem, according to some implementations of the invention.

Referring to FIG. 1, implementations of the invention described herein relates to a method and a system for synthesizing a fuel ("synfuel") from a dilute $CO_2$ source, such as from atmospheric air or another gaseous mixture such as gases with less than about 1 vol % $CO_2$ content, and the like. The system 100 includes three subsystems, namely, a $CO_2$ capture subsystem 101 for extracting $CO_2$ molecules from a $CO_2$ feedstock, a hydrogen production subsystem 103 for extracting hydrogen molecules from a hydrogen feedstock, and a synthetic fuel production subsystem 102 for producing the synfuel using the hydrogen molecules produced by the hydrogen production subsystem 103 and the $CO_2$ molecules produced by the $CO_2$ capture subsystem 101. Furthermore, at least some of the energy (shown as black arrows in FIG. 1) and/or at least some of the fluids (shown as white arrows in FIG. 1) used by one subsystem can be obtained from another subsystem. In some implementations, water produced by the $CO_2$ capture subsystem 101 and/or by the synthetic fuel production subsystem 102 is used as the hydrogen feedstock by the hydrogen production subsystem 103. In some other implementations, heat energy produced by the $CO_2$ capture subsystem 101 is used in a process in the synthetic fuel production subsystem 102 or in the hydrogen production subsystem 103. In some other implementations, heat energy produced by the synthetic fuel production subsystem 102 is used to preheat a material stream flowing through the $CO_2$ capture subsystem 101. In yet some other implementations, reactions occurring within the $CO_2$ capture subsystem 101 are used to remove water from a material stream in the synthetic fuel production subsystem 102. In yet some other implementations, heat and oxygen produced by the hydrogen production subsystem 103 are used in a combustion process within the synthetic fuel production subsystem 102 and/or $CO_2$ capture subsystem 101.

In each of these implementations, it is expected that one or more of the cost effectiveness, operational efficiency, and operational flexibility of the overall system can be improved by having one subsystem use energy and/or fluids produced by another subsystem, rather than obtaining the energy and/or fluids from an external source. Also advantageously, the system can be used in applications where it may be challenging to provide an external source of such energy and/or fluids, such as a location where water is scarce. Furthermore, the system can potentially reduce the carbon intensity of the produced synfuel as compared to conventional fossil fuels.

When combined with hydrogen made from renewable electricity, $CO_2$ capture from atmospheric air, also known as Direct Air Capture (DAC), enables the production of carbon neutral synfuels like gasoline, diesel, and Jet-A that are completely compatible with today's fuel and transportation infrastructure. These synfuels may also overcome some of the current limitations of fats and biomass based biofuels including for example security of feedstocks, scale limitations, fuel blending constraints, land use, and food crop displacement. Furthermore, synfuels produced through the methods described herein can compare favorably to other renewable diesel options in that they can, for example, have one or more of higher energy content, higher cetane values, lower $NO_x$ emissions, and no sulphur content. The higher cetane synthetic diesel produced through the methods described herein can allow for blending with lower quality fossil stocks.

The carbon intensity of the synfuel can be especially reduced when the system uses atmospheric air as the $CO_2$ feedstock and uses a renewable, zero and/or low carbon power source to operate the system. Using such a low carbon intensity synfuel can be particularly advantageous in those transportation applications where electrical power, biofuel or other low carbon options are not practical, such as powering long-haul vehicles including trucks, aircraft, ships, and trains. Furthermore, the low carbon intensity synfuels produced through the methods described herein will likely qualify for numerous government policy revenues and/or credit schemes, including those from LCFS (California), RIN (D3, US) and RED (EU) programs.

The impact of renewable electricity and fuel, used for example in oxy-fired equipment, on the carbon intensity of the synthetic fuel produced has been demonstrated through an example as shown in Table 1. For simplicity, it's been assumed that the fuel and electricity demand of the synthetic fuel production system are the primary contributors to direct and indirect emissions of the system. Emissions resulting from combustion of fuel used in oxy-fired equipment in the system account for direct emissions, while emissions associated with production, recovery or transportation/distribution of fuel/electricity account for indirect emissions. It's been assumed that for each Mega Joule (MJ) of synthetic fuel produced, the oxy-combustion process(es) in the synthetic fuel production system utilize 0.4 MJ of energy, and 0.6 KWh electricity is used for other operations in the system.

In the case where $H_2$ is used as a fuel for the burners (case 3), the $H_2$ is produced onsite using a $H_2$ production unit (such as an electrolyzer) which utilizes electricity for operation. So, the emissions associated with the production of $H_2$ have been accounted for in the electricity section of the Table 1.

As seen in cases 1 and 2 in Table 1, about 3 g $CO_2$e are released for producing 1 MJ of synthetic fuel during the recovery (production) and transportation of natural gas, even though the $CO_2$ emissions released during combustion of natural gas in the SGR and calciner burners are captured and sent to the SGR reactor along with the $CO_2$ captured from air to produce synthetic fuel.

In the cases where the calciner and SGR use hydrogen for oxy-combustion (Case 3), or are electric ("all electric" case 4 and/or 5), there are no $CO_2$ emissions from the burners to be captured and this allows for more $CO_2$ to be captured from air and used to produce the synthetic fuel products.

The values in Table 1 clearly indicate that while electricity generation in coal-fired plants is carbon intensive and significantly increases the carbon intensity of the synthetic fuel, using renewables, such as hydroelectricity, solar and wind can significantly reduce the carbon intensity of the fuel, in some cases to below 10 g $CO_2$e/MJ fuel.

TABLE 1

A case study to show the impact of burner fuel type and source of electricity on the carbon intensity of the synthetic fuel

| GHG emissions (g $CO_2$e/MJ synthetic fuel) | Source of fuel for oxy-combustion + Source of electricity | | | | |
|---|---|---|---|---|---|
| | 1: NG + Coal | 2: NG + hydro | 3: $H_2$ + hydro | 4: All electric (hydro) | 5: All electric (solar) |
| Production and transportation of burner fuel | 3 | 3 | 0 | 0 | 0 |
| Generation and distribution of electricity | 490 | 6 | 8.5 | 8 | 4 |
| Total emissions | 493 | 9 | 8.5 | 8 | 4 |

$CO_2$e: $CO_2$ equivalent -a term for describing different greenhouse gases in a common unit
NG: Natural gas;
hydro: hydroelectricity As indicated in some implementations described herein, the synthetic fuel production subsystem may utilize a modified GTL platform that can convert $CO_2$ and Hydrogen into syngas through a process known as Reverse Water Gas Shift (RWGS) before sending the syngas to a Fischer Tropsch (FT) reactor to produce synthetic hydrocarbons. This technology pathway allows the integration of a novel DAC technology with industrial FT precedent that already exists in the energy sector, and to scale up the resulting Air-to-Fuel (A2F) process/platform in the transportation sectors that have fewest options to reduce $CO_2$ emissions (and thus where the value of emissions reductions is the highest).

The carbon intensities of alternative biodiesels are in the range of 30-70 g $CO_2$e/MJ biodiesel, and as high as 90-100 g $CO_2$e/MJ for conventional gasoline and diesel. Synthetic fuels produced as described herein can have a carbon intensity that is less than half that of typical biofuels, meaning that these synthetic fuels get high revenues from market-based emissions programs.

When incorporated with renewable energy sources and optimized heat integration, these synthetic fuels can have low or zero carbon intensity.

As these synthetic fuels are built from clean feedstock ingredients such as atmospheric $CO_2$ and Hydrogen, they produce cleaner burning fuel products than fossil fuels, for example they have low to zero sulphur content.

Synthetic fuels, for example the diesel and gasoline products, are drop-in compatible with current infrastructure and engines, and can have up to about 30 times higher energy density than batteries, as well as up to about 100 times lower land/water use impact than biofuels.

Because of the selection of commercially available equipment for most if not all units described within the synthetic fuel system, these systems can be highly scalable, and thus applicable to a range of markets, including the transportation fuel market.

$CO_2$ capture, $H_2$ Production and Synfuel Production Subsystems

The $CO_2$ capture subsystem 101 is a machine that extracts $CO_2$ from dilute sources, such as atmospheric air, and may include equipment such as air contactors such as those described in U.S. Pat. No. 9,095,813 (incorporated by reference herein), or air contactors in the form of gas scrubbers, spray towers, or any other design wherein gas is contacted with the capture solution or a sorbent. As used herein "sorbent" refers to the material that undergoes sorption of a target species. As used herein, "sorption" refers to a process, physical, chemical or a combination of both, by which one substance becomes attached to another for some period of time. Examples of specific categories of sorption may include adsorption (physical adherence or bonding of ions and/or molecules onto the surface of another material), absorption (the incorporation of a substance in one state—gas, liquid, solid—into another substance of a different state) and ion exchange (exchange of ions between electrolytes or between an electrolyte solution and a complex).

The $CO_2$ capture subsystem 101 may function by contacting atmospheric air with an aqueous alkaline solution, an aqueous amine solution, an aqueous carbonate and/or bicarbonate solution, with or without containing catalysts such as carbonic anhydrase, a solid material porous sorbent material including but not limited to non-carbonaceous origin (zeolites, silica, metal-organic frameworks and porous polymers, alkali metal, and metal oxide carbonates) and carbonaceous origin (activated carbons and/or carbon fibers, graphene, ordered porous carbons, fibers), a solid structure with chemical sorbent materials including functional amine-based materials with or without cellulose, a solid polymer based material including polyethyleneimine silica, an aqueous solution combined with an anionic exchange resin, or combinations of any of the above. The $CO_2$ capture subsystem 101 can be based on known $CO_2$ capture machines which include, but are not limited to, those described in U.S. Pat. Nos. 9,095,813, 8,119,091, 8,728,428, U.S. Patent application 2014/14281430, U.S. Pat. Nos. 8,871,008, 9,283,510, 8,702,847, 9,387,433, 9,266,051, 8,435,327, 8,999,279, 8,088,197, 8,133,305, 9,266,052, European Patent 2,668, 992, U.S. Pat. Nos. 7,833,328, 8,262,774, 8,133,305, 9,227, 153, 8,894,747, 8,696,801, 7,699,909, U.S. Patent Application 2015/0283,501, U.S. Patent Application 2015/0273, 385, U.S. Pat. No. 8,491,705, International Application number 2015/061807, International Application number 2015/064791, European Patent 2,782,657, U.S. Patent Application 2016/074803, U.S. Application 2014/134088, U.S. Patent Application 2012/076711, and U.S. Pat. No. 9,205,372, the disclosures of which are herein incorporated by references in their entirety.

Figure 15:
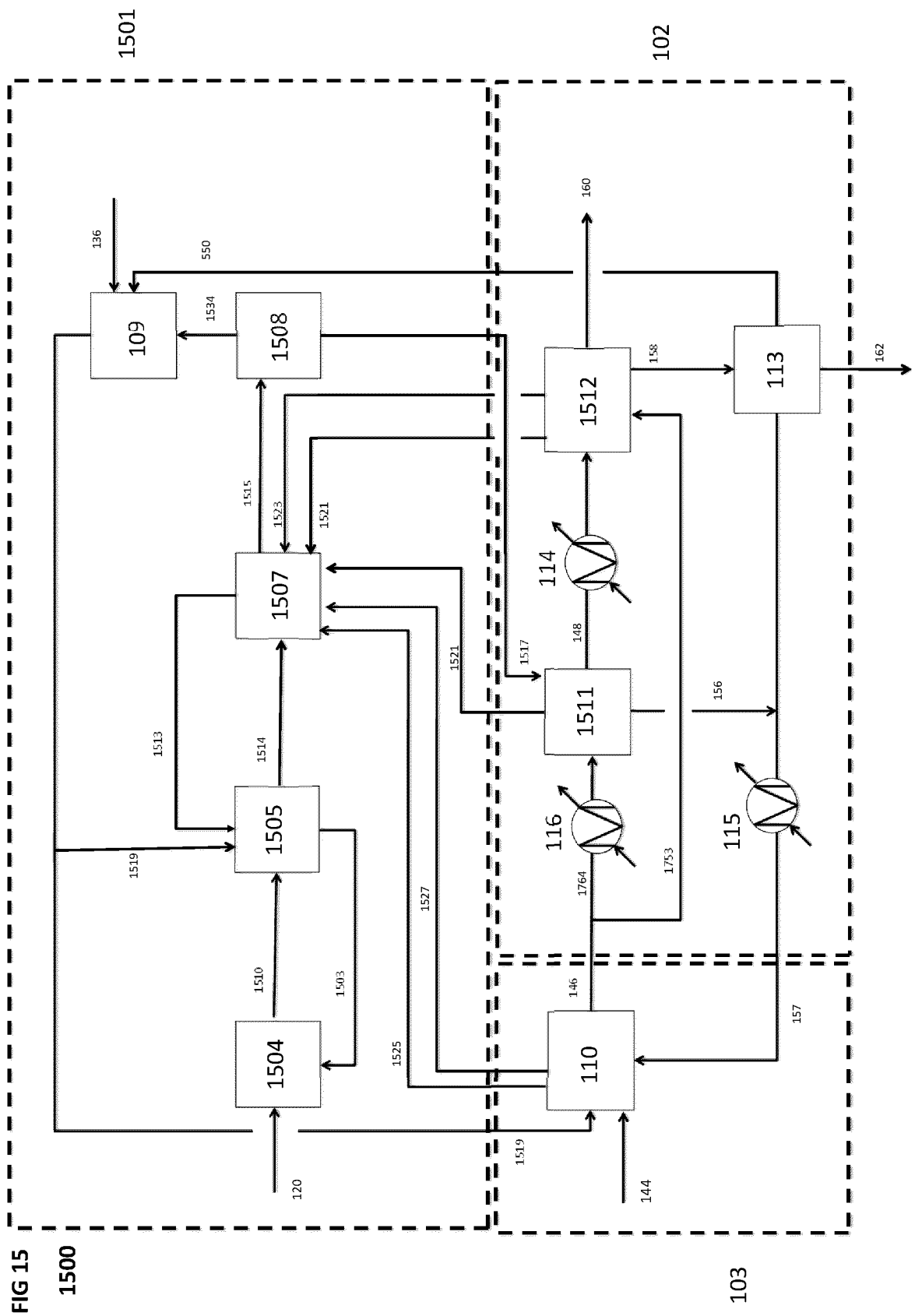
FIG. 15 is a schematic block diagram of a system for producing a synthetic fuel from hydrogen and carbon dioxide, according to a fourteenth implementation, including a $CO_2$ capture subsystem that is different than the $CO_2$ capture subsystem shown in FIGS. 2 to 14.
Figure 16:
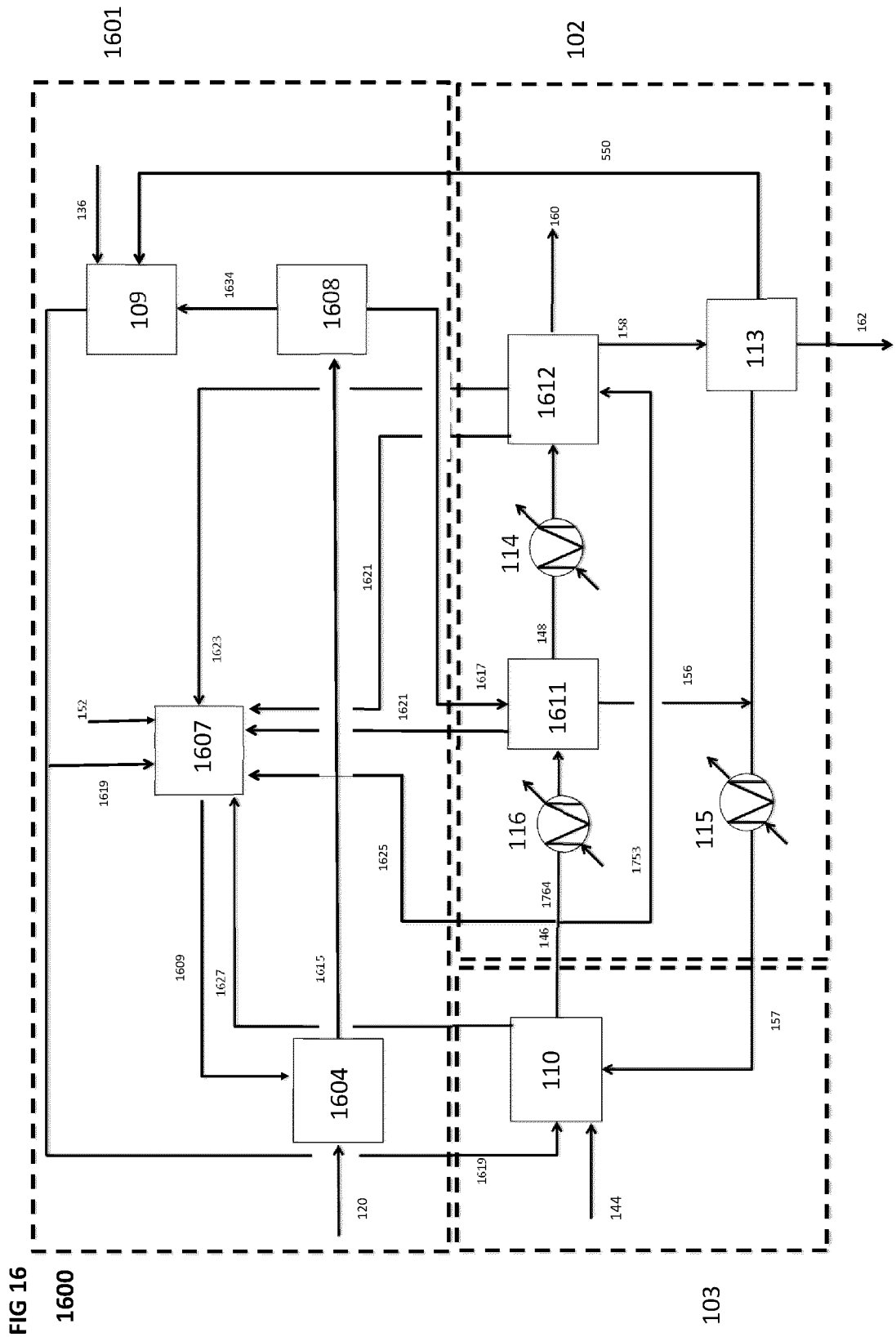
FIG. 16 is a schematic block diagram of a system for producing a synthetic fuel from hydrogen and carbon dioxide, according to a sixteenth implementation, including a $CO_2$ capture subsystem that is different than the $CO_2$ capture subsystems shown in FIGS. 2 to 15.

In the implementations as shown in FIGS. 1 to 14 and 17 to 23 and 27 to 29, the $CO_2$ capture subsystem 101 can include one or more of an air contactor, a pellet reactor, a calciner, a slaker, and a solids removal and clean-up unit. In the implementations as shown in FIGS. 15 and 16, the $CO_2$ capture subsystem 101 includes an air contactor, solution processing unit, regeneration reactor unit and a water removal and clean-up unit.

The air contactor is a machine that contacts and extracts $CO_2$ from atmospheric air by contacting the atmospheric air with a $CO_2$ capture sorbent, such that at least some of the $CO_2$ in the air is transferred to the capture sorbent. The pellet reactor is a machine which precipitates carbonate out of an aqueous solution, and may include equipment such as a fluidized bed reactive crystallizer, for example as described in U.S. Pat. No. 8,728,428, U.S. application 2014/14281430, or as found in commercially available products provided by Royal Haskoning DHV. The calciner is a device that processes material by calcination, wherein the processing is performed at a high temperature (typically in the range of about 550-1150° C.) within a controlled atmosphere. The slaker is a machine that performs a hydration reaction to convert solid calcium oxide (CaO) into either solid calcium hydroxide ($Ca(OH)_2$) or a slurry of $Ca(OH)_2$ in solution, and may include equipment such as high temperature hydrators, steam slakers, paste slakers, mixing and diluting tanks, or a combination of any of the above. The solids removal and clean-up unit removes water and impurities from a material stream, and can include a baghouse, electrostatic precipitator, a chiller, a heat exchanger, a condenser, or a combination of these components.

The hydrogen production subsystem 103 is a machine that produces hydrogen molecules from a hydrogen containing material, which is typically in a fluid state (hydrogen feedstock). Electrolyzers are one known type of hydrogen production machine that extracts hydrogen molecules from water. A number of known hydrogen production pathways exist for electrolysis, such as alkaline electrolysis, proton exchange membrane (also known as a polymer electrolyte membrane) (PEM), electrolysis hydrogen production and fuel cell technologies, and solid oxide electrolysis cell (SOEC) electrolysis. Examples of hydrogen production technologies are described in U.S. Pat. No. 6,727,012, Canadian Patent 2,396,402, Canadian Patent 2,444,313 U.S. Patent Application 2005/074657, U.S. Pat. No. 6,541,141, Japanese Patent 5,618,485, U.S. Patent Application 2016/222524, European Patent 2,457,635, International Patent Application 2015/180752, European Patent Application 2,491,998, Chinese Patents 105,329,855, U.S. Patent Application 2016/0083251 and 105,163,832 and U.S. Patent Application 2015/0122128, the disclosures of which are herein incorporated by references in their entirety.

Extracting water from a stream may include water extraction by one or more of a chemical, or a physical method. Examples of such methods include but are not limited to water extraction from syngas in an SOEC, water extraction from syngas in a slaker, and water removal from calciner product gas. The water extraction may include chemical methods such as interfacing the gaseous stream (e.g. syngas product stream, calciner product gas) with a material that can react with the water, for example CaO, to form another product such as $Ca(OH)_2$, or some type of dessicant. Another chemical extraction method could be splitting the water into $H_2$ and $O_2$ as part of a hydrogen production unit such as an SOEC. The physical methods may include water removal by cooling, by condensation, filtration or by membrane separation. A water conduit serves as a form of product conduit that includes water, such as steam, and may include additional gaseous species, such as, CO, $H_2$, $CO_2$ and $O_2$. The transfer of material produced in one subsystem to another subsystem or between units within a subsystem can serve as material transfer coupling. Examples of material transfer coupling include transfer of material through a water conduit, an oxidant conduit or a fuel conduit.

The synthetic fuel production subsystem 102 is a machine which produces a synthetic fuel from hydrogen molecules and carbon molecules, and in particular, from $CO_2$ gas provided by the $CO_2$ capture subsystem 101. As used herein, "synthetic fuel" includes "fuel synthesis products", "synthetic crude", "Fischer-Tropsch", "synfuels", "air-to-fuels products" and "solar fuels", and refers to a product that may include light end hydrocarbons, heavy end hydrocarbons, or a combination of these components. Light end hydrocarbons may be considered as hydrocarbons that exist in gas phase under atmospheric pressure and ambient temperatures. Heavy end hydrocarbons may be considered as hydrocarbons that essentially exist in liquid or solid (i.e. wax) phase under atmospheric pressure and ambient temperatures. Examples of synthetic fuel light end hydrocarbons include but are not limited to hydrogen, methane, butane, and propane. The hydrogen component of synthetic fuel product light ends may or may not be separated using a membrane and recycled separately as feedstock to other units, for example an SGR unit within the synthetic fuel production subsystem 102. Examples of synthetic fuel heavy end hydrocarbons include but are not limited to gasoline, diesel, jet fuel, aviation turbine fuel and waxes. The Fischer Tropsch fuel synthesis products produced in the methods described herein may be further refined to produce specific fuel types as well as plastics, and polymers.

The synthetic fuel production subsystem 102 utilizes known fuel synthesis techniques (known as "pathways") that involve reacting a source of carbon (such as $CO_2$) with a source of hydrogen. A number of pathways are known which use different intermediates such as syngas (a mixture of carbon monoxide (CO) and hydrogen ($H_2$)), methanol (MeOH), "Fischer Tropsch Liquids" (or "FTL") which are similar in composition to light crude oil, and others. In each case, the products can be refined to deliver final marketable fuels such as gasoline, jet fuel, aviation turbine fuel or diesel to be used in existing vehicle engines. Synthetic fuel products such as jet fuel, aviation turbine fuel, diesel or gasoline, in comparison to the equivalent fossil based jet fuel, aviation turbine fuel, diesel or gasoline products, tend to have dramatically reduced content of pollutants such as sulfur, SOx, NOx, aromatic hydrocarbons and particulate matter. Synthetic fuel products have higher levels of purity, making them more desirable as a transportation fuel source. Furthermore, synthetic fuel products derived from an atmospheric source of $CO_2$ tend to have fewer impurities to deal with during the intermediate stages, as an atmospheric $CO_2$ source does not tend to have the same impurities as traditional carbon sources such as natural gas, biomass or coal. "Gas-to-Liquid" (or GTL) pathways are known techniques for chemically synthesizing liquid fuels from electricity, water, and a source of carbon, such as natural gas. Examples of GTL technology are described in U.S. Pat. Nos. 9,321, 641, 9,062,257, European Patent 2,463,023, Japanese Patent 5,254,278, International Patent Application 2006/044819, U.S. Pat. Nos. 8,062,623, 7,566,441, Canadian Patent 2,936,903, U.S. Patent Application 2015/275097, and U.S. Patent Application 2015/291888, the disclosures of which are herein incorporated by references in their entirety. Examples of syngas reactor systems and components are described in U.S. Pat. Nos. 9,321,641, 9,034,208, 6,818,198, and Chinese patent 102,099,445, the disclosures of which are herein incorporated by references in their entirety. Example of synthetic fuel systems and components are described in U.S. Pat. Nos. 9,358,526, and 9,180,436, the disclosure of which is herein incorporated by reference in its entirety. Examples of reformer exchangers for syngas production are described in U.S. Pat. Nos. 9,126,172, and 9,321,655, the disclosures of which are herein incorporated by references in their entirety.

The implementations of the synthetic fuel production subsystem 102 shown in FIGS. 1 to 23, 27-30 synthesize fuels from $CO_2$ and include a syngas generation reactor ("SGR") unit and a Fischer-Tropsch reactor. The SGR unit is a machine which reacts a variety of feedstocks, including but not limited to hydrogen, $CO_2$, methane, natural gas, oxygen, steam, light end hydrocarbons, and biomethane to produce synthetic gas, or "syngas". As used herein, syngas is a mixture of CO and $H_2$ gases, with possible minor fractions of $CO_2$, methane, and water vapor, and other trace gases depending on production methods. The SGR unit may operate at high temperature, for example above 500° C., may operate at either atmospheric pressure or higher pressures of up to 200 bar depending on the process, may or may not require recycle of product gases, and may incorporate a variety of catalysts to participate in the key reactions. The Fischer-Tropsch reactor is a machine which uses the Fischer-Tropsch process to convert a mixture of carbon monoxide and hydrogen into a range of synthetic fuel products including liquid hydrocarbons.

Fischer-Tropsch processes take feedstocks of $H_2$ and CO and convert them into a multicomponent mixture of linear and branched hydrocarbons and oxygenated products, also known as aliphatic hydrocarbons. In some aspects, a portion of the products may have low aromaticity and low to zero sulfur content. Fischer-Tropsch products may also include linear paraffins and α-olefins, namely: hydrogen and low molecular weight hydrocarbons (C1-C4), medium molecular weight hydrocarbons (C4-C13) and high molecular weight hydrocarbons (C13+). Hydrogen and low molecular weight hydrocarbons can be used to make combustion fuels, polymers, and fine chemicals. Medium molecular weight hydrocarbons having for example similar compositions to gasoline can be used as feedstock for lubricants and diesel fuels. High molecular weight hydrocarbons are waxes or paraffins and can be feedstocks for lubricants and can also be further refined or hydrocracked to diesel fuel.

In some implementations, Fischer-Tropsch reactors may operate between 200° C. to 350° C. and from 10 bar to 60 bar.

In some implementations, Fischer-Tropsch synthesis may take syngas (from a variety of sources including for example SMR, ATR, POx, RWGS units) and convert it to mostly paraffinic (high molecular weight) hydrocarbon products. In some aspects, the resulting products may include for example two streams; a heavy and a light product. At ambient temperature these heavy and light products may be solid and liquid, respectively.

Figure 17:
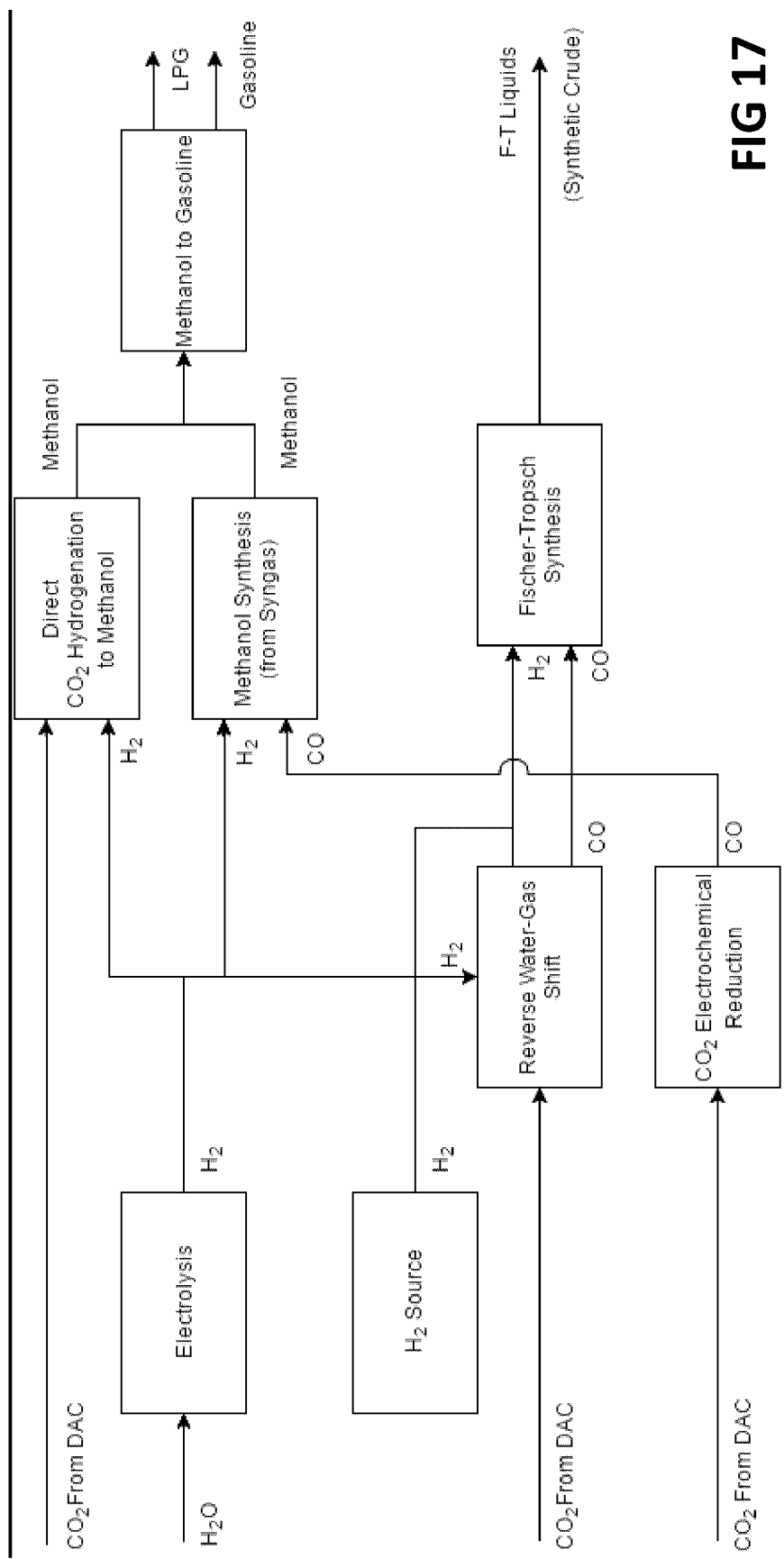
FIG. 17 is a schematic block diagram of different chemical pathways to produce fuels from $CO_2$ and hydrogen feedstocks.

While the implementations of the synthetic fuel production subsystem 102 shown in FIGS. 1 to 23, 27-30 use a pathway for synthesizing fuels from $CO_2$ that involve generating a syngas, the synthetic fuel production subsystem 102 can synthesize fuels using other pathways, including pathways that synthesize fuels from $CO_2$ using renewable or low carbon energy sources, for example solar, wind, hydro, geothermal, nuclear or a combination of these components. Referring to FIG. 17, many of these pathways also utilize syngas as an intermediate component. However, synthetic fuel can also be created using methanol synthesis from syngas followed by methanol-to-gasoline (MTG) conversion. The MTG process uses a zeolite catalyst at around 400° C. and 10-15 bar. Methanol is first converted to di-methyl ether (DME), and then on to a blend of light olefins. These, in turn, are reacted to produce a blend of hydrocarbon molecules. Examples of methods for methanol synthesis are described in Chinese Patent 103,619,790, Chinese Patent 102,770,401, U.S. Patent Application 2014/0323600 and German Patent 102,007,030,440, the disclosures of which are herein incorporated by references in their entirety. Examples of methods of MTG processing are described in Canadian Patent 2,913,061 and U.S. Pat. No. 9,133,074, the disclosures of which are herein incorporated by reference in their entirety.

The synthetic fuel production subsystem 102 can also use a pathway wherein synthetic fuel is created using a methanol-to-olefins (MTO) process, which is similar to the MTG process but is optimized to first produce olefins. These are then fed into another zeolite catalyst process, like Mobil's olefin-to-gasoline and distillate process (MOGD), to produce gasoline. As used herein, the acronym "MTO" refers to the combination of MTO and MOGD. MTG and MTO produce tighter distributions of carbon chain length than Fischer-Tropsch, due to their more selective catalysts. This selectivity reduces the need for post-processing/upgrading and may make for more energy efficient conversion pathways.

The synthetic fuel production subsystem 102 can also use a pathway wherein synthetic fuel is created by direct hydrogenation. Here, methanol is synthesized directly from $CO_2$ and hydrogen followed by MTG conversion. Examples of direct hydrogenation of $CO_2$ are described in US Patent Application 2014/0316016, the disclosure of which is herein incorporated by reference in its entirety. Examples of $CO_2$ hydrogenation technology are described in Japanese Patent 2,713,684, Patent 3376380, and European Patent 864,360, the disclosures of which are herein incorporated by references in their entirety. Referring to FIG. 17, a flow chart of implementations that could be used to produce synthetic fuels are illustrated. Any combination of the blocks could be used in combination. For example, hydrogen could be produced by electrolysis, such as polymer electrolyte membrane (PEM), alkaline, or solid oxide (SOEC) electrolysis, or could be supplied from other sources such as waste hydrogen from a chlor-alkali plant. Carbon dioxide produced from dilute source $CO_2$ capture can either be reduced to carbon monoxide using a variety of chemical or electrochemical reduction processes, including but not limited to reverse water gas shift processes. In such cases, the carbon monoxide and hydrogen can be fed into synthetic fuel production processes, including but not limited to Fischer-Tropsch processes, or methanol synthesis processes. Where methanol synthesis processes are used, synthetic fuel can then be produced using processes such as methanol-to-gasoline (MTG) or methanol-to-olefins (MTO). In still further implementations, the carbon dioxide from dilute source capture can be fed directly to a hydrogenation process, combined with hydrogen, and then fed into methanol-based fuel synthesis processes. The above examples are illustrative, rather than prescriptive, examples of implementations of the air to fuels processes described herein.

As noted above, the heat energy from one subsystem 101, 102, 103 can be used as input energy by another subsystem 101, 102, 103. For example, the synthetic fuel production subsystem 102 generates medium grade heat while performing fuel synthesis (e.g. Fischer Tropsch ~250-350° C., Methanol Synthesis ~200-300° C., Methanol to Gasoline ~300-400° C., Methanol to Olefins ~340-540° C.), which can be used by various machines in the system 100, including the calciner to preheat feed streams, the slaker to produce steam in slaking reactions, the air contactor to regenerate sorbent and release $CO_2$, the SGR to preheat boiler feedwater, and the Fischer-Tropsch reactor to preheat the reactor feedstream.

Furthermore, the $CO_2$ capture subsystem 101, hydrogen production subsystem 103, and synthetic fuel production subsystem 102 also generate high grade heat during operation (e.g. Calciner-~850-950° C., SOEC electrolysis ~800° C., SGR ~800° C.-900° C.) which can be used by various machines in the system 100, including the calciner, the SOEC electrolyzer, and the SGR. This medium and high-grade heat can also be used to generate power, as well as to provide steam heat for downstream refining and distillation systems.

Similarly, fluids produced or discharged by one subsystem 101, 102, 103 can be used as feedstock or for other processes in another subsystem. For example, the synthetic fuel production subsystem 102 generates steam (both by the SGR and the Fischer-Tropsch reactor) and the $CO_2$ capture subsystem 101 generates water (e.g. by combustion reaction in the calciner and the air contactor ingesting water during times of precipitation), which can be used by various machines in the system 100, including in the air contactor to replace water loss due to evaporation, and the slaker to produce lime slurry, to wash pellets to remove alkali content prior to feeding into the calciner, to regenerate sorbent and release $CO_2$ in the sorbent regeneration unit, and to serve as hydrogen feedstock in the hydrogen production subsystem 103.

Table 2 illustrates some of the key chemical reactions in $CO_2$ capture processes, $H_2$ production processes, and syngas or synfuel production processes that may be involved in air to fuel pathways along with approximate heats of reaction. As will be discussed further with reference to FIGS. 1 to 30 these pathways suggest how heat energy and/or materials can be advantageously exchanged between the subsystems 101, 102 and 103 which perform these processes.

TABLE 2

Chemical Reactions and Approximate Heats Associated with Air to Fuels Processes

| Process | Location of Reaction in the Process | Chemical Reaction(s) | Approximate ΔH (kJ/mol product) |
|---|---|---|---|
| $CO_2$ Capture | Air contactor; Pellet reactor; | $CO_2(g) + 2KOH(aq) \rightarrow K_2CO_3(aq) + H_2O(l)$; $K_2CO_3(aq) + Ca(OH)_2(aq) \rightarrow 2KOH(aq) + CaCO_3(s)$; | −96; −6; |
| $CO_2$ Capture (Oxy-fired Calcination) | Calciner | $CH_4(g) + O_2(g) \rightarrow 2H_2O(g) + CO_2(g)$; $CaCO_3(s) + Heat \leftarrow \rightarrow CaO(s) + CO_2(g)$; | −165; +165; |
| $CO_2$ Capture (Lime Slaking or Hydration) | Lime Hydrator, paste slaker or steam slaker | $CaO(s) + H_2O(g/l) \rightarrow Ca(OH)_2(s)$; | −64; |
| $H_2$ Production | Water electrolyzer | $2H_2O(l) + electricity \rightarrow H_2(g) + O_2(g)$; $2H_2O(g) + electricity \rightarrow H_2(g) + O_2(g)$; | +286; +242; |
| Syngas Production | Steam Methane Reformer | $CH_4(g) + H_2O(g) \leftarrow \rightarrow CO(g) + 3H_2(g)$; | +206; |
| Syngas Production | Partial Oxidation Reformer | $CH_4(g) + 1/2O_2(g) \leftarrow \rightarrow CO(g) + 2H_2(g)$; | −36; |
| Syngas Production | Dry Methane Reformer | $CH_4(g) + CO_2(g) \leftarrow \rightarrow 2CO(g) + 2H_2(g)$; | +247; |
| Syngas Production | Autothermal Reformer | $CH_4(g) + 1/2xO_2(g) + yCO_2(g) + (1 - x - y)H_2O(g) \leftarrow \rightarrow (y + 1)CO(g) + (3 - x - y)H_2(g)$; | ~0; |
| Syngas Production | Syngas electrolyzer unit | $2CO_2(g) + electricity \leftarrow \rightarrow 2CO(g) + O_2(g)$ | +283; |
| Syngas Production | RWGS Reactor | $H_2(g) + CO_2(g) \leftarrow \rightarrow CO(g) + H_2O(g)$; $CO_2(g) + 4H_2(g) \leftarrow \rightarrow CH_4(g) + 2H_2O(g)$; $CO(g) + 3H_2(g) \leftarrow \rightarrow CH_4(g) + H_2O(g)$; | +41; −165; −206; |
| Syngas Production | Syngas unit | $CH_4(g) \leftarrow \rightarrow C(s) + 2H_2(g)$; $2CO(g) \leftarrow \rightarrow C(s) + CO_2(g)$; $CO_2(g) + 2H_2(g) \leftarrow \rightarrow C(s) + 2H_2O(g)$; $H_2(g) + CO(g) \leftarrow \rightarrow H_2O(g) + C(s)$; | +75; −172; −90; −131; |
| Synthetic Fuel Production | Fischer-Tropsch Unit | $CO(g) + 2H_2(g) \leftarrow \rightarrow (-CH_2-) + H_2O(g)$; | −152; |
| Synthetic Fuel Production | Methanol Production unit | $CO(g) + 2H_2(g) \leftarrow \rightarrow CH_3OH(l)$; $CO_2(g) + 3H_2(g) \leftarrow \rightarrow CH_3OH(l) + H_2O(l)$; | −91; −49; |
| Synthetic Fuel Production | Methanol-to-Gasoline unit | $2CH_3OH(l) \leftarrow \rightarrow CH_3OCH_3 + H_2O$; | −37; |
| Synthetic Fuel Production | Methanol-to-Olefin unit | $2CH_3OH(l) \leftarrow \rightarrow CH_3OCH_3 + H_2O$; | −37; |

Implementations

Figure 2:
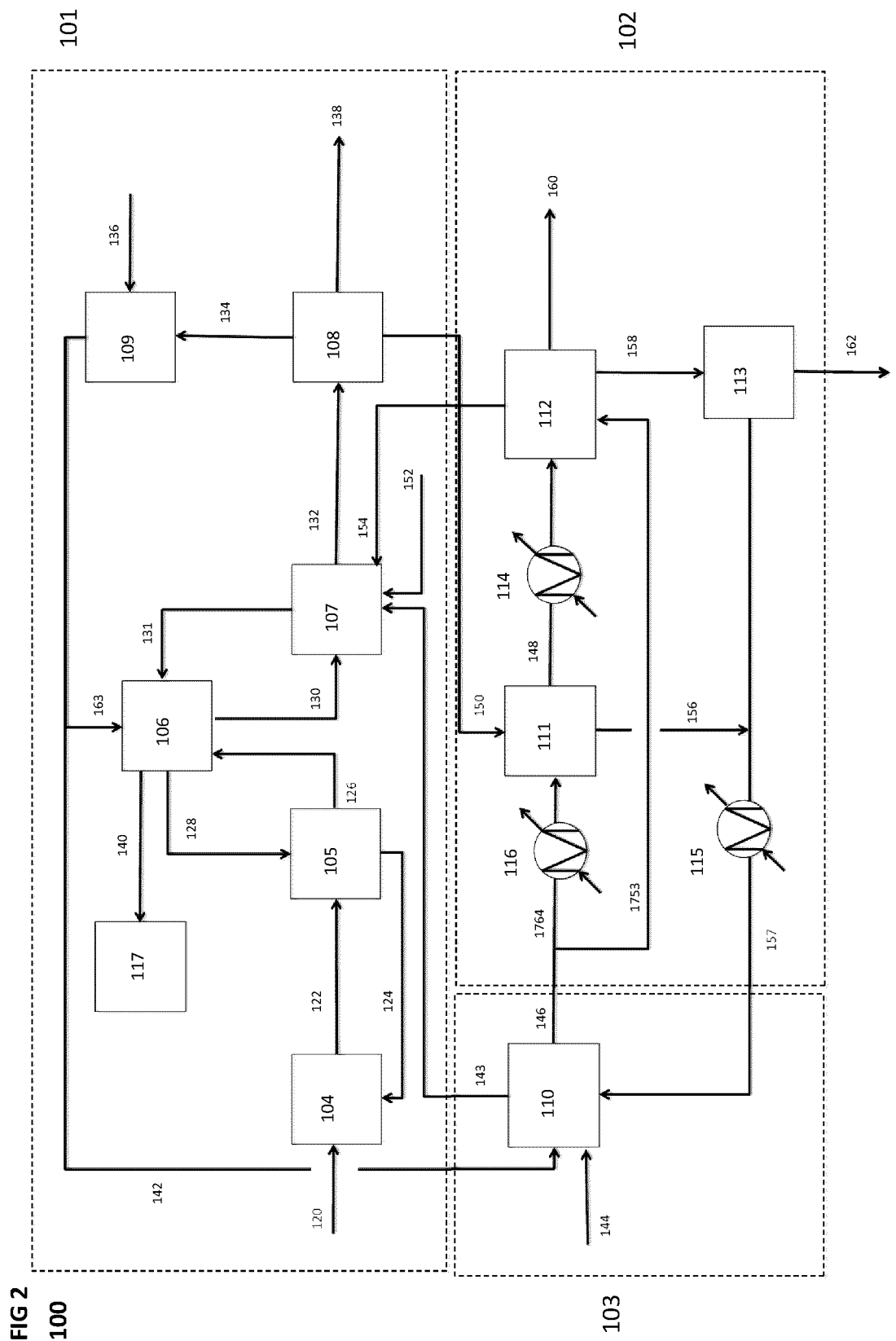
FIG. 2 is a schematic block diagram of a system for producing a synthetic fuel from hydrogen and carbon dioxide, according to a first implementation, wherein oxygen produced by the hydrogen production subsystem and fuel produced by the synthetic fuel production sub-system is used by the $CO_2$ capture subsystem.

According to a first implementation, and referring to FIG. 2, the synthetic fuel production system 100 includes the $CO_2$ capture subsystem 101, the hydrogen production subsystem 103 and the synthetic fuel production subsystem 102. In the $CO_2$ capture subsystem 101, an air contactor 104 takes in atmospheric air (including for example $CO_2$, $O_2$, $N_2$ and impurities) 120 and contacts it with a $CO_2$ capture solution (including for example $K_2CO_3$, $H_2O$, KOH, trace $CaCO_3$) 124. The $CO_2$-rich capture solution 122 is then sent to a pellet reactor 105, which takes a $Ca(OH)_2$ slurry 128 and reacts it with the $CO_2$-rich capture solution 122 to precipitate the $CO_2$ as carbonate onto calcium carbonate pellets, which are part of a stream 126 including wet $CaCO_3$ and trace amount of $K_2CO_3$, $H_2O$ and KOH at about 10° C. The $CO_2$-lean stream leaves the pellet reactor 105 and goes back to the air contactor 104 as the $CO_2$ capture solution 124. The calcium carbonate pellets are processed, dried and preheated through a slaker 106 and are eventually sent to a hot oxy-fired calciner 107 via pellet stream 130. Due to the high temperature in the calciner 107, the pellets calcine, releasing the $CO_2$ in a gaseous stream 132 that may also include one or more of $H_2O$, $O_2$, impurities and the like (calciner gaseous product gas stream). The hot calcium oxide (CaO) solids 131 are returned to the slaker 106, where the heat from the hot CaO can be used to dry and preheat the calcium carbonate pellets, and the CaO is reacted (hydrated) with water to reform the $Ca(OH)_2$ slurry 128. The heat produced from the hydration reaction is thus exchanged. The resulting $Ca(OH)_2$ slurry 128 is sent back into the pellet reactor 105 to grow more pellets. The reaction taking place in the slaker 106 is slightly exothermic, and waste heat generated in this unit can be recycled to an optional power generation unit 117 via a steam/water stream 140. The power generation unit 117 may include waste heat boilers, steam turbines, steam superheaters or a combination of these components. In addition to calcium carbonate pellets, the oxy-fired calciner 107 is fed oxygen, which may be partially or wholly provided by the oxygen by-product stream 143 of the hydrogen production subsystem 103. The transfer of material produced in one subsystem to another subsystem or between units within a subsystem can serve as material transfer coupling. Examples of material transfer coupling include transfer of material through a conduit. In this sense, the oxygen by-product stream 143 serves as an oxidant conduit that transfers material from one subsystem (hydrogen production subsystem) to another subsystem ($CO_2$ capture subsystem).

The calciner 107 also requires fuel to combust with the oxygen to provide the approximately 900° C. temperature for calcination. The fuel can be provided by a natural gas stream 152 from an external supply and/or by a light end by-products stream 154 from a Fischer Tropsch unit 112 within the synthetic fuel production subsystem 102. Calcination is a highly endothermic reaction, and for this process occurs at high temperatures, and both the calcium oxide solids and calciner gaseous product streams leaving the unit have temperatures of approximately 900° C. The hot calciner gaseous product stream 132 is cooled and sent through a solids removal and clean-up unit 108, which may include a baghouse, electrostatic precipitator, a chiller, a heat exchanger, a condenser, or a combination of these components, where any water and impurities such as dust can be removed as streams 134 and 138, respectively, prior to a $CO_2$ product stream 150 being sent over to a SGR unit 111 within the synthetic fuel production subsystem 102. Water 134 from the solids removal and clean-up unit 108 is sent over to a water treatment and source unit 109 where it is cleaned up and recycled back into the overall system 100. Make-up or supplemental water can be supplied to the water treatment and source unit 109 via an external source 136. Water from the water treatment and source unit 109 may be provided to other units within system 100, for example as water 163 to the slaker unit 106 and/or water 142 to the hydrogen generation unit 110.

The hydrogen production subsystem 103 includes a hydrogen generation unit 110 such as a water electrolyser, and is powered by a power supply such as a renewable source of electricity. This hydrogen generation unit 110 produces a hydrogen product stream 146 and a by-product oxygen stream 143 from a hydrogen feedstock stream 144 (e.g. water). At least a portion of the by-product oxygen stream 143 is sent to the oxy-fired calciner 107, and the hydrogen product stream 146 can be sent to both the SGR unit 111 and the Fischer Tropsch unit 112 within the synthetic fuel production subsystem 102, as either separate streams 1764 and 1753 respectively, or as a single stream fed first to the SGR unit 111, where any unreacted hydrogen leaves the SGR unit 111 with the product SGR gases in stream 148 and is then sent to the Fischer-Tropsch unit 112. The hydrogen product stream 146 is heated to approximately 800° C. by a heat exchanger 116 before being fed into the SGR unit 111. The hydrogen production stream 146 is reacted with the $CO_2$ product stream 150 in the SGR unit 111 to produce a product gas stream 148 called syngas which can include, for example, CO, $H_2O$, $H_2$, $CH_4$ and $CO_2$. Water produced in the SGR unit 111 by the reaction can be fed to the hydrogen generation unit 110 via stream 156 for use as hydrogen feedstock; this water can be cooled by a heat exchanger 115. In this sense, stream 156 serves as a water conduit that transfers material from one subsystem (synthesis gas production subsystem) to another subsystem ($H_2$ production subsystem). The syngas 148 is cooled down in a heat exchanger 114 before entering the Fischer-Tropsch unit 112.

The hydrogen product stream 146 and the syngas 148 are reacted within the Fischer-Tropsch unit 112 to produce hydrocarbon products. Lighter hydrocarbons produced by the Fischer-Tropsch unit 112 and any unreacted hydrogen are sent back within the system 100, for example to the oxy-fired calciner 107 via stream 154 to be used as fuel.

In some implementations, the lighter hydrocarbons produced by the synthetic fuel production subsystem 102, for example by the Fischer-Tropsch unit 112, may be recycled back within the synthetic fuel production subsystem 102, for example to the SGR unit 111 (not shown). Heavier hydrocarbons are sent downstream for further processing or final product as stream 160. Water in the product stream is knocked out by the Fischer Tropsch unit 112 and is sent via water stream 158 for clean up in a clean-up unit 113; this water can be recycled back to the hydrogen production subsystem 110 via stream 157 or to elsewhere in the system 100 via stream 162.

The heat exchangers (114, 115 and 116) may or may not incorporate waste heat from elsewhere in the overall system to heat up 116 or cool down 114, 115 the process streams pass therethrough.

In some implementations, the $CO_2$ capture subsystem 101 may incorporate a high temperature hydrator or steam slaker (not shown) within the slaker unit 106. In other implementations the SGR unit 111 of synthetic fuel production subsystem 102 may be a reverse gas shift (RWGS) reactor, or include a different syngas generation reactor (SGR) unit instead of or in combination with the SGR unit 111, such as an auto-thermal reformer (ATR), a partial oxidation reactor, dry methane reformer (DMR) or a steam methane reformer (SMR). In some implementations, the hydrogen feedstock to the synthetic fuel production system 102 may at least be partially provided by products from the SGR unit. (not shown).

Figure 3:
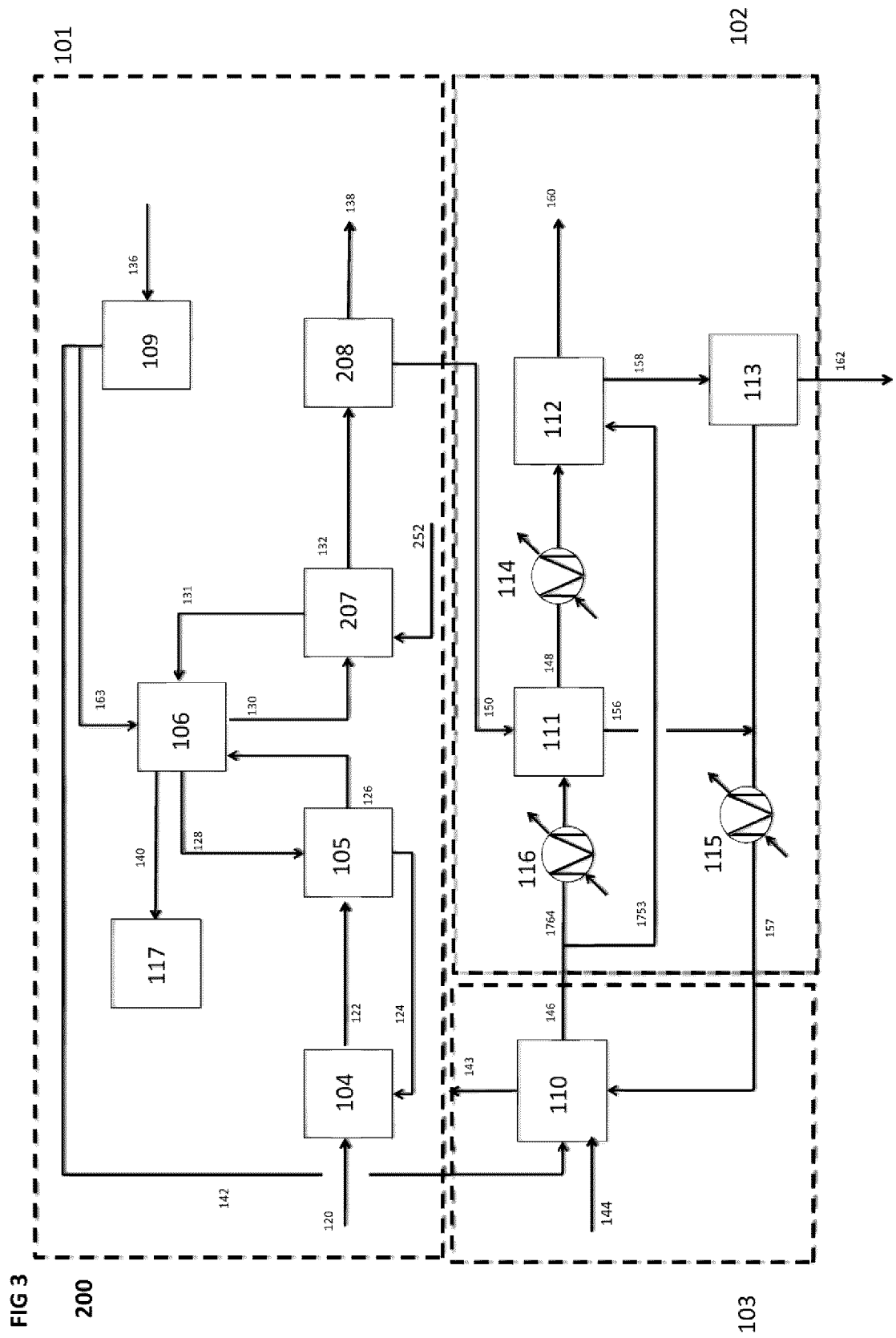
FIG. 3 is a schematic block diagram of a system for producing a synthetic fuel from hydrogen and carbon dioxide, according to a second implementation, wherein at least a portion of the energy required in the $CO_2$ capture subsystem $CO_2$ is derived from renewable sources $CO_2$.

Referring now to FIG. 3 and according to a second implementation, a synthetic fuel production system 200 includes the capture subsystem 101, the hydrogen production subsystem 103 and the synthetic fuel production subsystem 102. All the components of the system 200 are substantially the same as in the first implementation of the system 100 illustrated in FIG. 1, with the exceptions being that within the $CO_2$ capture subsystem 101, the calciner 207 is now heated with a renewable energy source 252 instead of natural gas or light end products from the Fischer Tropsch unit 112; examples of such renewable energy sources 252 include one or more of hydroelectricity, solar thermal energy, wind, geothermal or nuclear heat sources (e.g. molten salt reactors). Using a renewable energy source to provide the heat for calciner unit 207 means that the hot $CO_2$ product stream 132 does not contain the usual oxy-combustion products ($H_2O$, $CO_2$, trace $O_2$); instead it contains mostly calcination products such as $CO_2$ and trace impurities. In this sense, the hot $CO_2$ product stream 132 serves as a calciner product conduit that transfers the product stream from the calciner to the solids removal unit. This eliminates the need for water removal prior to sending to downstream units, for example the SGR 111. Also, in this implementation the solids removal and clean up unit 208 operates at higher temperatures than the unit 108 in the first implementation, for example up to approximately 800° C.-950° C., and as such incorporates filter materials that can handle higher temperatures, such as ceramic fiber elements, refractory material, ceramic wollastonite, ceramic fibres of an aluminosilicate composition such as are described in Norwegian Patent 960,955, the disclosure of which is herein incorporated by reference in its entirety, or the like. In this implementation, the solids removal and clean-up unit 208 does not need water removal componentry.

The hot $CO_2$ product stream 150 leaving the high temperature solids removal and clean up unit 208 can then be directly fed into the SGR unit 111 without needing preheating exchangers and/or with less heat needing to be supplied to the SGR unit 111, so long as the SGR unit 111 is operating at low pressur.

The SGR unit 111 is operating at a low pressure, for example slightly above atmospheric, so that the hot $CO_2$ product stream 150 coming from the calciner unit 105, which is also operating near atmospheric pressure, can properly feed into the SGR unit 111. Any significant compression required to feed into the SGR unit 111 would involve cooling the stream 150 down, which would take away the advantage of having the hot product stream 150 feed directly into the SGR unit 111. The gas streams may be moved between units using low pressure, high temperature blowers if required/as needed.

In some aspects, the hot $CO_2$ product stream 150 is transferred with minimal heat loss so that a substantial amount of the stream's heat can be retained, thus reducing the need for external heat energy to the SGR unit. Said in another way, the hot $CO_2$ product stream 150 is transferred to the SGR unit 111 in a way to avoid substantially cooling the stream; while there may be some cooling/heat loss due to the need to transfer through pipes for example, care would be taken to minimize heat loss and the stream 150 would not be intentionally cooled to the point where a significant amount of the thermal energy is removed.

In some aspects, the calciner units may be operated at slightly higher than atmospheric pressures, ie up to a few bars of pressure, in order to mitigate compression between the calciner and SGR units, while still maintaining higher temperatures gas exchange between the two units. In these cases, however it is noted that the required temperature of calcination rises exponentially as the pressure rises, therefore operating the calciner at even up to 2 bars of pressure would require a significant increase in calciner operating temperature, which quickly impacts the energy input to the system. Additionally, there are practical upper limits on calciner operating temperature due to melting temperatures and fouling from impurities. Implementations of low pressure SGR units and how they interface are described in more detail in FIGS. 18 and 19. The by-product oxygen stream 143 from the hydrogen production subsystem 103 is not sent to the calciner unit 207 and instead can be used to oxy-fire turbines for power, oxy-fire the heating needs for the SGR unit 111 or can be sent out of the system for other purposes (not shown). The SGR unit 111 can be a modified RWGS unit to handle the oxy-firing (not shown).

Figure 4:
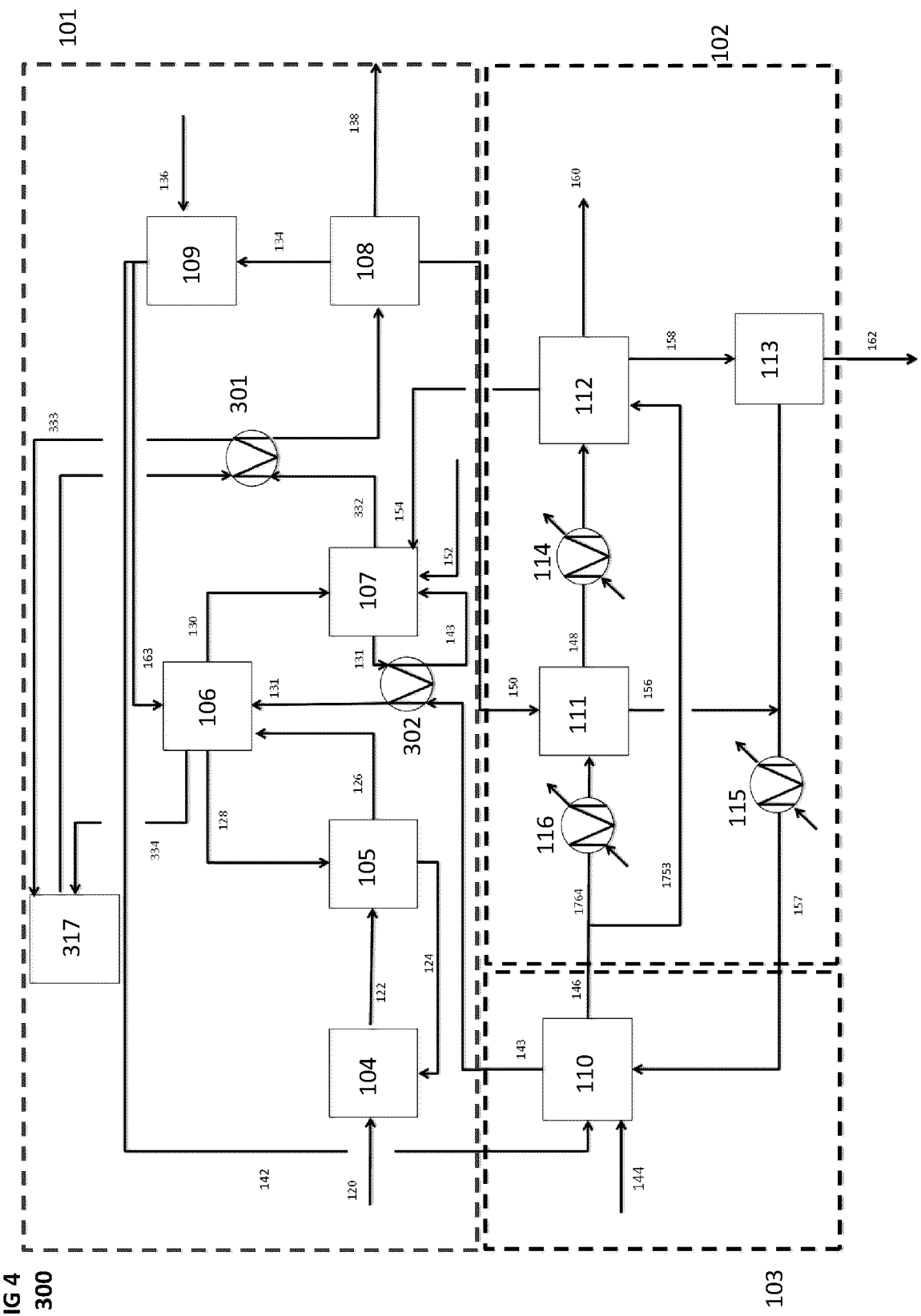
FIG. 4 is a schematic block diagram of a system for producing a synthetic fuel from hydrogen and carbon dioxide, according to a third implementation, wherein heat energy produced by the $CO_2$ capture subsystem is used to heat oxygen produced by the hydrogen production subsystem, and used to generate electrical power.

Referring now to FIG. 4 and according to a third implementation, a synthetic fuel production system 300 includes the $CO_2$ capture subsystem 101, the hydrogen production subsystem 103 and the synthetic fuel production subsystem 102. All components in the system 300 are substantially the same as in the first implementation of the system 100 illustrated in FIG. 1, with the exceptions being that within the $CO_2$ capture subsystem 101, the hot calciner gases 332 are passed through a first heat exchanger 301 to extract excess heat and provide it to a power generation system 317 via heat exchanger fluid 333 to generate power. Additionally or alternatively, excess heat from the slaker unit 106 is extracted and sent to the power generation system 317 in the form of steam 334 to generate power.

Furthermore, the $CO_2$ capture subsystem 101 includes a second heat exchanger 302 which is used in a heat recovery process to heat the oxygen product gas stream 143 from about 20° C. to about 600° C. using heat from hot calcium oxide (CaO) solids 131 (thereby causing the solids to drop in temperature from about 950° C. to about 550° C.). The heated oxygen product gas stream 143 is then fed into the calciner 107 for use in combustion.

Figure 5:
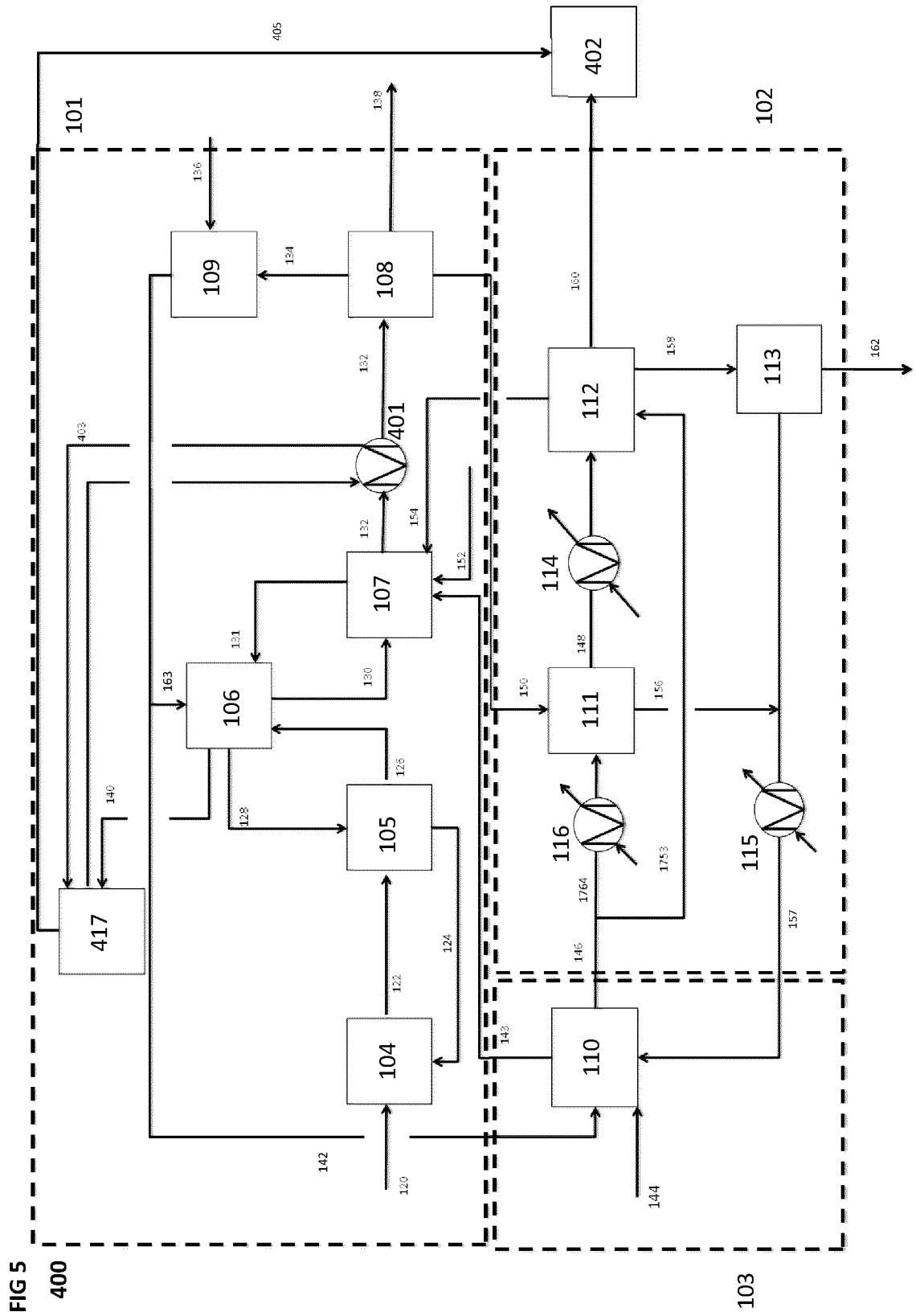
FIG. 5 is a schematic block diagram of a system for producing a synthetic fuel from hydrogen and carbon dioxide, according to a fourth implementation, wherein heat energy produced by the $CO_2$ capture subsystem is used to produce energy for a distillation and refining unit of the system.

Referring now to FIG. 5 and according to a fourth implementation, a synthetic fuel production system 400 includes the $CO_2$ capture subsystem 101, the hydrogen production subsystem 103 and the synthetic fuel production subsystem 102. All components in the system 400 are substantially the same as in the first implementation of the system 100 illustrated in FIG. 1, with the exceptions being that within the $CO_2$ capture subsystem 101 the hot calciner gases 132 are passed through a heat exchanger 401 to extract excess heat and provide it to a waste heat collection system 417 via a first heat transfer fluid 403. The waste heat is collected and sent to a downstream distillation and refining unit 402 via a second heat transfer fluid 405. The distillation and refining unit 402 may also accept the liquid products stream 160 from the Fischer Tropsch unit 112 within the synthetic fuel production subsystem 102.

Figure 6:
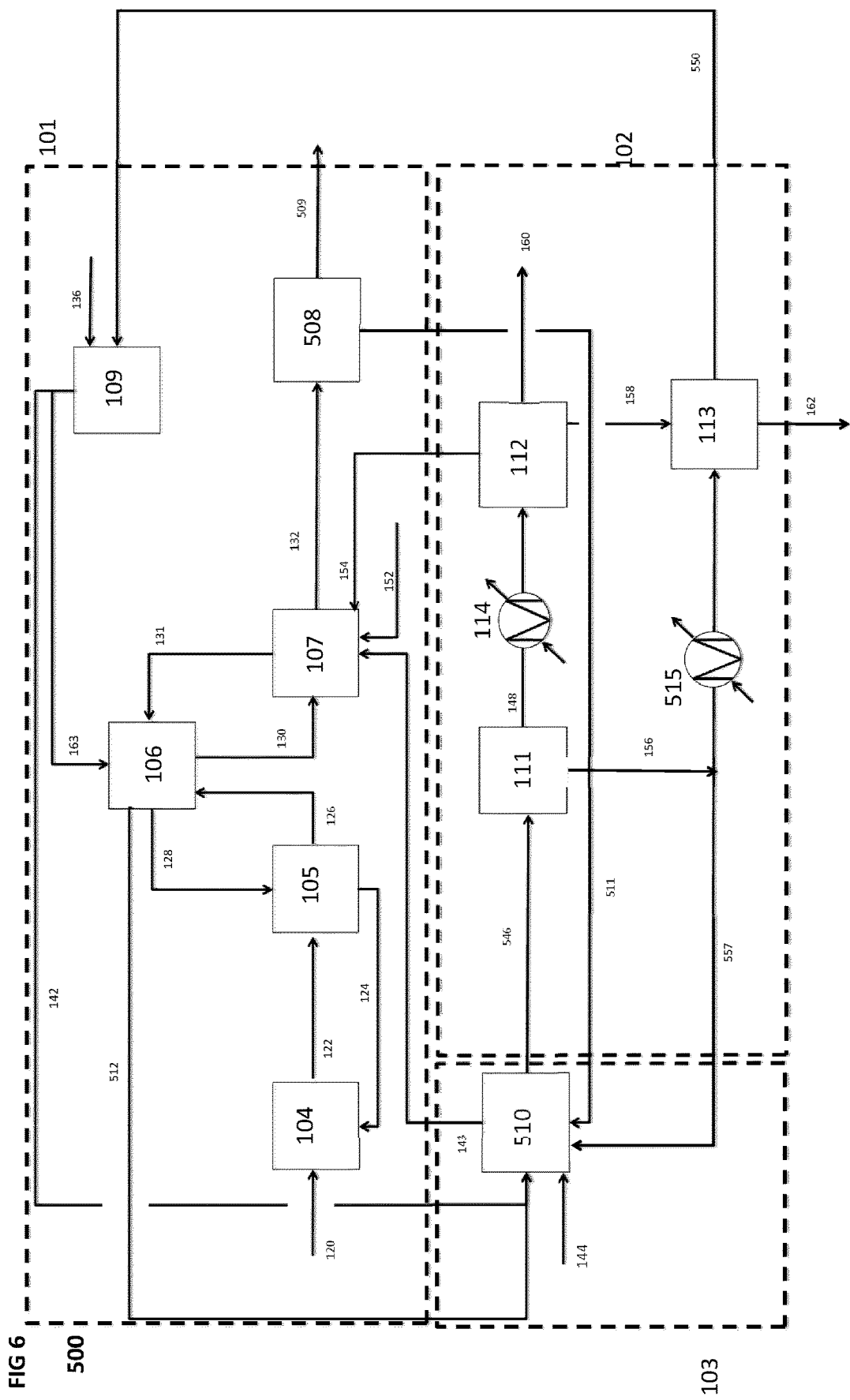
FIG. 6 is a schematic block diagram of a system for producing a synthetic fuel from hydrogen and carbon dioxide, according to a fifth implementation, wherein hot product gases and heat energy produced by the $CO_2$ capture subsystem are sent to the hydrogen production subsystem and water produced by the $CO_2$ capture subsystem and by the synthetic fuel production subsystem can be used as hydrogen feedstock by the hydrogen production subsystem as well as feedstock to other water consumers within the system.

Referring now to FIG. 6 and according to a fifth implementation, a synthetic fuel production system 500 includes the $CO_2$ capture subsystem 101, the hydrogen production subsystem 103 and the synthetic fuel production subsystem 102. All components in the system 500 are substantially the same as in the first implementation of the system 100 illustrated in FIG. 1, with the exceptions being that within the $CO_2$ capture subsystem 101, the calciner hot product gases 132, including $CO_2$, $H_2O$ and $O_2$, are sent through a high temperature solids removal and clean up unit 508, which is similar to the second implementation of the unit 208 but which removes particles only as particles stream 509, after which all gases 511 (including $CO_2$, $H_2O$, $O_2$) are sent directly to the hydrogen production subsystem 103 within which they are fed into a high temperature solid oxide electrolyser cell (SOEC) unit 510 for use as hydrogen feedstock. In this sense, the hot product stream 132 serves as a calciner product conduit that transfers material from the calciner to the solids removal unit (unit 508 in this case), while the stream 511 serves as a product conduit that transfers material from one subsystem ($CO_2$ capture subsystem) to another subsystem ($H_2$ production subsystem). The heat energy in the hot gas stream 511 can be used as input energy by the SOEC unit 510. Energy from an external source can also be provided to power the SOEC unit 510, which can be provided for example by a renewable energy source. If needed, the steam supply to the hydrogen production subsystem 103 can be supplemented with steam 512 generated in the slaker unit 106, water 142 from the water treatment and source unit 109, or a combination of these sources. In this sense, the streams 512 and 142 serve as water conduits that transfer material from one subsystem ($CO_2$ capture subsystem) to another subsystem ($H_2$ production subsystem).

The SOEC unit 510 operates to produce a product stream 546 that contains $CO_2$, $H_2$ and CO which is then sent to the SGR unit 111 (which in this implementation can be a RWGS reactor), and an oxygen by-product stream 143. At least a portion of the by-product oxygen stream 143 is sent to the oxy-fired calciner 107. Water 156 is removed in the SGR unit 111 and is cooled in a heat exchanger unit 515 before going through a clean-up unit 113 and is then recycled as part of the water stream 550 to the water treatment and source unit 109 for use as needed in the system 500. Alternatively or additionally, at least a portion of the water stream 557 can be diverted directly to the SOEC unit 510 upstream of the heat exchanger 515, to provide heat energy and hydrogen feedstock.

Figure 7:
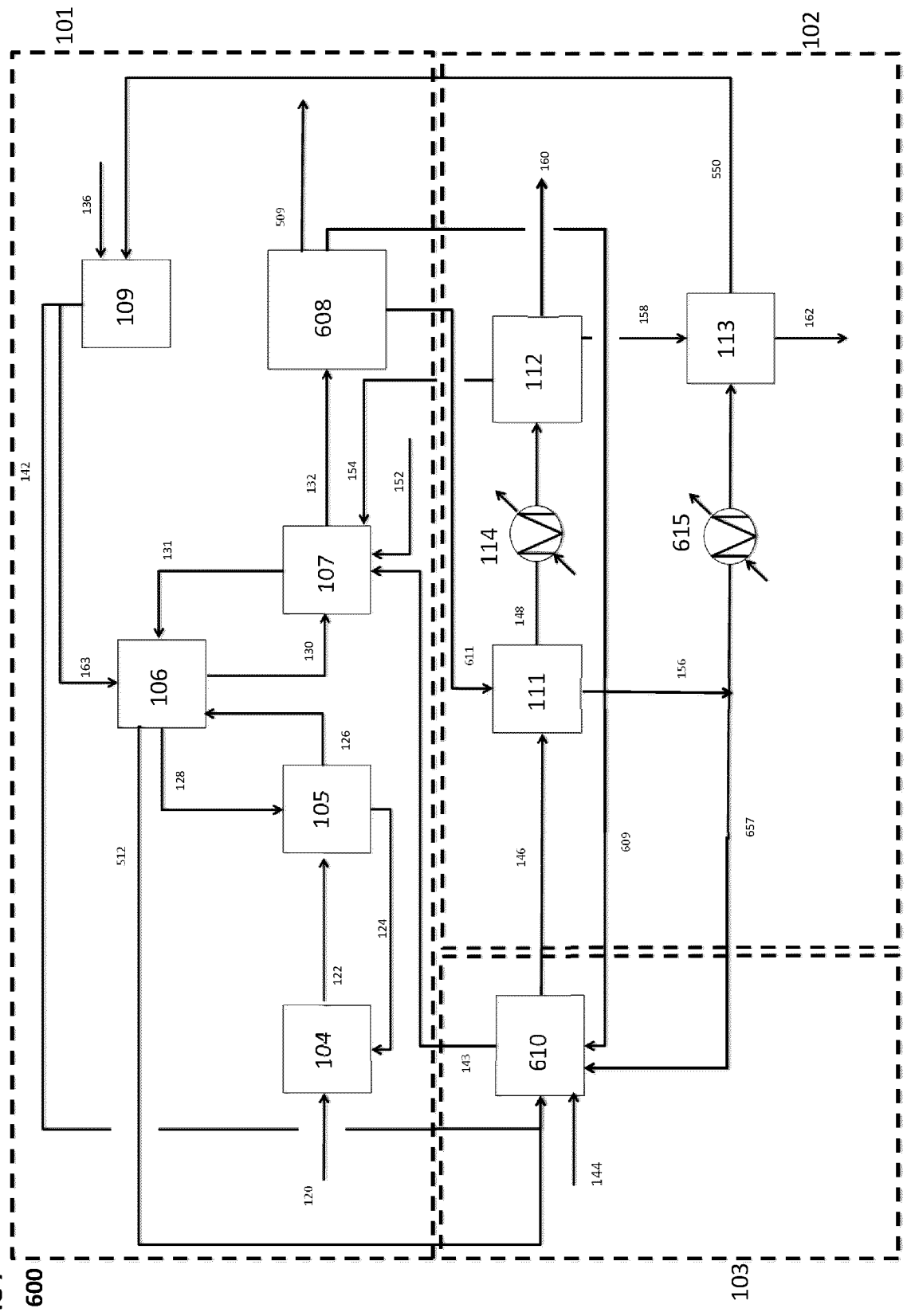
FIG. 7 is a schematic block diagram of a system for producing a synthetic fuel from hydrogen and carbon dioxide, according to a sixth implementation, wherein hot product gases produced by the $CO_2$ capture subsystem are separated such that the steam can be used as input energy and hydrogen feedstock by the hydrogen production subsystem and the remaining hot product gases are used as input energy and feedstock to the synthetic fuel production subsystem $CO_2$.

Referring now to FIG. 7 and according to a sixth implementation, a synthetic fuel production system 600 includes the $CO_2$ capture subsystem 101, the hydrogen production subsystem 103 and the synthetic fuel production subsystem 102. All components in the system 600 are substantially the same as in the first implementation of the system 100 illustrated in FIG. 1, with the exceptions being that within the $CO_2$ capture subsystem 101, the calciner hot product gases 132, including $CO_2$, $H_2O$ and $O_2$, are sent through a high temperature solids removal and clean up unit 608, where any solids particles are removed as stream 509 and water (steam) is separated as stream 609 using a high temperature water removal membrane. The steam 609 is sent over to an SOEC unit 610 within the hydrogen production system 103 and the other hot product gases 611 (including for example $CO_2$, $O_2$) are sent to the SGR unit 111 within the synthetic fuel system 102. In this sense, the stream 609 serves as a water conduit that transfers material from one subsystem ($CO_2$ capture subsystem) to another subsystem ($H_2$ production subsystem). Similar to the second implementation, the SGR unit 111 in this implementation must be operating at a low pressure of slightly above atmospheric, as the hot $CO_2$ product stream 132 coming from the calciner unit 107 is at near atmospheric pressure, and any compression required to feed into a higher pressure SGR unit 111 would involve cooling the stream 611 down significantly, taking away the advantage of having the hot product stream 611 feed directly into the SGR unit 111. This direct feeding method is done in such a way to avoid substantially cooling the stream 611. If needed, the steam supply to the hydrogen production subsystem 103 can be supplemented with steam 512 generated in the slaker unit 106, the water 142 from the water treatment and source unit 109, or a combination of the two sources. The hydrogen production subsystem 103 produces a hydrogen stream 146 and an oxygen stream 143. At least a portion of the oxygen stream 143 gets fed to the calciner 107 and the hydrogen stream 146 gets fed directly to the SGR unit 111, where enough surplus is fed such that there is hydrogen in the syngas product stream 148 that is then cooled and proceeds to the Fischer Tropsch unit 112. Water 156 is removed in the SGR unit 111 and is cooled in a heat exchanger unit 615 before going through a clean-up unit 113 and is then recycled as part of water stream 550 to the water treatment and source unit 109 for use as needed in the system 600. Alternatively or additionally, at least a portion of the water can be diverted as stream 657 directly to the SOEC unit 610 upstream of the heat exchanger 615, to provide heat energy and hydrogen feedstock.

Figure 8:
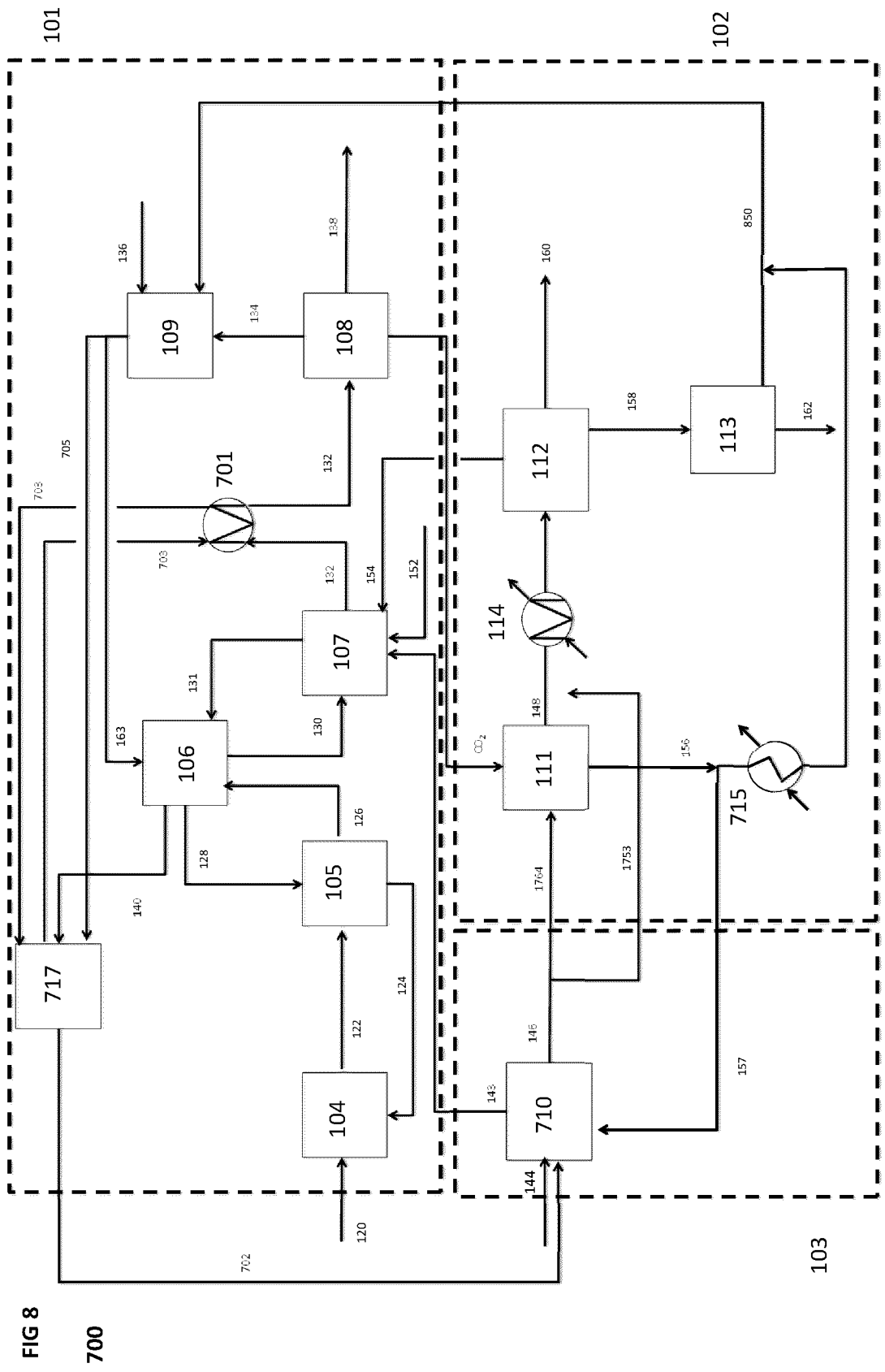
FIG. 8 is a schematic block diagram of a system for producing a synthetic fuel from hydrogen and carbon dioxide, according to a seventh implementation, wherein heat energy in a material flow in the $CO_2$ capture subsystem is used to heat water used by the hydrogen production subsystem, and water produced by the synthetic fuel production subsystem can be used as hydrogen feedstock by the hydrogen production subsystem or as water input to the $CO_2$ capture subsystem.

Referring now to FIG. 8 and according to a seventh implementation, a synthetic fuel production system 700 includes the $CO_2$ capture subsystem 101, the hydrogen production subsystem 103 and the synthetic fuel production subsystem 102. All components in the system 700 are substantially the same as in the first implementation of the system 100 illustrated in FIG. 1, with the exceptions being that within the $CO_2$ capture system 101, the hot calciner gaseous product stream 132 is sent through a heat exchanger unit 701, wherein heat is transferred to a heat transfer fluid 703 which in turn flows to a steam unit 717; consequently the calciner gaseous product stream is cooled from about 950° C. to less than about 450° C. Steam 140 from the slaker 106 is also sent to the steam unit 717 and the resulting steam 702 can be sent to a SOEC unit 710 to provide heat energy and the hydrogen feedstock. If needed, the steam unit 717 can be supplemented with water 705 from the water treatment and source unit 109.

Once through the heat exchanger unit 701, the cooled calciner gaseous product stream 132 is then sent to the solids removal and clean-up unit 108 and processed in the same manner as in the first implementation. The hydrogen production subsystem 103 produces a hydrogen stream 146 and an oxygen stream 143. At least a portion of the oxygen stream 143 gets fed to the calciner 107 and the hydrogen product stream 146 is split; a portion 1764 goes to the SGR unit 111 and a portion 1753 gets sent downstream, to mix with the syngas 148 before being cooled in a heat exchanger unit 114 and sent to the Fischer-Tropsch unit 112. Water 156 is removed in the SGR unit 111 and is cooled in a heat exchanger 715 before being recycled, along with any excess water from Fischer-Tropsch unit 112, as water 850 to the $H_2O$ source unit 109 for use as needed in the system 700, e.g. for use in the slaker 106 and the hydrogen production subsystem 103. Alternatively or additionally, the water 157 can be diverted directly to the SOEC unit 710 upstream of the heat exchanger 715, to provide heat energy and hydrogen feedstock.

Figure 9:
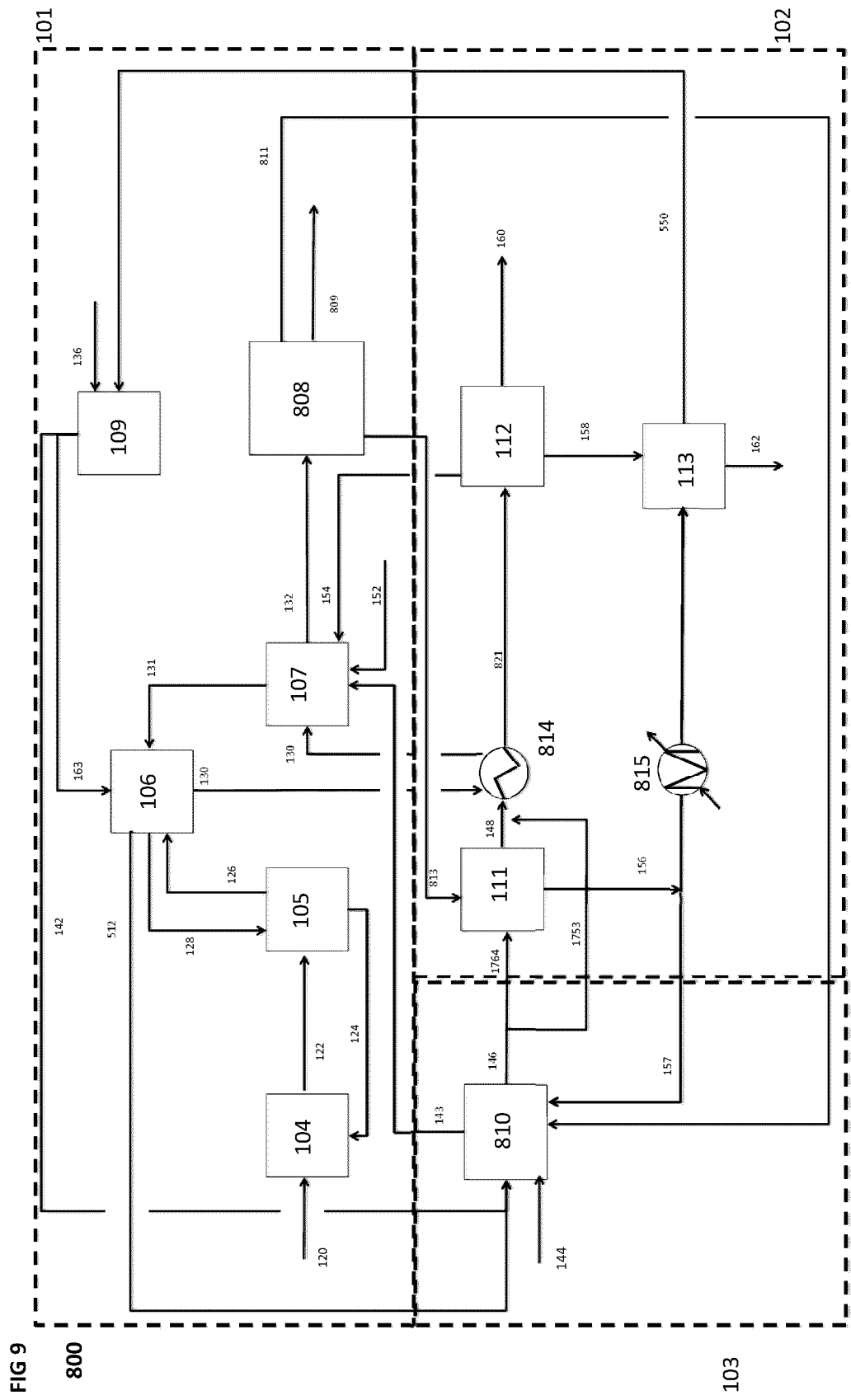
FIG. 9 is a schematic block diagram of a system for producing a synthetic fuel from hydrogen and carbon dioxide, according to an eighth implementation, wherein heat energy from the synthetic fuel production subsystem is used to heat a material flow in the $CO_2$ capture subsystem, heat energy and water produced by the $CO_2$ capture sub-system can be used by the hydrogen production subsystem and provide hot $CO_2$ product gases to the synthetic fuel production subsystem.

Referring now to FIG. 9 and according to an eighth implementation, a synthetic fuel production system 800 includes the $CO_2$ capture subsystem 101, the hydrogen production subsystem 103 and the synthetic fuel production subsystem 102. All components in the system 800 are substantially the same as in the first implementation system 100 illustrated in FIG. 1, with the exceptions being that within the $CO_2$ capture subsystem 101, the calciner gaseous product stream 132 is sent through a high temperature solids removal and clean up unit 808, where any solids particles are removed 809 and water (steam) is separated using a high temperature water removal membrane. The steam 811 is sent over to an SOEC unit 810 within the hydrogen production subsystem 103 to provide heat energy and hydrogen feedstock. In this sense, the stream 811 serves as a water conduit that transfers material from one subsystem ($CO_2$ capture subsystem) to another subsystem ($H_2$ production subsystem). The other hot product gases 813 ($CO_2$, trace $O_2$) are sent to the SGR unit 111 within the synthetic fuel system 102, for use as heat energy, and $CO_2$ feedstock. Similar to the second and sixth implementations, the SGR unit 111 in this implementation must be operating at a low pressure of slightly above atmospheric, as the hot $CO_2$ product stream 132 coming from the calciner unit 107 is operated at near atmospheric conditions, and any compression required to feed into a higher pressure SGR unit 111 would involve cooling the stream 813 down significantly, taking away the advantage of having the hot product stream 813 feed directly into the SGR unit 111. This direct feeding method is done in such a way to avoid substantially cooling the stream 813. If needed, the steam supply to the hydrogen production subsystem 103 can be supplemented with steam 512 generated in the slaker unit 106, water 142 from the water treatment and source unit 109, or a combination of these two sources. The supplied steam provides heat energy and at least a portion of the hydrogen feedstock, and the supplied water can provide at least a portion of the hydrogen feedstock.

The hydrogen production subsystem 103 produces a hydrogen stream 146 and an oxygen stream 143. At least a portion of the oxygen stream 143 gets fed to the calciner 107 and the hydrogen stream 146 is split; a portion is fed directly to the SGR unit 111 as stream 1764, and the rest bypasses the SGR unit 111 as stream 1753, and joins the syngas stream 148 upstream of a heat exchanger unit 814, wherein heat is transferred from the syngas stream 148 to the $CaCO_3$ pellet stream 130, such that the combined syngas and hydrogen stream 821 is cooled from about 800° C. to about 350° C., and the pellet stream 130 is preheated from about 350° C. to about 750° C. before being fed into the calciner 107. Examples of a few types of heat exchange designs that may be used to accomplish this form of process heat exchange without incurring metal dusting issues commonly encountered with syngas are described in FIGS. 22,23,27-29. The combined syngas and hydrogen stream 821 proceeds to the Fischer Tropsch unit 112. Water 156 is removed in the SGR unit 111 and is cooled in a heat exchanger unit 815 before going through a clean-up unit 113 and is then recycled as water 550 to the water treatment and source unit 109 for use as needed in the system 800. Alternatively or additionally, the water 157 can be diverted directly to the SOEC unit 810 upstream of the heat exchanger 815, to provide heat energy and hydrogen feedstock.

Figure 10:
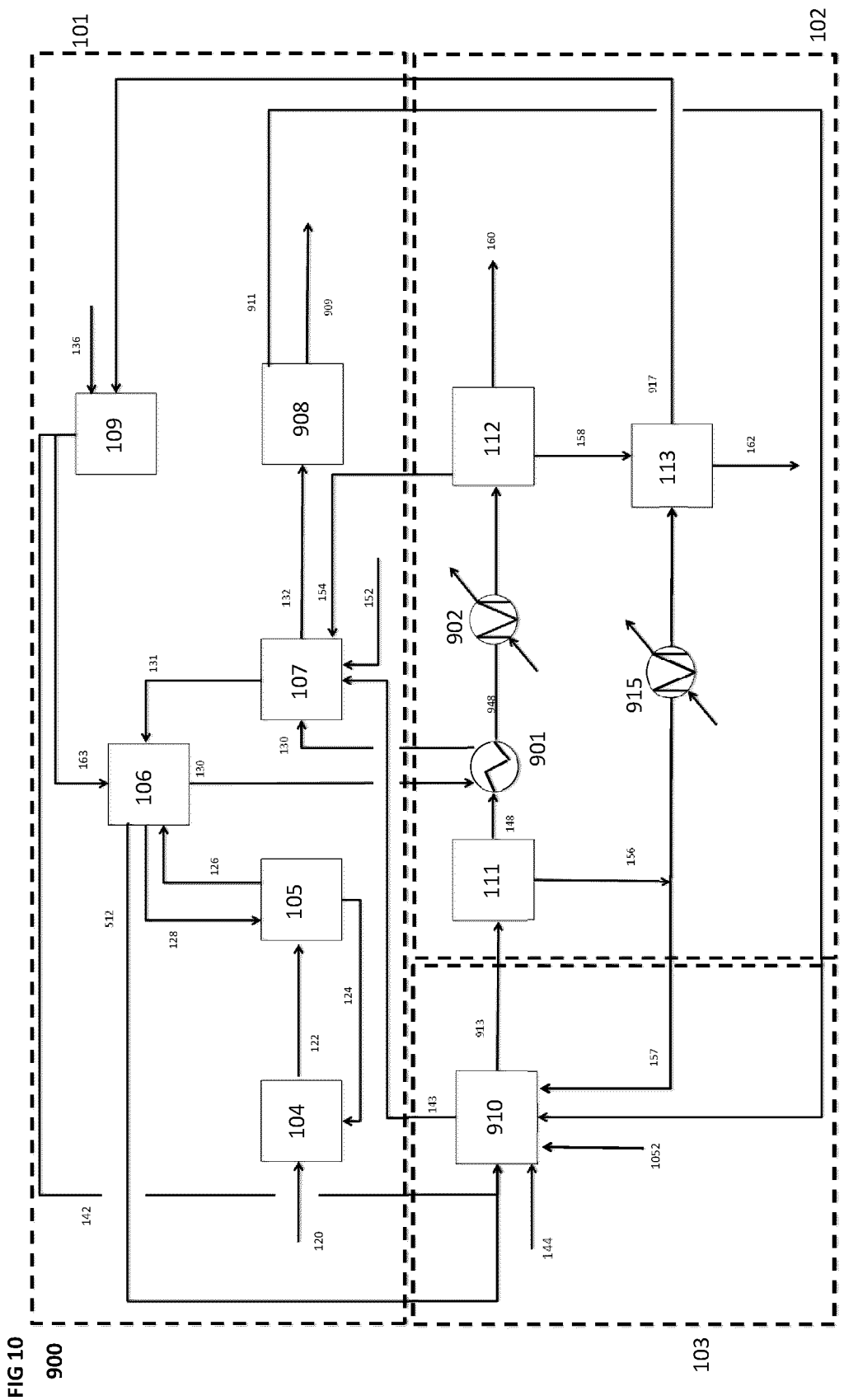
FIG. 10 is a schematic block diagram of a system for producing a synthetic fuel from hydrogen and carbon dioxide, according to a ninth implementation, wherein hot product gases from the $CO_2$ capture sub-system are fed to the hydrogen production subsystem, heat energy from the synthetic fuel production subsystem is used to heat a material flow in the $CO_2$ capture subsystem $CO_2$.

Referring now to FIG. 10 and according to a ninth implementation, a synthetic fuel production system 900 includes the $CO_2$ capture subsystem 101, the hydrogen production subsystem 103 and the synthetic fuel production subsystem 102. All components in the system 900 are substantially the same as in the first implementation of the system 100 illustrated in FIG. 1, with the exceptions being that within the $CO_2$ capture subsystem 101, the hot calciner gaseous product stream 132 is sent through a high temperature solids removal and clean up unit 908, similar to that of the second and fifth implementations, which removes particles 909 only, after which a hot gas stream 911 (including $CO_2$, $H_2O$, $O_2$) is sent directly to the hydrogen production subsystem 103 within which the gas stream is fed into a high temperature SOEC unit 910, for use as input energy and hydrogen feedstock. Additional energy 1052 can be provided to the SOEC unit 910 by an external source, such as a renewable energy source. If needed, the steam supply to the hydrogen production subsystem 103 can be supplemented with steam 512 generated in the slaker unit 106, water 142 from the water treatment and source unit 109, or a combination of these two sources.

At least a portion of the by-product oxygen stream 143 from the SOEC unit 910 is sent to the oxy-fired calciner 107 and another product stream 913 containing $CO_2$, $H_2$ and CO, is sent to the SGR unit 111. The water by-product stream 156 from the SGR unit 111 is cooled in a heat exchanger unit 915, and is then cleaned up in clean up unit 113 and sent back to the $H_2O$ source unit 109 as part of stream 917 for reuse within the overall system 100. Additionally, at least a portion of the by-product water stream 157 can be diverted upstream of the heat exchanger unit 915 and fed directly to the SOEC unit 910. The syngas product stream 148 from the SGR unit 111 is sent to a heat exchanger unit 901 where it exchanges heat to the $CaCO_3$ pellet stream 130 from the slaker unit 106, causing the syngas product stream 148 to cool from about 800° C. to about 350° C., and causing the pellet stream to be preheated from about 350° C. to about 750° C. The cooled product gas stream 948 may get further cooled in a heat exchanger unit 902 before being sent to the Fischer Tropsch unit 112, while the heated pellet stream 130 is fed into the calciner 107.

Figure 11:
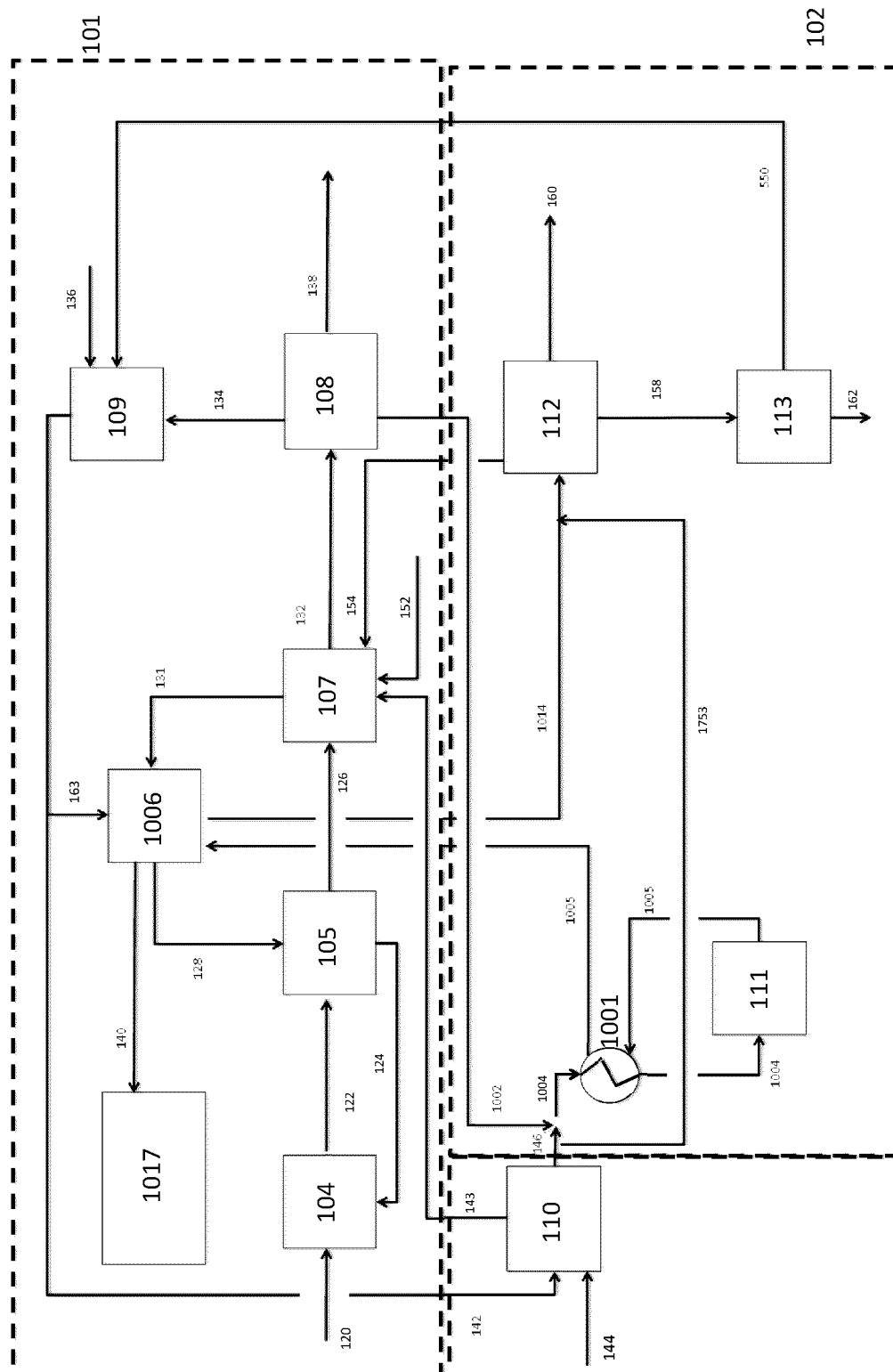
FIG. 11 is a schematic block diagram of a system for producing a synthetic fuel from hydrogen and carbon dioxide, according to a tenth implementation, wherein water in a material stream in the synthetic fuel production subsystem is removed by the $CO_2$ capture subsystem, and a material stream in the the synthetic fuel production subsystem is preheated using heat from a syngas generation reactor ("SGR") unit in the synthetic fuel production subsystem.

Referring now to FIG. 11 and according to a tenth implementation, a synthetic fuel production system 1000 includes the $CO_2$ capture subsystem 101, the hydrogen production subsystem 103 and the synthetic fuel production subsystem 102. All components in the system 1000 are substantially the same as in the first implementation of the system 100 illustrated in FIG. 1, with the exceptions being that some of the hydrogen product stream 146 from the hydrogen production subsystem 103 is combined with a cooled product stream 1002 including $CO_2$, $O_2$ from the solids removal and clean up unit 108 to produce a combined product stream ("SGR feed stream") 1004, including gas species such as $H_2$, $CO_2$, $O_2$, that is then sent through a preheat exchanger unit 1001 and then into the SGR unit 111 which in this implementation includes an RWGS reactor. The SGR unit 111 outputs a hot SGR product stream 1005 (including gas species such as CO, $H_2$, $H_2O$ and $CO_2$) which is then fed into the preheat exchanger unit 1001, wherein heat is transferred from the SGR product stream 1005 to the SGR feed stream 1004, thereby preheating the SGR feed stream 1004 from about 350° C. to about 750° C. and cooling the SGR product stream 1005 from about 800° C. to 300° C.

After the SGR product stream 1005 leaves the heat exchanger unit 1001, it flows through a slaker 1006 within the $CO_2$ capture subsystem 101 where water is removed therefrom; this water may be used by the slaker 1006 in a hydrating reaction to form the $Ca(OH)_2$ slurry 128. In this sense, the SGR product stream 1005 serves as a water conduit that transfers material from one subsystem (synthesis gas production subsystem) to another subsystem ($CO_2$ capture subsystem). The steam slaker unit 1006 sends any excess steam 140 to a steam unit 1017 which can be used to generate power or provide input energy, water or a combination of both, to other parts of the system 1000. The dewatered SGR product stream 1014 leaves the steam slaker and heads back to the synthetic fuel production subsystem 102 where it combines with the rest of the hydrogen stream 1753 from the hydrogen production subsystem 103 and the combined stream then feeds into the Fischer Tropsch unit 112.

Figure 12:
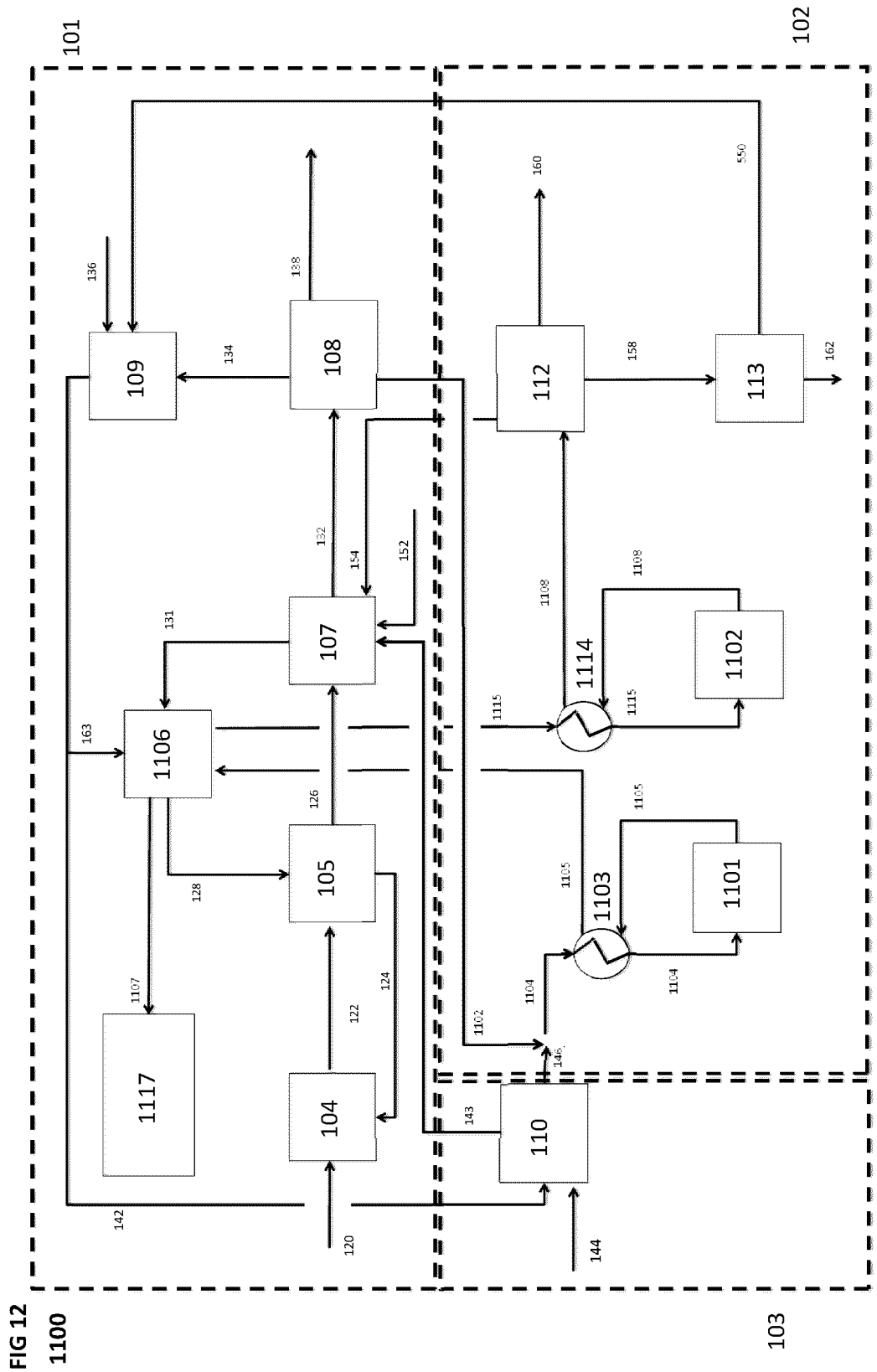
FIG. 12 is a schematic block diagram of a system for producing a synthetic fuel from hydrogen and carbon dioxide, according to an eleventh implementation, wherein water in a material stream in the synthetic fuel production subsystem is removed by the $CO_2$ capture subsystem, and material streams in the the synthetic fuel production subsystem are preheated using heat from multiple SGR units in the synthetic fuel production subsystem.

Referring now to FIG. 12 and according to an eleventh implementation, a synthetic fuel production system 1100 includes the $CO_2$ capture subsystem 101, the hydrogen production subsystem 103 and the synthetic fuel production subsystem 102. All components in the system 1100 are substantially the same as in first implementation of the system 100 illustrated in FIG. 1, with the exceptions being that the hydrogen product stream 146 from the hydrogen production subsystem 103 is combined with a product stream 1102 including gas species such as $CO_2$, $O_2$ from the solids removal and clean up unit 108 to produce a combined gas product stream ("first SGR feed stream") 1104 (including gas species such as Hz, $CO_2$, $O_2$) that is then sent through a first preheat exchanger unit 1103. This first preheat exchanger unit 1103 takes the hot product gas stream (including gas species such as $H_2O$, CO, $CO_2$) 1105 from a first stage SGR unit 1101 ("first SGR product stream") and uses it to preheat the first feed stream 1104 from about 350° C. to about 750° C. After the first SGR product stream 1105 leaves the first preheat exchanger unit 1103 and is cooled from about 800° C. to 350° C., it is then sent to a steam slaker unit 1106 within the $CO_2$ capture subsystem 101 where water is removed therefrom and may be used in the hydrating reaction to form the $Ca(OH)_2$ slurry 128. The steam slaker unit 1106 sends any excess steam 1107 to a steam unit 1117, which can generate power or provide input energy, water or both to other parts of the system 1100. The dewatered first SGR product stream 1115 leaves the steam slaker unit 1106 and heads back to the synthetic fuel production subsystem 102 where it serves as a feed stream for a second preheat exchanger unit 1114, which has the same function as the first heat exchanger unit 1103. The preheated feed stream 1115 enters a second stage SGR unit 1102, and the resulting second SGR product stream 1108 heads through the preheat exchanger unit 1114 and then is fed into the Fischer Tropsch unit 112.

While a two stage SGR/heat exchanger arrangement, which can serve as a multiple-stage SGR assembly, is shown in FIG. 12, in alternative implementations more or less SGR stages and intercooling or preheating exchangers can be provided.

Figure 13:
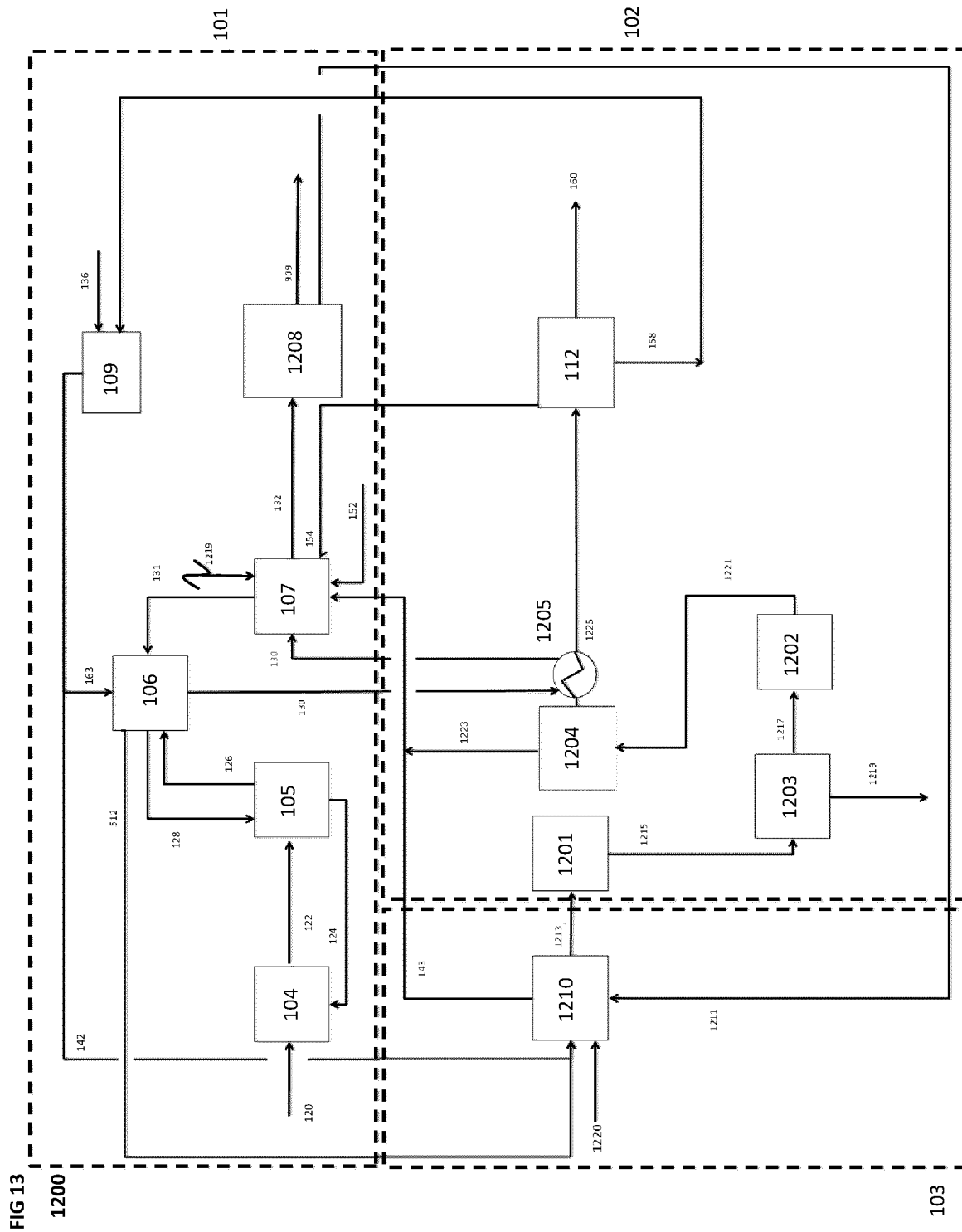
FIG. 13 is a schematic block diagram of a system for producing a synthetic fuel from hydrogen and carbon dioxide, according to a twelfth implementation, wherein hot product gases from the $CO_2$ capture subsystem are fed to a first hydrogen production subsystem, the water in the product streams from multiple stages of SGR units within the synthetic fuel production subsystem is removed by multiple stages of high temperature hydrogen units placed in alternating sequence between the SGR stages, the hot $O_2$ from the the hydrogen production subsystem stages are combined and used for combustion by the $CO_2$ capture subsystem, and heat energy and water produced by the $CO_2$ capture subsystem can be used by the hydrogen production subsystem.

Referring now to FIG. 13 and according to a twelfth implementation, a synthetic fuel production system 1200 includes the $CO_2$ capture subsystem 101, the hydrogen production subsystem 103 and the synthetic fuel production subsystem 102. All components in the system 1200 are substantially the same as in the system 100 illustrated in FIG. 1, with the exceptions being that within the $CO_2$ capture subsystem 101, the hot calciner gaseous product stream 132 is sent through a high temperature solids removal and clean up unit 1208, similar to that described in the second, fifth and ninth implementations, after which a product gas stream 1211 (including for example $CO_2$, $H_2O$, trace $O_2$) is sent directly to the hydrogen production subsystem 103 within which it is fed into a first high temperature SOEC unit 1210. The hot product stream 1211 provides input energy and the hydrogen feedstock for the SOEC unit 1210. Additional energy can be provided by an external source 1220, such as from a renewable energy source. If needed, the steam supply to the hydrogen production subsystem 103 can be supplemented with steam 512 generated in the slaker unit 106, water 142 from the water treatment and source unit 109, or a combination of both.

At least a portion of the by-product oxygen stream 143 is sent to the oxy-fired calciner 107 and the other product gas stream 1213 (first SOEC product stream), including for example $CO_2$, $H_2$ and CO, is sent to a first stage SGR unit 1201 which in this implementation includes an RWGS reactor. The resulting first SGR product gas stream 1215 (including, for example, $H_2O$, CO, $CO_2$, $O_2$, $H_2$) is then sent through a second high temperature SOEC unit 1203 to convert the water into $H_2$ and $O_2$, thereby producing a second SOEC product gas stream 1217 including species such as CO, $CO_2$, $H_2$ and $O_2$. At least a portion of the by-product oxygen stream 1219 from the SOEC unit 1203 is sent to the calciner unit 107 while the second SOEC product stream 1217 is sent to a second stage RWGS unit 1202. The product gas stream 1221 from the second stage RWGS unit 1202 ("second SGR product stream") including, for example, $H_2O$, CO $H_2$ may be sent to a third high temperature SOEC unit 1204. At least a portion of the resulting by-product oxygen stream 1223 may be sent to the calciner unit 107 and the remaining syngas 1225 is sent to a heat exchanger unit 1205 where it exchanges heat with the $CaCO_3$ pellets stream 130 from the slaker unit 106 within the $CO_2$ capture subsystem 101. The cooled syngas stream 1225 heads from the heat exchanger unit 1205 to the Fischer Tropsch unit 112 and the heated pellet stream 130 heads to the calciner unit 107.

While a three stage SGR/heat exchanger arrangement, which can serve as a multiple-stage SGR assembly, is shown in FIG. 13, in alternative implementations more or less SGR stages and intercooling or preheating exchangers can be provided.

Figure 14:
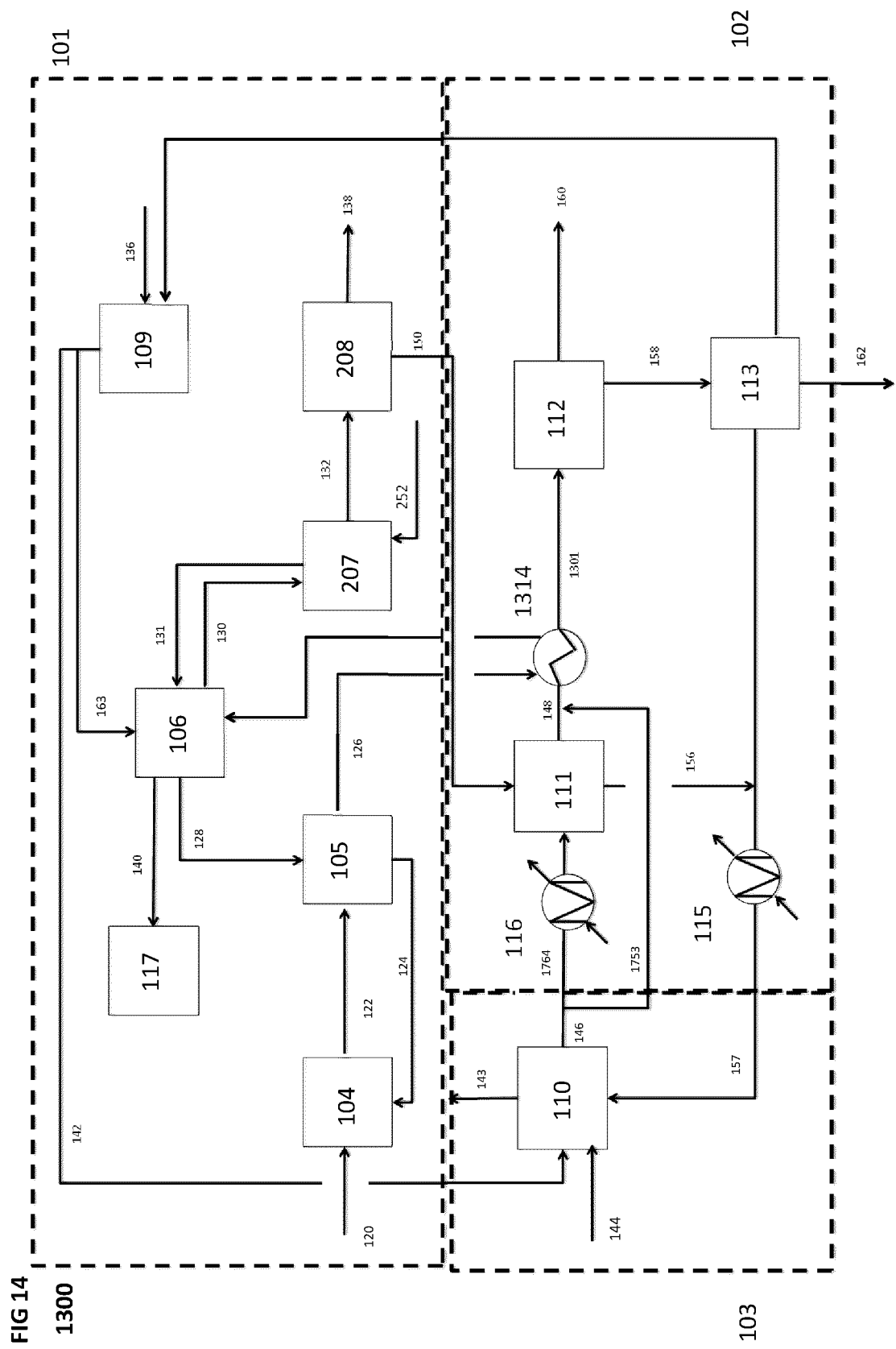
FIG. 14 is a schematic block diagram of a system for producing a synthetic fuel from hydrogen and carbon dioxide, according to a thirteenth implementation, wherein heat energy from the synthetic fuel production subsystem is used to heat a material stream in the $CO_2$ capture subsystem, at least a portion of the energy required in the $CO_2$ capture subsystem is supplied by renewable sources and heat energy produced by the $CO_2$ capture subsystem is used to provide hot $CO_2$ for the synthetic fuel production subsystem.

Referring now to FIG. 14 and according to a thirteenth implementation, a synthetic fuel production system 1300 includes the $CO_2$ capture subsystem 101, the hydrogen production subsystem 103 and the synthetic fuel production subsystem 102. All components in the system 1300 are substantially the same as in the first implementation of the system 100 illustrated in FIG. 1, with the exceptions being that within the $CO_2$ capture subsystem 101, the second implementation of the calciner 207 and the solids removal and clean up unit 208 are used. As noted previously the calciner 207 is powered by renewable energy, and the solids removal and clean up unit 208 operates at much higher temperatures than the unit of the first implementation, and as such incorporates filter materials that can handle higher temperatures, such as ceramic fiber elements, refractory material, ceramic wollastonite, or ceramic fibres of an alumino-silicate composition. The hot $CO_2$ product stream 150 leaving the solids removal and clean up unit 208 can then be directly fed into the SGR unit 111 without needing preheating exchangers and/or with less heat needing to be supplied to the SGR unit 111. The hydrogen stream 146 from the $H_2$ production unit 103 is split; a portion can be fed directly to the SGR unit 111 as stream 1764, and a portion can bypass the SGR unit 111 as stream 1753, combining with the product gas stream 148 from the SGR unit 111 upstream of a heat exchanger unit 1314. The gas mixture is then sent through a heat exchange unit 1314 which exchanges heat between the gas stream and a $CaCO_3$ pellet stream 126 from the pellet reactor unit 105. The cooled mix of hydrogen and syngas stream 1301 heads from the heat exchanger unit 1314 to the Fischer Tropsch unit 112 and the heated pellet stream 126 then heads to the slaker unit 106. The by-product oxygen stream 143 from the hydrogen production subsystem 103 is not sent to the calciner unit and instead can be used to oxy-fire turbines for power, oxy-fire the heating needs for the SGR 111, sent to an external end user, or a combination of these options.

In some implementations, the $CaCO_3$ pellets are first sent to the slaker and then sent to a heat exchanger unit 1314. In other implementations, the synthetic fuel production subsystem 102 may include a different SGR unit instead of or in combination with the SGR unit 111, such as an ATR, a partial oxidation reactor, DMR, a SMR or a modified RWGS unit to properly handle oxy-firing.

Referring to FIG. 15 and according to a fourteenth implementation, a synthetic fuel production system 1500 includes the same hydrogen production subsystem 103 and synthetic fuel production subsystem 102 as in the previous implementations, but a different type of $CO_2$ capture subsystem 1501. More particularly, the $CO_2$ capture subsystem 1501 uses a different liquid chemistry process and equipment to extract the $CO_2$ molecules form the air, namely $CO_2$ lean aqueous capture solution 1503. $CO_2$ is extracted from the air using an air contactor 1504, which outputs a $CO_2$ rich aqueous capture solution 1510 to a solution processing unit 1505. A processed $CO_2$ rich aqueous capture solution 1514 is then fed to a DAC regeneration unit 1507, which produces a regenerated capture solution 1513 and a product stream 1515 including $CO_2$ and $H_2O$, which is then fed to a water recovery unit 1508, to extract water and a dry $CO_2$ product stream 1517. The water is fed to the water treatment and source unit 109 via water stream 1534 for use as needed in the overall system, such as water 1519 to the solution processing unit 1505 and/or as feedstock for the hydrogen production subsystem 103. The $CO_2$ product stream 1517 is sent to a SGR 1511 of the synthetic fuel production subsystem 102 for use in the same manner as in previous implementations.

The DAC regeneration unit 1507 may include stripper reactors, heat recovery steam generators, boilers, reboilers, condensate treatment units, heat exchangers and makeup chemicals. The solution processing unit 1505 may include one or more of electrically powered membrane units, including for example electrodialysis, reverse osmosis and nano-filtration units, thermally driven evaporators and filtration units. Steam 1521 generated in the synthetic fuel production subsystem 102 may be used to strip $CO_2$ and regenerate sorbent in $CO_2$ capture subsystem 1501 (e.g. from one or more of the Fischer-Tropsch unit 1512 and the SGR 1511). Also, light end hydrocarbon byproducts 1523 produced by the Fischer-Tropsch unit 1512 can be used as fuel by the regeneration unit 1507. In this sense, the stream 1523 serves as a fuel conduit that transfers the fuel from the synthetic fuel production subsystem to the regeneration unit 1507. Additionally or alternatively, some of the $H_2$ and $O_2$ produced by the hydrogen production subsystem 103 may be used to heat the regeneration unit 1507 via combustion of $H_2$ stream 1525 and $O_2$ stream 1527.

Fuel synthesis machines, such as Fischer-Tropsch reactors, may be used directly as reboilers in the DAC regeneration unit 1507. The regeneration unit 1507 may be oxy-fired, electrically heated or may use waste heat and/or steam from other sub systems. Additionally, the $CO_2$ rich aqueous capture solution 1510 may be used as a cooling liquid for the synthetic fuel production subsystem 102 e.g. by the Fischer-Tropsch unit 1512 (not shown). Referring to FIG. 16 and according to a fifteenth implementation, a synthetic fuel production system 1600 includes the same hydrogen production subsystem 103 and synthetic fuel production subsystem 102 as in the previous implementations, but a different type of $CO_2$ capture subsystem 1601. More particularly, the $CO_2$ capture subsystem 1601 uses solid sorbent technology, and includes a solid sorbent air contactor 1604, a steam generation unit 1607 and a water removal unit 1608. The $CO_2$ capture subsystem 1601 still sends a $CO_2$ stream 1617 to the synthetic fuel production subsystem 102 as in the previous implementations. In this $CO_2$ capture subsystem 1601, steam 1609 is used as a heat source to release the $CO_2$ and regenerate the solid sorbent. The steam may be generated via heat recovery steam generators, boilers, reboilers, directly via steam from fuel synthesis unit and/or may include condensate treatment units, heat exchangers and makeup chemicals. In particular, steam 1621 generated in the synthetic fuel production subsystem 102 (e.g. from Fischer-Tropsch unit 1612 and from the SGR 1611) can be supplied to the steam generation unit 1607 for this purpose.

The steam generation unit 1607 can be oxy-fired, electrically heated or use waste heat/steam from other sub systems. Also, light end hydrocarbon byproducts 1623 produced by the Fischer-Tropsch unit 1612 can be used as fuel by the steam generator unit 1607. Additionally or alternatively, some of the $H_2$ and $O_2$ produced by the hydrogen the production subsystem 103 may be used to heat the steam generation unit 1607 via $H_2$ stream 1625 and $O_2$ stream 1627.

A product stream 1615 including $CO_2$ and $H_2O$, which is then fed to a water removal unit 1608, to extract water and a dry $CO_2$ product stream 1617. The water is fed to the water treatment and source unit 109 via water stream 1634 for use as needed in the overall system, such as water 1619 to the steam generation unit 1607 and/or as feedstock for the hydrogen production subsystem 103.

Figure 18:
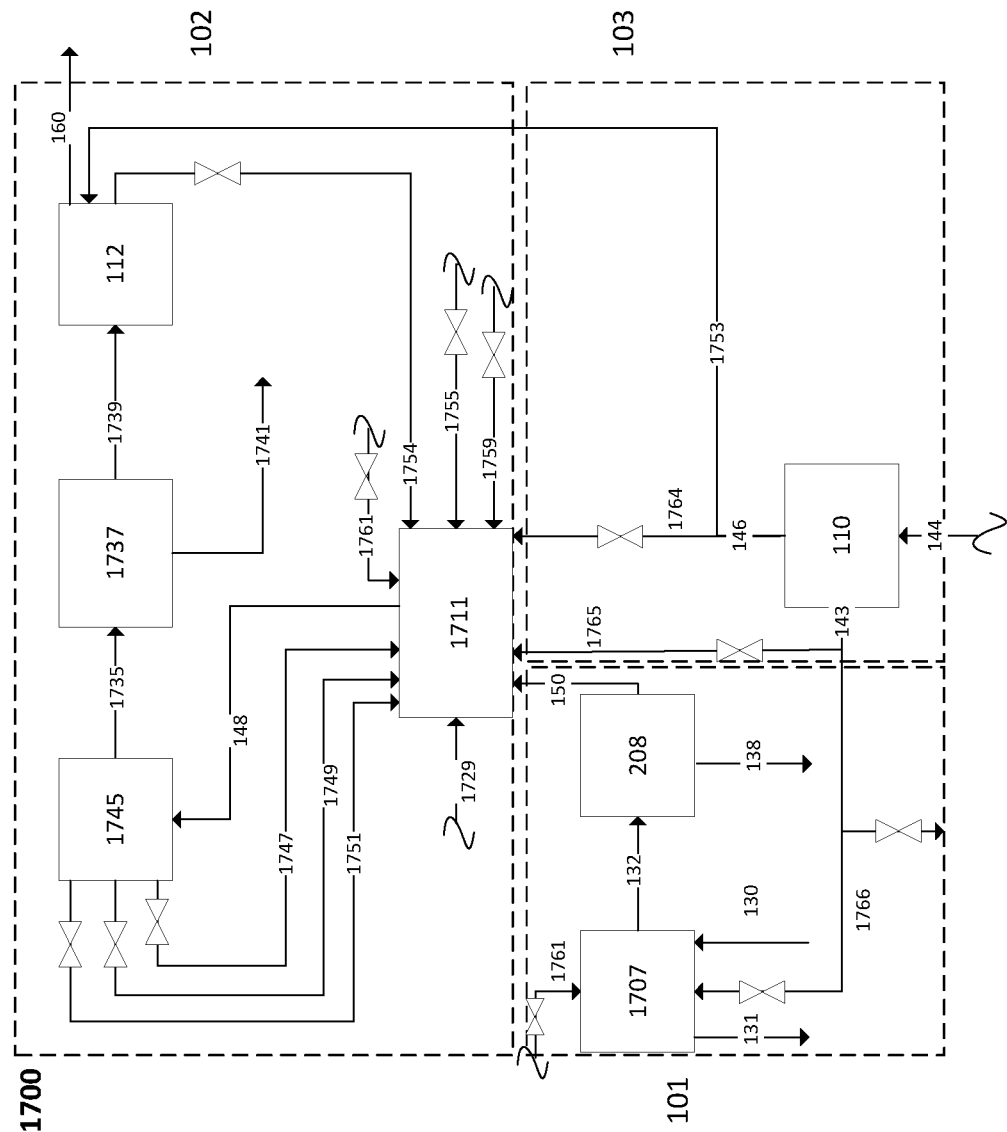
FIG. 18 is a schematic block diagram of a system producing a synthetic fuel from hydrogen and carbon dioxide, according to a seventeenth implementation, where the synthetic fuel production subsystem includes a low pressure SGR.

Referring now to FIG. 18 and according to a seventeenth implementation, a synthetic fuel production system 1700 includes the $CO_2$ capture subsystem 101, the hydrogen production subsystem 103 and the synthetic fuel production subsystem 102. Within the $CO_2$ capture subsystem 101, there is a calciner unit 1707, and the hot product gas stream 132 from calciner unit 1707 is sent to a high temperature solids removal and clean up unit 208. The high temperature solids removal unit 208 is similar to the high temperature solids removal units described in FIGS. 3, 7, 9 and 14 with the essential feature being the unit is able to transfer hot calciner product gases from the $CO_2$ capture subsystem 101 to the SGR unit 1711.

In this implementation, the SGR unit 1711 is a low pressure SGR unit, operating at pressures slightly above atmospheric. In this implementation, the synthetic fuel production subsystem 102 further includes a syngas treatment unit 1745, a compression unit 1737, and a Fischer Tropsch unit 112.

In some aspects, the hot calciner product stream 150 leaves the $CO_2$ capture subsystem 101 at approximately 850° C.-900° C. and can then be directly fed into an SGR unit 1711 that is operating at low pressure of slightly above atmospheric, without the need for cooling and compression, preheat exchangers and/or with less heat needing to be supplied to the SGR unit 1711. The method of directly feeding the hot calciner product stream 150 to the SGR unit 1711 is done in such a way to avoid substantially cooling the stream being fed to the SGR unit 1711.

In some aspects, operating the SGR unit 1711 at lower pressures, for example pressures at or below about 10 bar, may also enable methanation suppression within the SGR unit 1711. In addition, operating at lower pressures can reduce the operating temperature of the SGR unit 1711 from about 900° C. to about 850° C., which can enable a larger choice of materials for vessel construction, which in turn provides for more cost competitive capital cost of the SGR unit 1711.

In some cases, the SGR hot syngas product stream 148 leaving SGR unit 1711 is sent to a syngas treatment unit 1745 where the gaseous composition is adjusted by removing a portion of one or more of the $H_2O$, $CO_2$ and $H_2$ components such that the syngas stream 1735 leaving the syngas treatment unit 1745 has the desired ratio of $H_2$:CO for feeding the downstream Fischer Tropsch unit 112. In some aspects the syngas treatment unit can include common gas separation equipment, such as membranes, molecular sieves, pressure swing adsorption, thermal swing adsorption and the like.

In some cases, the treated syngas product syngas stream 1735 can then be sent to a compression unit 1737 where it is compressed up to the feed pressure for the Fischer Tropsch unit 112, of approximately 20 to 30 bar. Water produced as a by-product during compression leaves the compressor as stream 1741.

The components separated from the syngas stream 148 within the syngas treatment unit 1745, for example $CO_2$ stream 1749, $H_2$ stream 1751, $H_2O$ stream 1747 or a combination of these components, may be sent back, either separately or mixed, to the SGR unit 1711 as recycle stream(s).

The $H_2$ stream 146 produced by the $H_2$ generation unit 110 may be split into one or more hydrogen feed streams, for example streams 1764 and 1753, which can be sent to the SGR unit 1711 and the Fischer-Tropsch unit 112, respectively.

In some implementations, a portion of the necessary heat stream 1729 required for the SGR unit 1711 may come from a combustion operation, for example from one or more of air or oxy-combustion of a fuel source 1761. The fuel source stream 1761 may include components such as hydrogen, natural gas, light end hydrocarbons from the Fischer Tropsch unit 112 or a combination of the above.

In some cases, the heat stream 1729 required for the SGR unit 1711 might be electrically generated, for example through use of commercially available electric elements or heaters, including for example inline pipe electric preheaters.

In some aspects, in addition to the hot $CO_2$ feed stream 150 from the capture subsystem 101, the SGR unit 1711 may be fed one or more additional feed streams, including for example $H_2$ split stream 1764, recycled streams from the syngas treatment unit 1745, reactant feed streams such as a $CH_4$ stream 1759, a steam stream 1755, the Fischer-Tropsch light end hydrocarbon stream 1754 or a combination of these components. Furthermore, one or more of these feed streams may be used as the hydrogen source for the synthetic production subsystem 101, additionally or alternatively the use of one or more alternate feedstock streams may enable a reduction or elimination of the use of the hydrogen stream 1764 from the hydrogen generation unit 110.

In some implementations the $CH_4$ stream 1759 may be available as a less expensive reactant feed stream, and when the $CH_4$ stream 1759, the steam stream 1755, the light end hydrocarbon stream 1754 or any combination of these streams are fed to the SGR unit 1711, the SGR unit 1711 would then include at least a portion of RWGS, SMR reactions, DMR reactions or a combination of these reactions, to produce the syngas product stream 148. In some aspects using the $CH_4$ stream 1759 may be more economic than using the $H_2$ stream 1764, for example when renewable electricity is unavailable or expensive and using a $CH_4$ or Fischer Tropsch light end hydrocarbon source for reactant feedstock to the SGR unit 1711 (and operating the SGR unit 1711 at least in part as an SMR or DMR unit) is more cost effective than running the electrically driven hydrogen production subunit 110 and feeding the resulting $H_2$ stream 146 as feedstock to the synthetic fuel production subsystem 102.

In some aspects the low pressure SGR unit 1711 described within this implementation may be incorporated into any of the other implementations described in FIGS. 3, 7, 9, 14, 19, 22 and 23 where hot calciner product gases are sent directly (with or without being first transferred through a high temperature solids removal unit) to the SGR unit 1711 (ie without being cooled, compressed and reheated in between the calciner unit and SGR units).

In the implementation shown in FIG. 18, one or more of the SGR unit 1711 and calciner unit 1707 may require fuel to combust with the respective oxygen split-streams 1765 and 1766 to provide the operating heat for syngas production and calcination, respectively. In this sense, the oxygen split streams 1765 and 1766 serve as oxidant conduits that transfer material from the hydrogen production subsystem to the synthetic fuel production subsystem and the $CO_2$ capture subsystem, respectively. The fuel can be provided by an offsite hydrogen supply, hydrogen sourced from the hydrogen production subsystem 110, natural gas, Fischer Tropsch light end hydrocarbons from the Fischer Tropsch unit 112 or a combination of these components as stream 1761.

In the implementation shown in FIG. 18, the calciner unit 1707 may alternatively be heated electrically as is described in FIGS. 3, 14, and 24 through 26. In these cases, the $CO_2$ feed stream 132 going from the calciner 1707 to the SGR unit 1711 may have substantially less or no water content than when the calciner unit 1707 is heated using combustion of a fuel source, and as a result, the calciner product gas stream 132 may not require the same downstream components, for example water removal, prior to being sent to the SGR unit 1711.

Figure 19:
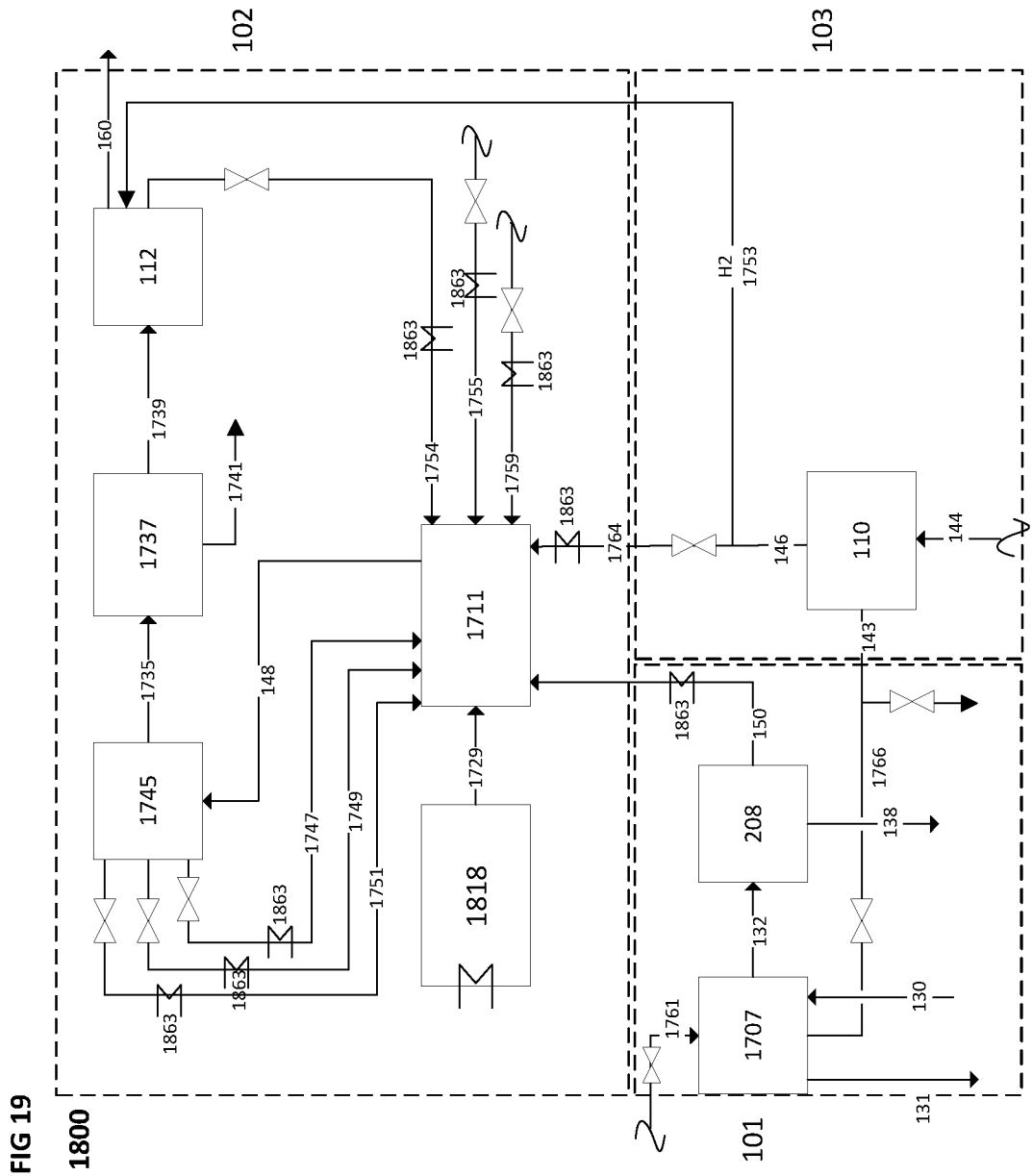
FIG. 19 is a schematic block diagram of a system producing a synthetic fuel from hydrogen and carbon dioxide, according to an eighteenth implementation, where the synthetic fuel production subsystem includes a low pressure SGR, and where at least a portion of the energy required in the synthetic fuel production subsystem is derived from electric sources.

Referring now to FIG. 19 and according to an eighteenth implementation, a synthetic fuel production system 1800 includes the $CO_2$ capture subsystem 101, the hydrogen production subsystem 103 and the synthetic fuel production subsystem 102. All the components of the system 1800 are substantially the same as in the seventeenth implementation of the system 1700 illustrated in FIG. 18, with the exception being that the low pressure SGR unit 1711 utilizes electricity to generate all necessary process heat. The synthetic fuel production subsystem 102 includes an electric indirect heater unit 1818 which provides heat stream 1729 to the SGR unit 1711.

In some aspects, one or more of the feed streams to the low pressure SGR unit 1711 are heated using high temperature electric heating components 1863, for example inline electric heaters, electrical heating tape or resistance heating wire, coils or elements, in some cases constructed from, for example a nickel chromium alloy. In some aspects, these types of electric heating components can operate at temperatures up to approximately 900° C. In some cases some types of heating wires can operate at higher temperatures in order to maintain flowing gas temperatures of about 900° C.

One example of commercially available types of inline electric heating products for heating gaseous feed streams may include a heater body constructed of stainless steel, provides heat up to approximately 900° C. and operate up to 4 bar gas pressure, utilizing a range of wattages up to 36 kW and 380 or 480 voltage in either single or three phase.

In some aspects, inline electrical heaters can be placed in parallel within the feed stream piping to enable more than one heater to share the heating load. Alternatively, and depending on the heat load, a longer overall length of the heater element can be used.

The energy requirement for the electric heater(s) can be calculated by the following simple formula:

$$E_h = (Q * \Delta T)/2500$$

Where $E_h$=Heater energy requirement (kW)
Q=gas flow rate (SCFM)
$\Delta T$=change in temperature (° F.)

In some aspects, when the SGR unit 1711 operates at lower pressure and temperatures (of up to approximately 10 bar and 850° C., respectively), the above mentioned methods of inline electrical heating of the feed streams are possible. In addition to inline heating of the SGR unit 1711 feed streams, the lower operating pressure of the SGR unit 1711 enables the SGR unit 1711 to operate at a lower operating temperature, for example when the SGR unit 1711 is operating as an RWGS reactor, which can then enable the RWGS reaction to proceed adiabatically to form syngas (for example by using the sensible heat in the inlet feed streams to drive the reaction). In some aspects this can result in a lower product outlet temperature of about 700° C. In some cases, this method of heating (electrically) is done instead of providing heat directly to the SGR unit 1711 by a burner unit combusting fuel in a radiant heat transfer zone.

When operated at a lower pressure the SGR unit 1711 can then operate at a lower temp without lowering the selectivity of the target syngas product.

Additionally, when the SGR unit 1711 operates at lower pressures, this enables operating at lower temperatures without risking a lower selectivity of the target syngas products. For example, some of the typical side reactions that take place in SGR units, such as the methanation side reaction, are reduced at lower temperatures when operating at lower pressures.

In some implementations, these indirect and electrically sourced heating methods may not work as well at higher temperatures, encountered for example with SGR units operating at higher pressures of between 20 bar to 40 bar, due to the temperature limitations of the electrical heating equipment.

In this implementation, the hot calciner product stream 150 leaves the $CO_2$ capture subsystem 101 at approximately 850° C.-900° C. and can then be directly fed into an SGR unit 1711 that is operating at low pressure of slightly above atmospheric, without the need for cooling and compression, preheat exchangers and in some cases with less external heat needing to be supplied to the SGR unit 1711. The method of directly feeding the hot calciner product stream 150 to the SGR unit 1711 is done in such a way to avoid substantially cooling the stream being fed to the SGR unit 1711.

In addition, operating at lower pressures can reduce the operating temperature of the SGR unit 1711 from about 900° C. to about 700° C., which can also enable a larger choice of materials for vessel construction, which in turn provides for more cost competitive capital cost of the SGR unit 1711.

In some aspects the low pressure electrically heated SGR unit 1711 described within this implementation may be incorporated into any of the other implementations described in FIGS. 3,7, 9, 14, 18, 22 and 23 where hot calciner product gases are sent (with or without being transferred through a high temperature solids removal unit 208 first) directly to the SGR unit 1711 (*ie* without being cooled, compressed and reheated in between the calciner unit and SGR units).

In the implementation shown in FIG. 19, the calciner unit 1707 may require fuel to combust with the oxygen source stream 1766 to provide the operating temperature for calcination. The fuel can be provided by an offsite hydrogen supply, hydrogen sourced from the hydrogen production subsystem 110, natural gas, Fischer Tropsch light end hydrocarbons from the Fischer Tropsch unit 112 or a combination of these components as stream 1761.

In some aspects, the low pressure electrically heated SGR unit 1711 described herein may be incorporated into any of the other implementations containing an electrically heated calciner, for example FIGS. 3, 14, and 24 through 26, such that most if not all external thermal heating requirements for the synthetic fuel production system 100 are supplied from an electric source, rather than from combustion of fuel. In some aspects, this can lower the carbon intensity of the Fischer Tropsch product stream 160, particularly when the electric source is derived from renewable energy such as hydro, solar, wind, nuclear, geothermal or a combination of these sources.

Figure 20:
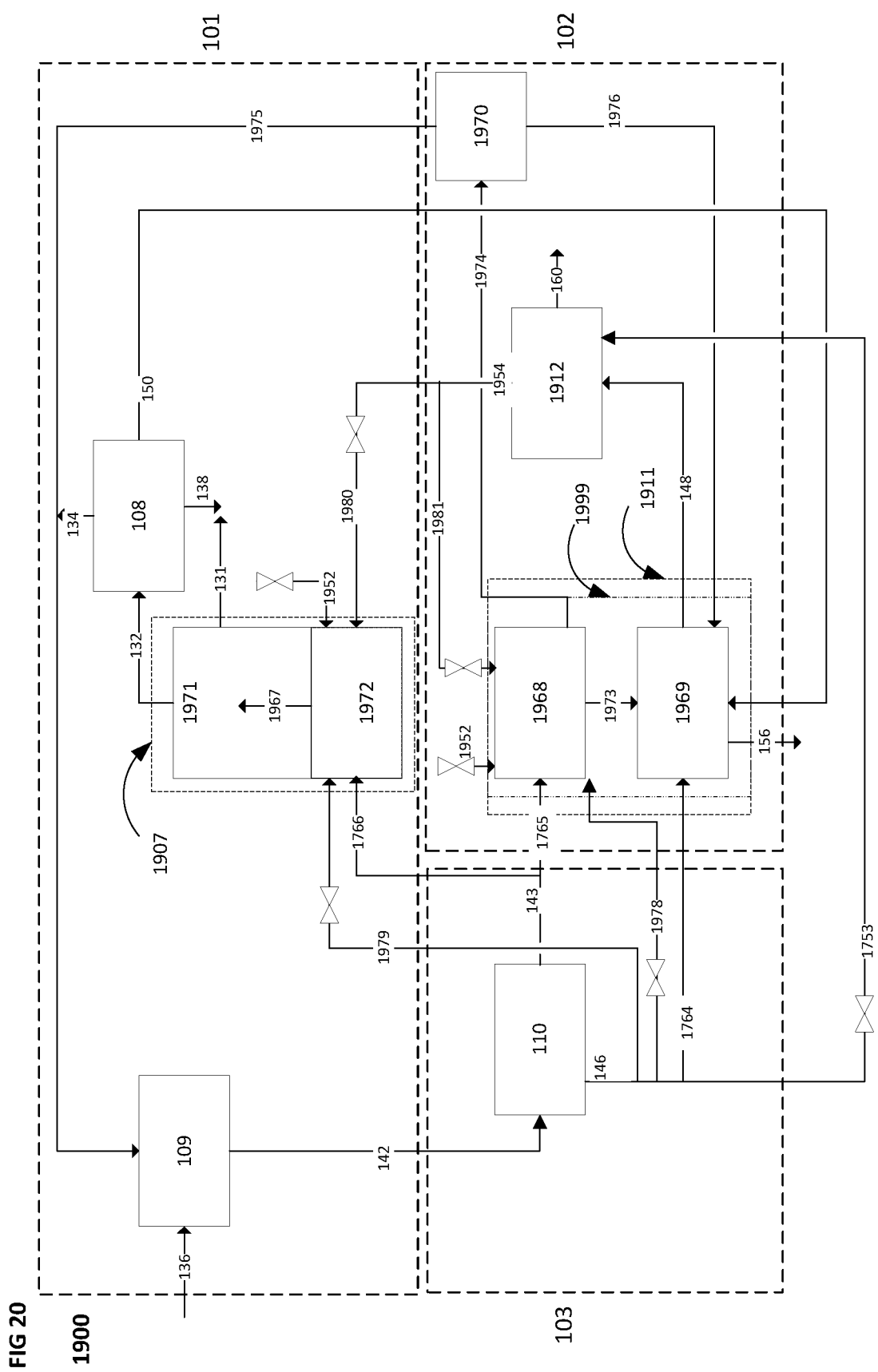
FIG. 20 is a schematic block diagram of a system producing a synthetic fuel from hydrogen and carbon dioxide, according to a nineteenth implementation, where a portion of the energy required in the $CO_2$ capture subsystem and the synthetic fuel production subsystem is derived from oxy-combustion of a fuel including hydrogen.

According to a nineteenth implementation, and referring to FIG. 20, the synthetic fuel production system 1900 includes the $CO_2$ capture subsystem 101, the hydrogen production subsystem 103 and the synthetic fuel production subsystem 102. The $CO_2$ capture subsystem 101 has an oxy-fired calciner 1907, solids removal and clean-up unit 108 and a water treatment unit 109, and the synthetic fuel production system 102 has an oxy-fired SGR unit 1911, a Fischer Tropsch unit 1912 and a compression and clean-up unit 1970. The oxy-fired calciner 1907 has a calciner burner unit 1972 and a calciner reactor vessel 1971. The SGR 1911 has an SGR burner unit 1968 and an SGR reactor vessel 1969.

The calciner 1907 requires fuel to combust with the oxygen stream 1766 to provide the 900° C. temperature for calcination within the calciner reactor 1971 and the SGR 1911 also requires fuel to combust with the oxygen stream 1765 to provide up to 900° C. temperature for the heat of reaction required for syngas production within the SGR vessel 1969. The calciner 1907 operates at atmospheric pressure while the SGR unit 1911 may operate at either low or high pressure depending on the application.

In some aspects, the oxy-fired calciner burner unit 1972 and SGR burner unit 1968 are fed oxygen, which may be partially or wholly provided by the oxygen by-product stream 143 of the hydrogen production subsystem 110, as streams 1766 and 1765, respectively. The fuel for both the calciner burner 1972 and SGR burner 1968 can be provided by a natural gas stream 1952 from an external supply, a hydrogen stream 146 from the $H_2$ production unit 110 within the hydrogen production subsystem 103, Fischer Tropsch light end hydrocarbons stream 1954, or a combination of these streams. The burner design for the calciner burner unit 1972 and the SGR burner unit 1968 can be selected to handle the different types of fuel used—for example, hydrogen fuel requires a burner design that can handle the combustion of hydrogen and its physical properties. These burner designs can be found in a variety of industrial applications.

In some aspects, both the fuel and the oxygen are supplied to the calciner burner unit 1972 and SGR burner unit 1968, which handle the combustion reaction and provide the resulting heat to the calciner reactor vessel 1971 and SGR reactor vessel 1969, respectively. The combustion reaction products will include $H_2O$, and for applications when at least one of the natural gas stream 1952 or Fischer Tropsch light ends hydrocarbon stream 1954 is in use, $CO_2$. The combustion reaction products will include a range of concentrations of $H_2O$ and $CO_2$, depending on the composition of the fuel source(s) used. For example, combustion of the natural gas fuel stream 1952 alone will produce slightly different products than when mixed with or replaced completely by the hydrogen fuel stream 146 from the $H_2$ Production unit 103.

The calciner burner unit 1972 is internal to the calciner reactor and, in fluid bed designs, is located in the solids bed zone, near the bottom of the reactor. In a calciner kiln design, the burner is located at the lower end near where the calcined material exits to a cooler. As a result of the burners being internal to the calciner reactor 1971, the hot combustion products stream 1967 is mixed and leaves with the calcination reaction products as stream 1932.

The SGR burner 1968 is, with the exception of an SGR configured for autothermal reforming (ATR), located externally to the SGR vessel 1969 and as such provides heat via stream 1973 to one or more SGR vessels 1969, from burners that can be located within in a furnace box 1999 that encases the one or more SGR vessel tubes (which contain the catalyst bed and through which the feed streams move). In an ATR design, the burners are located in a combustion zone located within the SGR vessel 1969 but upstream of the catalytic zones (not shown).

When the SGR burner 1968 is external to the SGR vessel 1969, the burner's combustion products, including for example $H_2O$, and $CO_2$ in applications when at least a portion of the natural gas stream 1952 is used for combustion, can be sent via stream 1974 to the compression and clean-up unit 1970, where any water present is removed as stream 1975 and the $CO_2$ gas stream 1976, if present, is compressed before being sent to the SGR vessel 1969 as a feed stream for the syngas reactions.

Both the calcium oxide solids stream 131 and calciner gaseous product stream 132 leaving the unit have temperatures of approximately 900° C.

In some aspects, the hot calciner gaseous product stream 132 is sent through a high temperature solids removal unit, similar to those in earlier implementations as described in FIGS. 3,7,9,18,19,22, and 23, so that the resulting solids-free, hot $CO_2$ product gas stream 150 can be sent directly to the SGR unit 1911, and in this case, the SGR unit 1911 would be operating at lower pressures, for example between atmospheric to about 10-12 bar, such that the stream 132 would not require cooling or compression prior to being fed into the SGR unit 1911.

In some aspects, the hot calciner gaseous product stream 132 is sent through a solids removal and clean-up unit 108, which may include a baghouse, electrostatic precipitator, a chiller, a heat exchanger, a condenser, or a combination of these components, where any water and impurities are removed as streams 134 and 138, respectively, prior to a cooled, compressed $CO_2$ product stream 150 being sent over to an SGR unit 1911 within the synthetic fuel production subsystem 102.

In some aspects, water streams 134, 1975, 156, water streams from other water removal units within the synthetic fuel production system 1900, or a combination of any of these streams can be sent to a water treatment and source unit 109 where they are cleaned up and recycled back into the overall system 1900. Make-up or supplemental water can be supplied to the water treatment and source unit 109 via an external source 136. Water from the water treatment and source unit 109 may be provided to other units within system 1900.

In some cases, the hydrogen production subsystem 103 includes a hydrogen generation unit 110 such as a water electrolyser, and is powered by a power supply such as a renewable source of electricity. This hydrogen generation unit 110 produces a hydrogen product stream 146 and a by-product oxygen stream 143 from a hydrogen feedstock stream 144 (for example water). At least a portion of the by-product oxygen stream 143 is sent to one or more of the oxy-fired calciner 1907 and the oxy-fired SGR 1911 as streams 1766 and 1765 respectively. At least a portion of the hydrogen product stream 146 can be sent as a fuel stream 1979 to the calciner burner 1972, as a fuel stream 1978 to the SGR burner 1968, or a combination of thereof. In addition to or instead of use as a fuel source, at least a portion of the hydrogen product stream 146 can be sent as a feed stream 1764 to the SGR unit 1911, as a feed stream 1753 to the Fischer Tropsch unit 1912 or a combination of these units, as either separate streams, or as a single stream fed first to the SGR unit 1911, where any unreacted hydrogen leaves the SGR unit 1911 with the product SGR gases in stream 148 and is then sent to the Fischer-Tropsch unit 1912. The syngas stream 148 is cooled down (not shown) before entering the Fischer-Tropsch unit 1912.

The hydrogen product stream 1753 and the syngas stream 148 are reacted within the Fischer-Tropsch unit 1912 to produce hydrocarbon products. Light end hydrocarbons stream 1954 produced by the Fischer-Tropsch unit 1912 can be sent back within the system 1900, for example to the oxy-fired calciner burner 2072 via split-stream 1980, to the oxy-fired SGR burner 2068 via split-stream 1981, or a combination thereof, to be used as fuel. In this sense, light end hydrocarbons split streams 1980 and 1981 serve as fuel conduits that transfer fuel from the synthetic fuel production subsystem to the calciner and the SGR respectively. Additionally or alternatively, at least a portion of the Fischer Tropsch light ends stream 1954 can be sent to the SGR vessel 1969 as a reactant feed (not shown). Heavier hydrocarbons are sent downstream for further processing or final product as stream 160.

Figure 21:
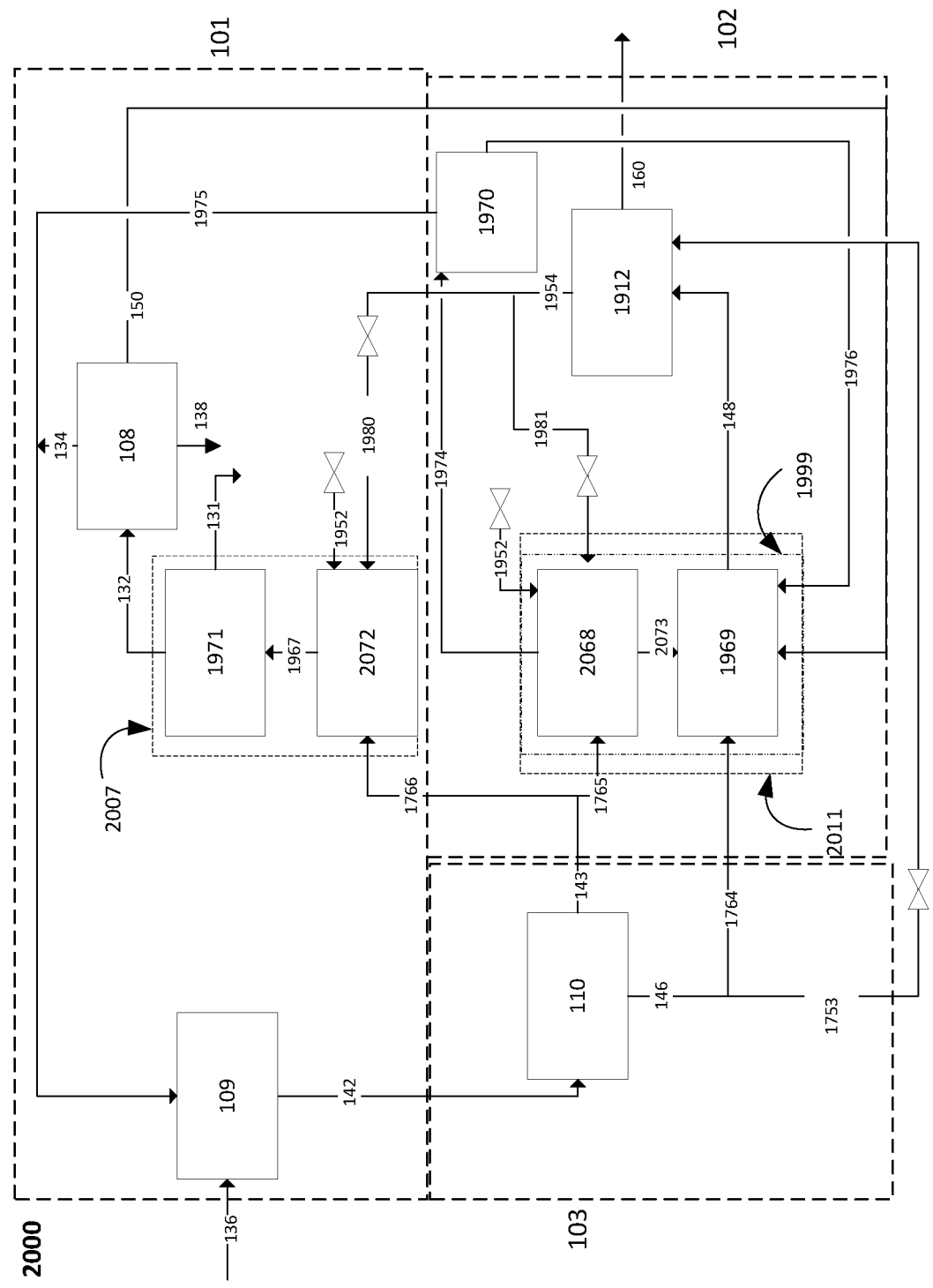
FIG. 21 is a schematic block diagram of a system producing a synthetic fuel from hydrogen and carbon dioxide, according to a twentieth implementation, where a portion of the energy required in the $CO_2$ capture subsystem and the synthetic fuel production subsystem is derived from oxy-combustion of a fuel including Fischer-Tropsch light end hydrocarbons.

According to a twentieth implementation, and referring to FIG. 21, the synthetic fuel production system 2000 includes the $CO_2$ capture subsystem 101, the hydrogen production subsystem 103 and the synthetic fuel production subsystem 102. The components within the synthetic fuel production system 2000 are similar to those described in the nineteenth implementation shown in FIG. 20, with the exceptions being that the SGR unit 2011 and calciner unit 2072 are oxy-fired with fuel sources other than hydrogen.

The calciner 2007 requires fuel to combust with the oxygen stream 1766 to provide the 900° C. temperature for calcination within the calciner reactor 1971 and the SGR 2011 also requires fuel to combust with the oxygen stream 1765 to provide up to 900° C. temperature for the heat of reaction required for syngas production within the SGR vessel 1969. The calciner 2007 operates at atmospheric pressure while the SGR unit 2011 may operate at either low or high pressure depending on the application.

In some aspects, the oxy-fired calciner burner unit 2072 and SGR burner unit 2068 are fed oxygen, which may be partially or wholly provided by the oxygen by-product stream 143 of the hydrogen production subsystem 103. In this sense, the calciner burner unit 2072 and the SGR burner unit 2068 serve as heaters, where they produce and transfer heat to the calciner reactor 1971 and the SGR vessel 1969, respectively.

The fuel for both the calciner burner 2072 and SGR burner 2068 can be provided by a natural gas stream 1952 from an external supply, a light end hydrocarbon by-products stream 1954 from a Fischer Tropsch unit 1912 within the synthetic fuel production subsystem 102, or a combination of these streams.

Both the fuel and the oxygen are supplied to the calciner burner unit 2072 and SGR burner unit 2068, which handle the combustion reaction and provide the resulting heat to the calciner reactor vessel 1971 and SGR reactor vessel 1969, respectively. The combustion reaction products will include $H_2O$ and $CO_2$, in a range of concentrations depending on the composition of the fuel source(s) used. For example, combustion of the natural gas fuel stream 1952 alone will produce slightly different products than when mixed with or replaced completely by the light end hydrocarbon by-product fuel stream 1954 from the Fischer Tropsch unit 1912.

The hydrogen production subsystem 103 includes a hydrogen generation unit 110 such as a water electrolyser, and is powered by a power supply such as a renewable source of electricity. This hydrogen generation unit 110 produces a hydrogen product stream 146 and a by-product oxygen stream 143 from a hydrogen feedstock stream 144 (e.g. water). At least a portion of the by-product oxygen stream 143 is sent to one or more of the oxy-fired calciner 2007 and the oxy-fired SGR 2011 as streams 1766 and 1765 respectively. The hydrogen product stream 146 can be sent as a feed stream 1764 to the SGR vessel 1969, as a feed stream 1753 to the Fischer Tropsch unit 1912 or a combination of these units, as either separate streams, or as a single stream fed first to the SGR vessel 1969, where any unreacted hydrogen leaves the SGR vessel 1969 with the product SGR gases in stream 148 and is then sent to the Fischer-Tropsch unit 1912. The syngas 148 is cooled down (not shown) before entering the Fischer-Tropsch unit 112.

The hydrogen product stream 1753 and the syngas stream 148 are reacted within the Fischer-Tropsch unit 1912 to produce hydrocarbon products. Light end hydrocarbons stream 1954 produced by the Fischer-Tropsch unit 1912 can be sent back within the system 1900, for example to the oxy-fired calciner burner 2072 via stream 1980, to the oxy-fired SGR burner 2068 via stream 1981, or a combination thereof, to be used as fuel. Additionally or alternatively, light end hydrocarbons stream 1954 can be sent to the SGR reactor vessel 1969 as a reactant feedstock (not shown), for example in the cases where the SGR reactor vessel is operating at least as a partial SMR or DMR.

In some implementations, the lighter hydrocarbons produced by the synthetic fuel production subsystem 102, for example by the Fischer-Tropsch unit 1912, may be recycled back within the synthetic fuel production subsystem 102. Heavier hydrocarbons are sent downstream for further processing or final product as stream 160.

Figure 22:
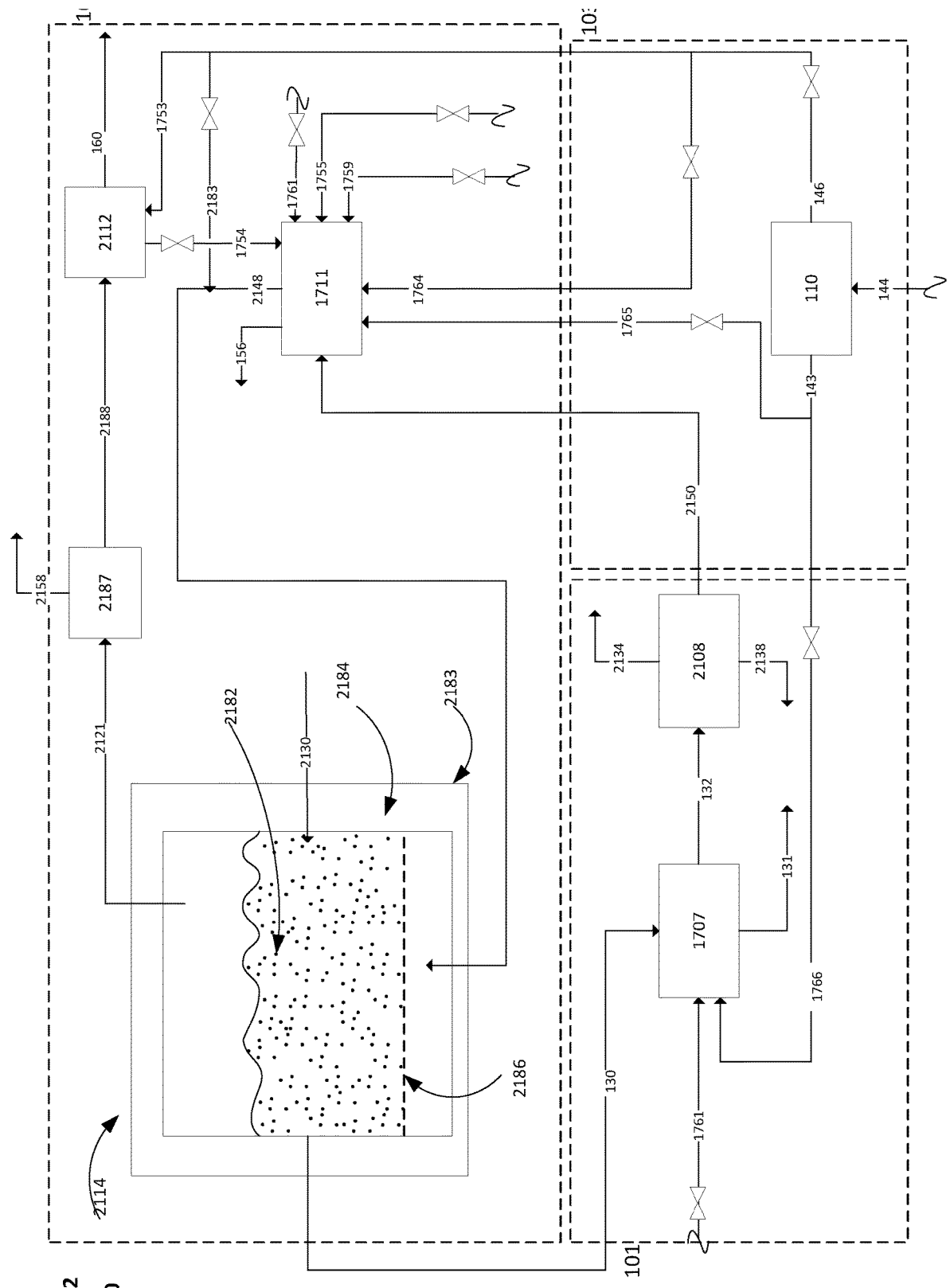
FIG. 22 is a schematic block diagram of a system producing a synthetic fuel from hydrogen and carbon dioxide, according to a twenty-first implementation, illustrating a method of transferring heat energy in a product stream in the synthetic fuel production subsystem to at least a portion of the material flow in the $CO_2$ capture subsystem.

According to a twenty-first implementation, and referring to FIG. 22, a synthetic fuel production system 2100 includes the $CO_2$ capture subsystem 101, the hydrogen production subsystem 103 and the synthetic fuel production subsystem 102. All the components of the system 2100 are substantially the same as in the first implementation of the system 100 illustrated in FIG. 1, with the exceptions being that the synthetic fuel production subsystem 102 in this implementation includes componentry such as a bubbling fluidized bed (BFB) preheat exchanger 2114, and a water knockout and compression unit 2187. The SGR unit 1711 is configured to operate as an RWGS reactor with the option of including one or more of SMR reactions, DMR reactions and the like, by taking in, in addition to $CO_2$ stream 2150, one or more feed streams including for example steam stream 1755, methane stream 1759, $H_2$ stream 1764, Fischer Tropsch light ends stream 1754, fuel stream 1761, depending on the mode of SGR operation required.

In some cases, the calcium carbonate pellet stream 2130, which could be coming for example from an upstream slaker unit or pellet reactor unit within the $CO_2$ capture subsystem 101, is preheated through the BFB preheating exchanger unit 2114. The BFB preheating unit 2114 can include components such as a distributor plate 2186, an outer vessel 2183, a refractory or ceramic lining 2184, and a bubbling bed zone 2182.

In this implementation, the SGR unit 1711 is configured as a low pressure SGR, operating at pressures slightly above atmospheric.

In some aspects, at least a portion of the hydrogen stream 146 can be sent directly to the Fischer Tropsch unit 2112 as stream 1753, and the SGR hot gaseous product stream 2148 is sent to the BFB preheating unit 2114, wherein it fluidizes the solid $CaCO_3$ material and heat is transferred from the hot syngas stream 2148 to the solid $CaCO_3$ material as they mix in the bubbling bed zone 2182. In some aspects, the syngas stream 2148 is cooled from about 900° C. to about 420° C. if, for example the pellet stream 2130 was preheated in an upstream slaker unit (not shown) and as such was then fed to the preheat exchanger 2114 at a higher temperature of about 300-350° C. In some aspects, the syngas stream 2148 is cooled from about 900° C. to about 150° C. if for example the pellet stream 2130 was not preheated in an upstream unit prior to entering the BFB preheating unit 2114, and as such was fed to the preheat exchanger 2114 at a lower, near ambient temperature, of about 10-25° C. The $CaCO_3$ material stream 2130 is heated in the BFB preheat exchanger 2114 from as low as ambient up to a maximum of about 800° C. before being fed into the calciner 1707. In some aspects, the hydrogen stream 2183 can be combined with the hot SGR stream 2148 upstream of the bubbling bed heat exchanger 2114. The cooled syngas stream 2121 leaves the BFB preheating unit 2114 and proceeds to a water knockout and compression unit 2187, where the moisture present in cooled syngas exits the unit 2187 as stream 2158. The cooled dry syngas is then compressed up to about 30 bar and leaves unit 2187 as stream 2188 and is sent to the Fischer Tropsch unit 2112. The heated $CaCO_3$ material stream 130 is transferred to the calciner unit 1707 for calcining.

BFB heat exchange equipment is frequently used in calcination processes, and can be constructed of refractory or ceramic lined vessels, with the external vessel 2183 being constructed out of inexpensive materials, for example including but not limited to carbon steel, as the external vessel is protected by the refractory lining from the high temperatures operating conditions. Using this type of direct heat exchange equipment enables direct heat transfer between the $CaCO_3$ pellets and hot fluid streams, and due to the nature of the materials interfacing within the unit, (ie the $CaCO_3$ pellets mix with syngas in a refractory lined vessel) there is no risk of metal dusting, which can be a common problem in equipment/facilities working with syngas streams.

The SGR unit 1711 as shown in this implementation can operate as an RWGS reactor with one or more of SMR, DMR reactions. This SGR unit 1711 as shown in this implementation can use feed streams for syngas reactants including for example the calciner gaseous product stream 2150 which contains at least a portion of $CO_2$ and may also contain $H_2O$. The SGR unit 1711 may also be fed a portion of $CH_4$ from stream 1759, Fischer Tropsch light ends stream 1754, or a combination of both, and a portion of steam from stream 1755. These streams may be provided as reactant feedstock to the SGR unit 1711 in order to reduce or eliminate the need for the hydrogen stream 1764 supplied from the hydrogen production subunit 110. For example, the SGR unit 1711 may be operated wholly or partially as an SMR, taking in feedstocks including $CH_4$ stream 1759, optionally or additionally Fischer Tropsch light ends stream 1754, and steam stream 1755, in order to produce syngas for the Fischer Tropsch unit 2112.

In some implementations, the $H_2$ product stream 146 from the $H_2$ generation unit 110 can be split, and fed into the system at a variety of points, such as streams 1753, 1764 and 2183, that are fed as $H_2$ feedstock to the Fischer Tropsch unit 2112, feedstock to the SGR unit 1711 and fed upstream of BFB preheat exchanger 2114 to mix with the hot syngas stream 2148, respectively. In some implementations the $CH_4$ stream 1759, the Fischer Tropsch light ends stream 1754, or a combination of the two may be available as less expensive/readily available sources of hydrogen, and when one or more of the $CH_4$ stream 1759, FT light ends stream 1754 and steam stream 1755 are fed to the SGR unit 1711, the SGR unit 1711 would then, in addition to RWGS reactions, include at least a portion of SMR reactions, DMR reactions or a combination of any of the above, to produce a syngas product stream 2148.

In some aspects using $CH_4$ as feedstock to the SGR unit 1711 may be more economic, for example when renewable electricity is unavailable or expensive and using a $CH_4$ source for hydrogen in the synthetic fuel production subsystem 102 is more cost effective than running the electrically driven hydrogen production subunit 110.

In the implementation shown in FIG. 22, one or more of the SGR unit 1711 and calciner unit 1707 may be oxy-fired and as such may require a fuel source to combust with an oxygen source. In some cases, oxygen streams 1765 and 1766 from the hydrogen production unit 110 can be combusted with the fuel source to provide heat for syngas production and calcination, respectively. The fuel to one or both SGR unit 1711 and calciner unit 1707 can be provided by an offsite hydrogen supply, hydrogen sourced from the hydrogen production subsystem 110, natural gas, Fischer Tropsch light end hydrocarbons from the Fischer Tropsch unit 2112 or a combination of any of the above as fuel stream 1761. In this case, the combustion products from heating the SGR unit 1711 can be treated and used within another subsystem, for example the $CO_2$ can be isolated and incorporated into the SGR unit 1711 feed stream 2150.

Both the calcium oxide solids stream 131 and calciner gaseous product stream 132 leaving the unit have temperatures of approximately 900° C. The hot calciner gaseous product stream 132 is sent through a high temperature solids removal and clean-up unit 2108. In some aspects, water may optionally be removed as stream 2134, and impurities are removed as stream 2138, prior to sending the hot $CO_2$ product stream 2150 over to the SGR unit 1711 within the synthetic fuel production subsystem 102.

Figure 25:
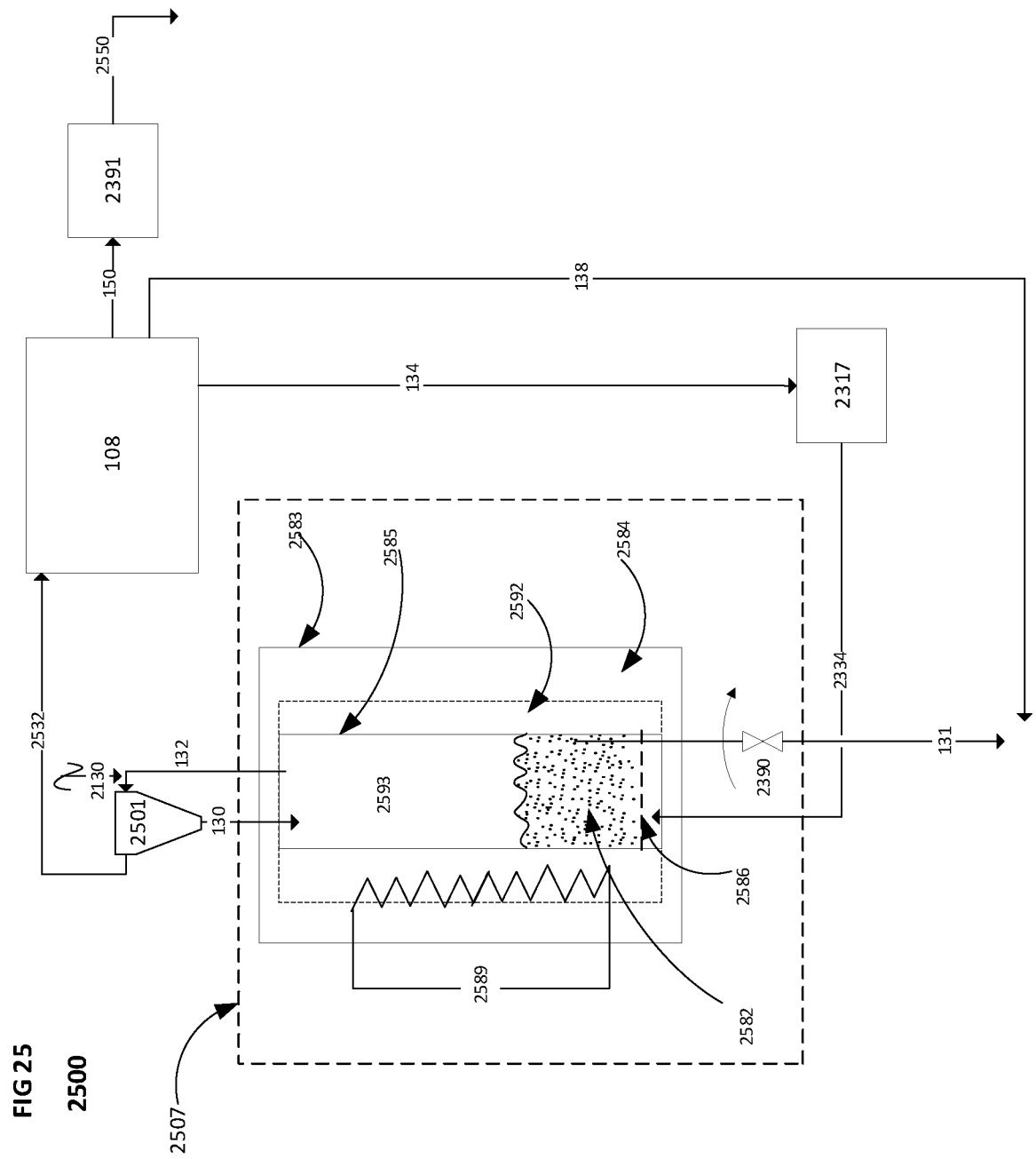
FIG. 25 depicts an illustrative system 2500 for calcining calcium carbonate to produce a $CO_2$ gas and calcium oxide including another electrically heated calciner system.
Figure 26:
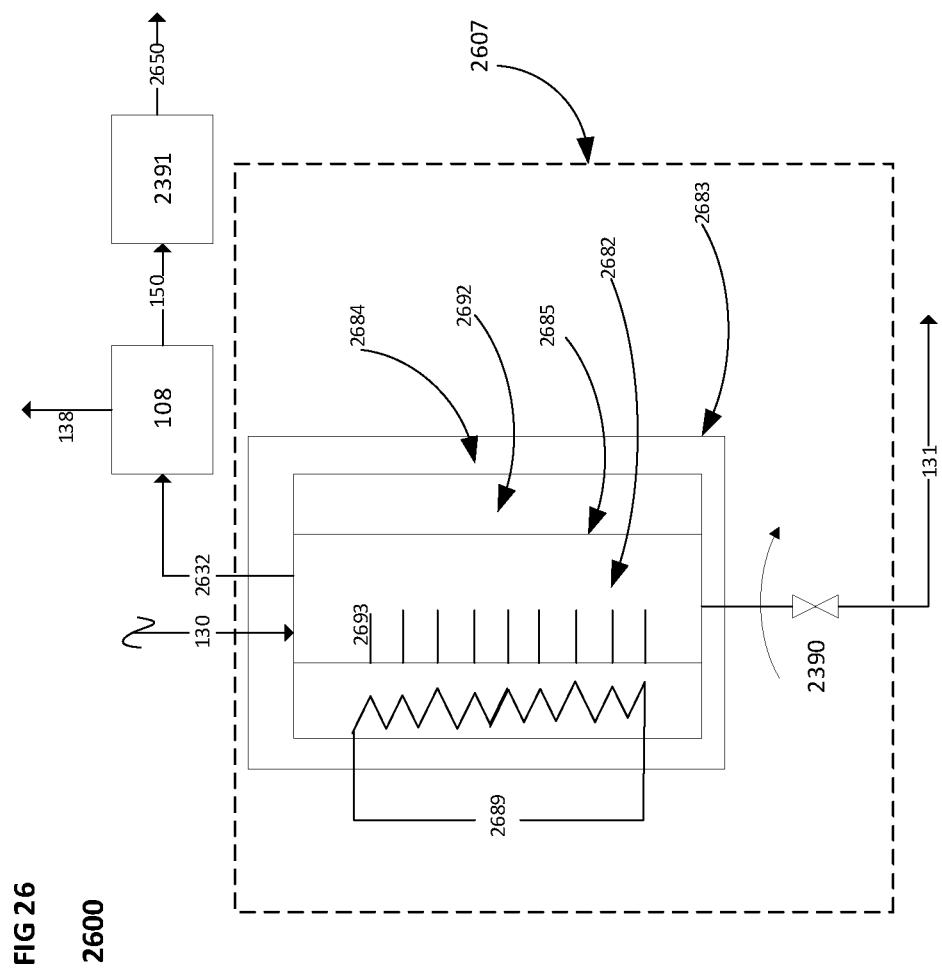
FIG. 26 depicts an illustrative system 2600 for calcining calcium carbonate to produce a $CO_2$ gas and calcium oxide including another electrically heated calciner system.
Figure 27:
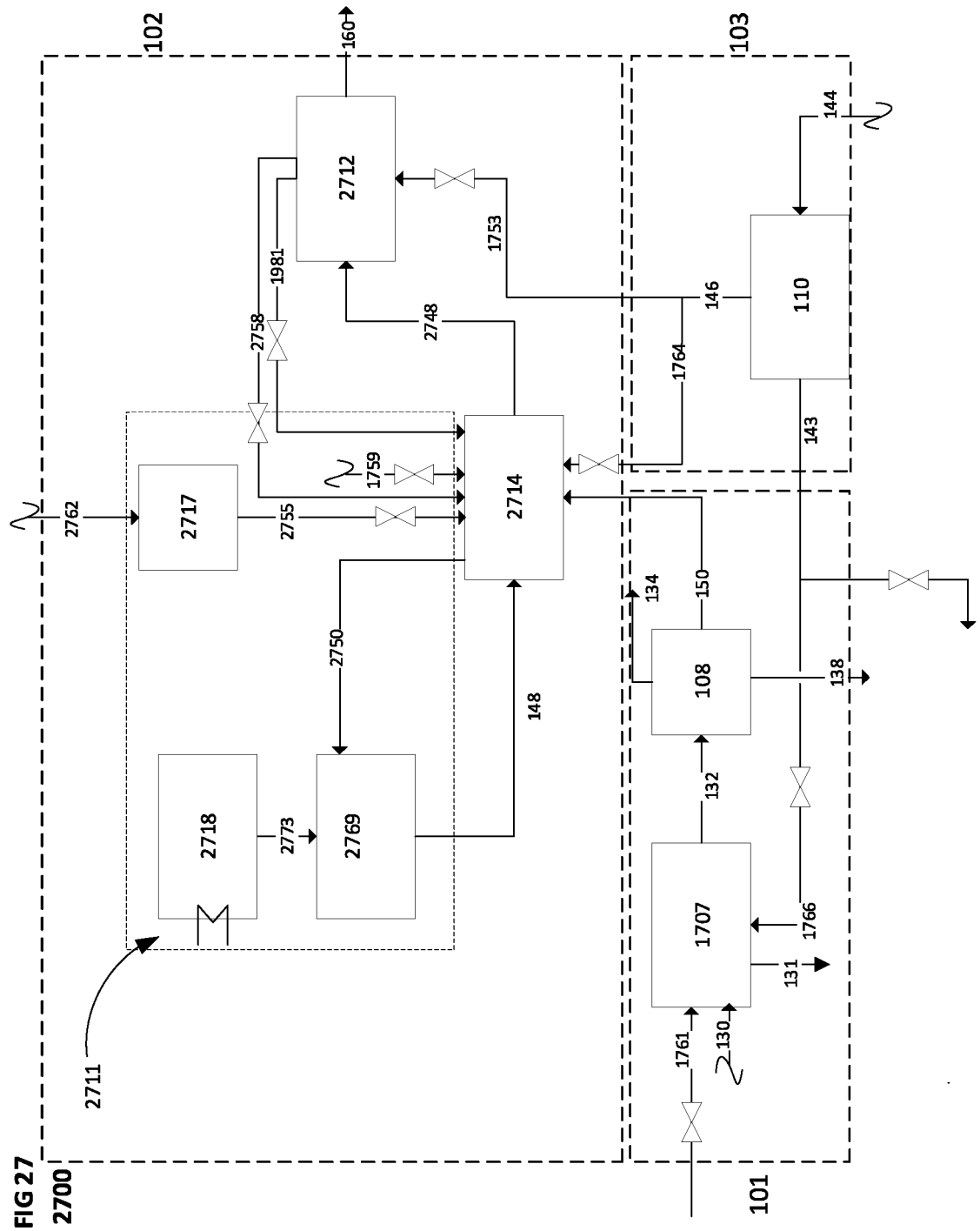
FIG. 27 is a schematic block diagram of a system for producing a synthetic fuel from hydrogen and carbon dioxide, according to a twenty-sixth implementation, illustrating a method of transferring heat energy in a product stream in the synthetic fuel production subsystem to heat at least a portion of a feed stream in the synthetic fuel production subsystem, where at least a portion of the heat required in the synthetic fuel production subsystem is derived from electric sources.

In the implementation shown in FIG. 22, one or more of the SGR unit 1711 and calciner unit 1707 may be heated electrically as is described in FIGS. 19 and 27 for electrically heated SGR units, and FIGS. 3,14,24 to 26 for electrically heated calciners, respectively, instead of using combustion of fuel for process heat. In some aspects, the $CO_2$ feed stream 132 going from the calciner 1707 to the SGR unit 1711 may have substantially less or no water content than when the calciner unit 1707 is heated using combustion of a fuel source. As a result, the downstream high temperature solids removal unit 2108 may not require water removal equipment, as there would be no combustion products, only dust 2138 and calcination products 2150 (ie the stream would be mostly $CO_2$).

In the implementation shown in FIG. 22, the low pressure SGR unit 1711 may be replaced by a high pressure SGR unit (not shown). A high pressure SGR unit 1711 may be configured to operate at pressures up to about 30 bar. For cases using a high pressure SGR, a standard solids removal and cleanup unit 108 may be used instead of the high temperature solids removal and cleanup unit 2108 to remove impurities and water from the calciner product stream 132. Additionally, the water knockout and compression unit 2187 would no longer require compression equipment to feed stream 2188 into the Fischer Tropsch operating pressure.

The BFB preheat unit 2114 as described in this implementation and shown in FIG. 22 may also be used in implementations similar to those shown in FIG. 10, in place of the heat exchange unit 901.

Figure 23:
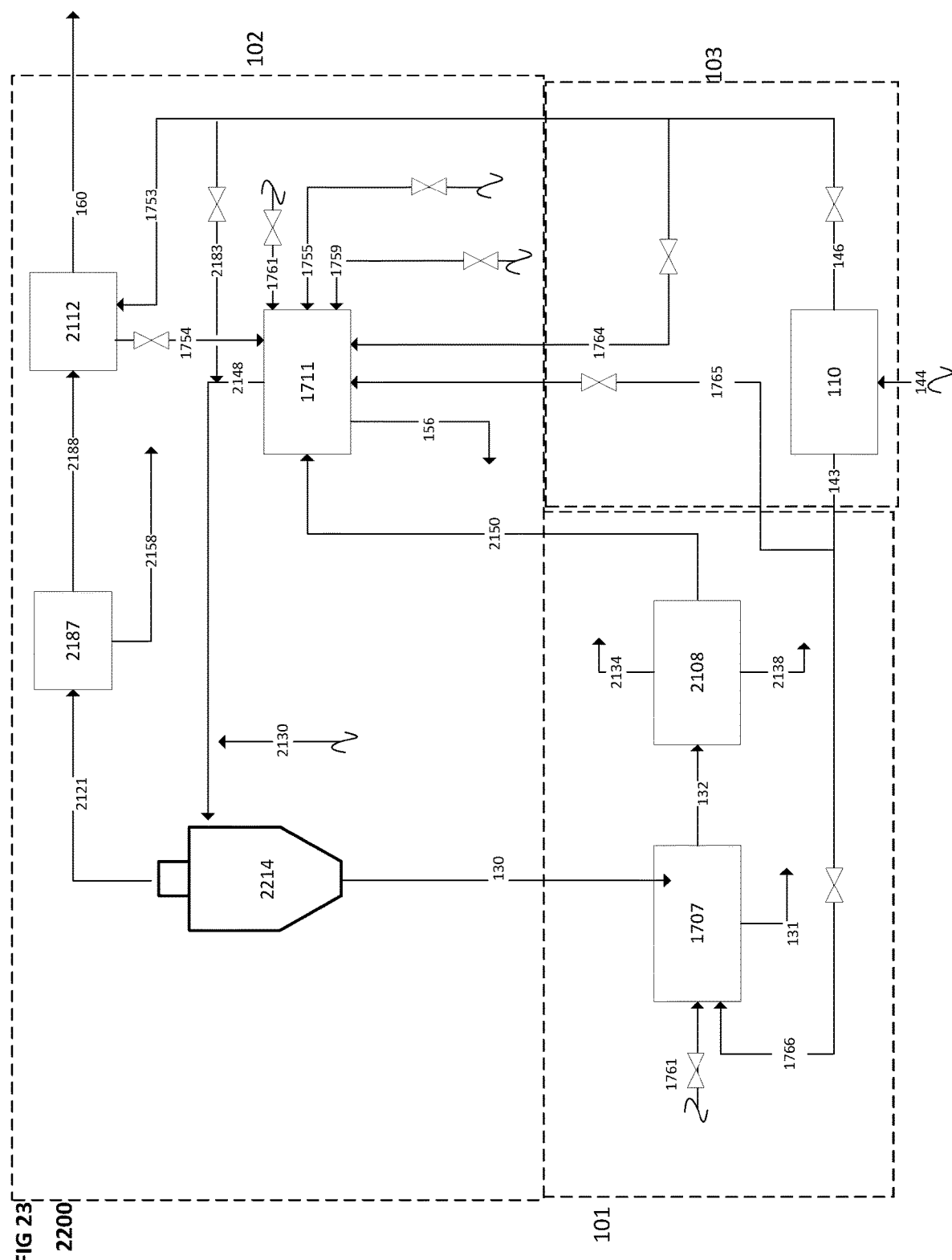
FIG. 23 is a schematic block diagram of a system producing a synthetic fuel from hydrogen and carbon dioxide, according to a twenty-second implementation, illustrating another method of transferring heat energy in a product stream in the synthetic fuel production subsystem to at least a portion of the material flow in the $CO_2$ capture subsystem.

According to a twenty-second implementation, and referring to FIG. 23, a synthetic fuel production system 2200 includes the $CO_2$ capture subsystem 101, the hydrogen production subsystem 103 and the synthetic fuel production subsystem 102. All the components of the system 2200 are substantially the same as in the twenty-first implementation illustrated in FIG. 22, with the exceptions being that the calcium carbonate pellets are preheated through a cyclone preheating unit 2214 located within the synthetic fuel production subsystem 102.

Cyclone gas-solid separation equipment is common in calcining processes, and cyclones can be constructed of refractory or ceramic materials, or a combination of these materials. In some aspects, the diameter of the cyclone preheating unit 2214 may be enlarged to promote longer residence times for the solid $CaCO_3$ material of stream 2130 to be in contact with the hot syngas stream 2148 within the cyclone preheat unit 2214 before dropping out of the bottom and transferring to the calcination unit 1707. Using this type of equipment for direct heat exchange enables heat transfer between the $CaCO_3$ pellet stream 2130 and hot fluid stream 2148, and due to the nature of the materials interfacing within the unit, (ie the $CaCO_3$ pellets mix with hot syngas in a refractory lined vessel) there is no risk of metal dusting, which can be a common problem in other syngas generation heat exchange systems.

The cyclone preheat unit 2214 as described in this implementation and shown in FIG. 23 may also be used in implementations similar to those shown in FIG. 10, in place of the heat exchange unit 901.

Figure 24:
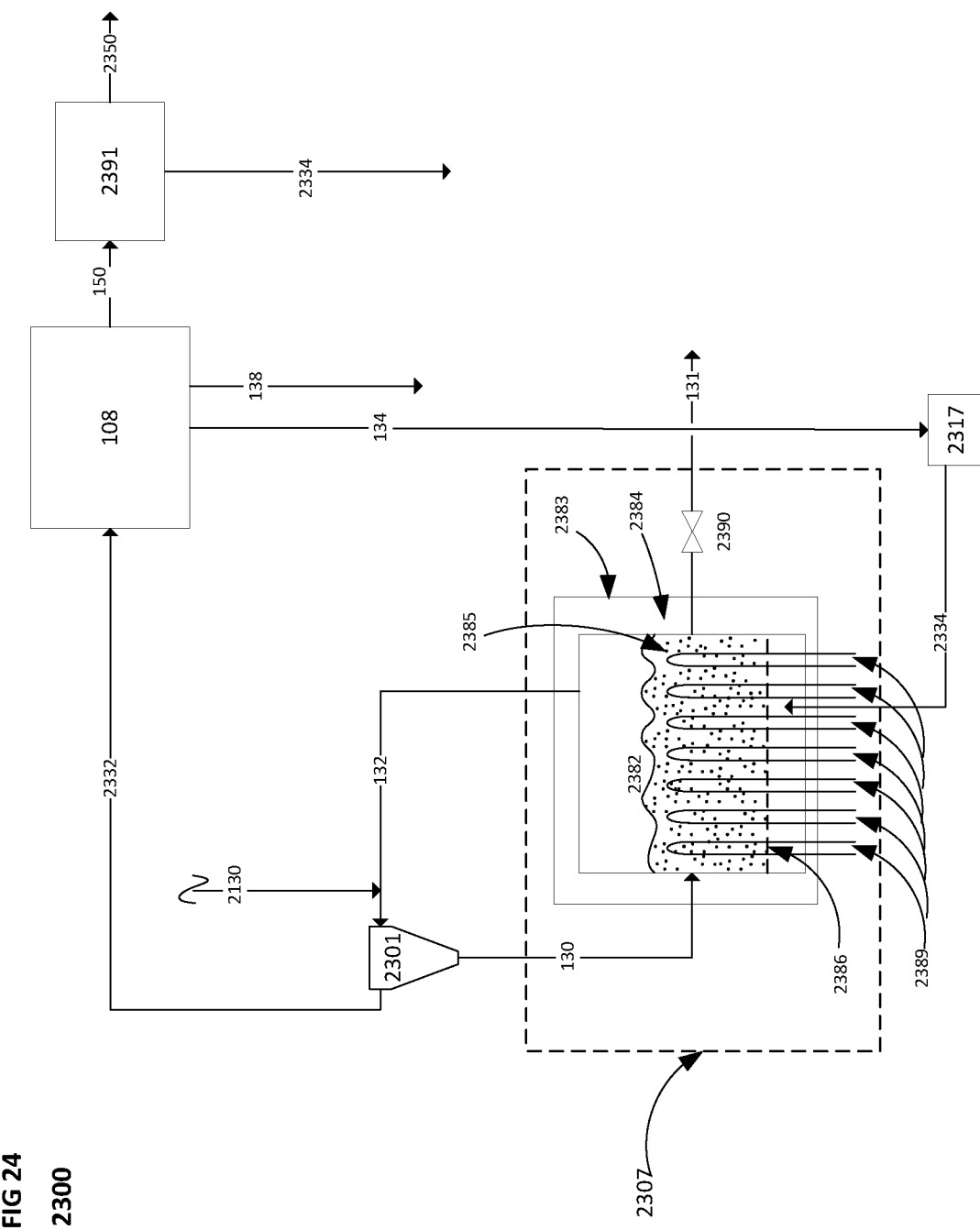
FIG. 24 depicts an illustrative system 2300 for calcining calcium carbonate to produce a $CO_2$ gas and calcium oxide including an electrically heated calciner system.

According to a twenty-third implementation, and referring to FIG. 24, an electric calcining subsystem 2300 is shown and includes an electric bubbling fluidized bed (BFB) calciner unit 2307, and can also include components such as one or more staged preheat cyclones 2301, a water knockout, heat recovery and solids removal unit 108, a compression unit 2391, a boiler unit 2317, or combinations of any of these units. This calcining subsystem 2300 can be used in whole or in part where an electric calciner is suggested (as described in FIGS. 3,14, 18, 19, 22, 23, 25 to 29) or in some cases, can be optionally substituted in for an oxy-fired calciner unit without changing the key features of the implementation, for example those implementations shown in FIGS. 5,11,12.

The electric BFB calciner unit 2307, which is a type of fluidized bed reactor vessel, has componentry such as an insulation or refractory lining 2384 that is encased in an outer vessel 2383. The outer vessel provides structural support to the unit and may be constructed of inexpensive material such as carbon steel for example, due to being shielded from most of the calciner operating temperature by the insulation or refractory lining 2384. The BFB calciner 2307 also has a distributor plate 2386, a bubbling bed calcination zone 2382, electric heating elements 2389, which may or may not be sheathed in a protective casing, and a controlled discharge device 2390.

In some aspects, a $CaCO_3$ material feed stream 2130 may be preheated, for example by feeding directly into the electric BFB calciner product gas stream 132 upstream of a preheat cyclone 2301. In some aspects, the solid feed stream 2130 may additionally or alternatively be heated indirectly by a process waste heat exchange unit (not shown), prior to entering the BFB calciner 2307 as preheated $CaCO_3$ stream 130. Within the electric BFB calciner 2307, the $CaCO_3$ material fluidizes in the bubbling bed calcination zone 2382, which mixes the gases and solids together similar to a continuously stirred tank reactor (CSTR) vessel. The solid material including $CaCO_3$ moves through the bed towards the exit, and as it does, it interfaces with the high temperature fluidizing gases and heat from the electric heating elements 2389. During this process, the $CaCO_3$ material calcines causing the $CaCO_3$ to release gaseous $CO_2$ and form solid calcium oxide, or CaO. Both the calcium oxide solid stream 131 and calciner gaseous product stream 132 leaving the electric fluidized bed calciner unit 2307 can have temperatures of up to approximately 900° C., which makes recovering and using the high-grade heat in these streams (eg within other units) desirable.

The hot calcium oxide solid stream 131 leaves the electric BFB calciner 2307 by overflowing into the end zone portion 2385 where it then drops into a controlled discharge device 2390, such as a loop seal, for example a fluoseal, or similar device after which it can be pneumatically or mechanically conveyed to downstream processes. In some aspects, the hot CaO can be sent through a heat exchange unit, in order to transfer at least a portion of the heat to one or more feed streams or intermediated streams within the process, for example to superheat the fluidization gases for the electric BFB calciner 2307. In some aspects, the fluidized bed calciner 2307 is physically located in close proximity to the heat exchange unit, such that the hot CaO stream 131 can drop by gravitational means from the fluidized bed calciner 2307 directly into the heat exchange unit without need for pneumatic or mechanical conveyance.

In some implementations, the bubbling bed calcination zone 2382 is fluidized with a gaseous stream 2334, which may include hot gases such as steam. This fluidization stream 2334 enters the electric BFB calciner 2307 near the bottom portion of the vessel, through a distributor plate 2386 and flows up through the calcination bubbling bed zone 2382, mixing with the solid bubbling bed material and the gaseous $CO_2$ product stream.

The mixed gaseous stream, including a mix of fluidizing gas (for example steam), $CO_2$, and any fluidized impurities and dust present exits the top of the electric BFB calciner 2307 as stream 132, where it moves counter currently through one or more cyclones 2301 to preheat the solid feed $CaCO_3$ pellets stream 2130 before leaving as cooled gaseous product stream 2332. This cooled stream may then be sent to a water knockout heat recovery & solids removal unit 108 where any dust present in the stream 2332 is removed as stream 138. In some aspects, most of the heat in gas stream 132 is recovered in one or more cyclone units 2301 (eg transferred to the feed $CaCO_3$ stream 2130), so that the water knockout, heat recovery & solids removal unit 108 can include a simple direct contact cooler (ie it does not need further heat recovery). In some aspects, where there is enough heat left in stream 2332 after using it to preheat the $CaCO_3$ stream 2130, the remaining heat could be extracted using another heat exchanger, for example to preheat boiler feed water for the boiler and desuperheater unit 2317. In some aspects, where the stream 2332 temperature is below about 150° C., further heat recovery may not be required and instead the stream could be cooled with a direct contact cooler to knockout the water and remove dust as part of the water knockout, heat recovery & solids removal unit 108.

In some aspects, dust stream 138 can be sent with the cooled CaO material stream 131 to downstream processes, such as a slaker unit, or offsite disposal (not shown) or combination of both. Water from the water knockout heat recovery & solids removal unit 108 is condensed and sent as stream 134 to a boiler unit 2317 where it is converted back to steam and sent back into the electric BFB calciner 2307 as stream 2334 to continue fluidizing the bed. In some aspects, a portion of available steam from units within other subsystems, for example excess steam from the slaker unit 106, the Fischer Tropsch unit 112, or a combination of the these units (not shown) may be combined with water in the boiler and desuperheater 2317 to produce LP steam stream 2334 that is then fed into the BFB calciner 2307 with or without additional heating. Optionally, the stream 2334 may be superheated using a heat exchange equipment (not shown), before being sent to the BFB calciner 2307.

The concentrated gaseous $CO_2$ stream leaves the water knockout & solids removal unit 108 as stream 150 and can optionally be sent to a compression unit 2391, where it can be compressed if necessary to meet the operating conditions for downstream processes. In some aspects, downstream processes can, for example, include an SGR unit within the synthetic fuel production subsystem 102 as described in FIG. 2-5,11,12,14,18-23,27-29, an off-site user or combinations of both. The compressed $CO_2$ gas exits the compression unit 2391 as stream 2350.

The electric BFB calciner 2307 is heated with electric elements 2389 which can be encased in a metal sheath through which the generated heat can be conducted, can be coupled to the refractory lined walls 2384, can extend into the fluidized bed zone 2382, or can include a combination of any of these aspects. These electric elements 2389 and their surroundings act to generate and distribute heat into the calcination bubbling bed zone 2382 to maintain the operating temperature of up to 900° C. Due to the fluidization nature of this BFB calciner design, the heat is transferred efficiently from the elements throughout the bed to the $CaCO_3$ material, maximizing the bed-side heat transfer coefficient while minimizing both the risk of hot spots as well as build-up of CaO on the walls. Additionally, this design can allow for the bubbling bed calcination zone 2382 to operate, in some cases, at slightly lower temperatures, for example within the range of between 850° C.-870° C. In some cases, the fluidization velocity of the steam stream 2334 can maximize the bed-side heat transfer film coefficient in the BFB calciner 2307.

Electrically heated calciner as described in FIG. 24 can be incorporated into many of the other implementations described herein, in whole or in part where an electric calciner is suggested (as described in FIGS. 3,14, 18,19, 22, 23, 27 to 29) or in some cases, can be optionally substituted in for an oxy-fired calciner unit without changing the key features of the implementation, for example those implementations shown in FIGS. 5,11,12. By doing so, those implementations can take further advantage of renewable energy sources instead of fossil fuel energy sources, and the resulting process can have one or more of a lower carbon intensity product, lower capital costs, lower operating costs or a combination of these advantages. Furthermore, electrically heated calciners can be incorporated within systems operating an electric SGR as suggested in FIGS. 19, 22, 23 and 27, taking further advantage of renewable energy sources instead of fossil fuel energy sources for the overall system thermal heat requirements.

According to a twenty-fourth implementation, and referring to FIG. 25 the synthetic fuel production system 100 includes the $CO_2$ capture subsystem 101, the hydrogen production subsystem 103 and the synthetic fuel production subsystem 102. The $CO_2$ capture subsystem 101 has a calciner unit 2500 that includes an electric bubbling fluidized bed (BFB) calciner 2507, coupled with one or more preheat cyclone units 2501, a water knockout and solids removal unit 108, a compression unit 2391 and a boiler unit 2317. The BFB calciner 2507, which is a type of fluidized bed reactor vessel, includes an internal process vessel 2585 which is wrapped in an insulation or refractory lining 2584 and encased in an outer vessel 2583. The BFB calciner 2507 also includes a distributor plate 2586, a solids discharge device 2390, and electric elements 2589 that can be housed in an element housing zone 2592 between the refractory lining 2584 and the internal process vessel 2585.

In some aspects, the outer vessel provides structural support to the unit and may be constructed of inexpensive material such as carbon steel for example, due to being shielded from the high calciner operating temperature by the insulation or refractory lining 2584. The internal process vessel may be constructed of heat resistant materials such as 253MA, Inconells, hastelloy, or any other material with similar properties that can maintain structural integrity under high temperature operating conditions.

In some aspects, the electric elements 2589, which may or may not be sheathed in a protective metal casing, are located in a housing zone, or gap, between the refractory lining 2584 and the internal process vessel 2585. These elements generate heat that radiates through the housing zone 2592 and is then conducted through the internal process vessel walls 2585 and into the calcination bubbling bed zone and internal head space 2593 to maintain the calciner operating temperature of up to 900° C. Both the calcium oxide solid stream 131 and calciner gaseous product stream 132 leaving the electric BFB calciner unit 2507 can have temperatures of up to approximately 900° C., which makes recovering and using the high grade heat in these streams (eg within other units) desirable.

In some aspects, the cool $CaCO_3$ material stream 2130 is first mixed with the hot calciner product gas stream 132 prior to entering one or more cyclone preheat stages 2501, in order to transfer at least a portion of the sensible heat within the hot calciner product gas stream 132 to the feed $CaCO_3$ material stream 2130, as well as to help convey the solids into the preheat cyclones 2501. The preheated $CaCO_3$ material stream 130 then enters the BFB calciner internal process vessel 2585 and is fluidized in the bubbling bed zone 2582. Due to the high temperature in the BFB calciner 2507, the $CaCO_3$ solids calcine causing the $CaCO_3$ to release gaseous $CO_2$ as it calcines to solid calcium oxide. The hot calcium oxide solid stream 131 leaves the BFB calciner 2507 near the bottom of the vessel, through a controlled discharge device 2390 such as loop seal, fluoseal or the like. In some aspects, electric BFB calciner 2507 may be physically located in close proximity to a heat exchange unit (not shown) such that the hot CaO stream 131 can drop by gravitational means from the electric BFB calciner 2507 directly into the heat exchange unit without need for pneumatic or mechanical conveyance.

The BFB calciner 2507 is fluidized with a steam stream 2334 that enters the BFB internal process vessel 2585 near the bottom through a distributer plate 2586, and flows up through the calcination bubbling bed zone 2582, mixing with the solid bubbling bed material and the gaseous $CO_2$ product stream. The mixed gaseous stream of $H_2O$, $CO_2$, impurities and trace amounts of dust exits the top of the BFB calciner and through the cyclone 2501 where at least a portion of the dust is separated and sent back into the calciner 2507 while the remaining gases exit as stream 2532 and then move to a water knockout, heat recovery & solids removal unit 108. Here, any remaining heat can optionally be removed and exchanged with other process streams, or a direct contact cooler, as appropriate. In some aspects, where there is enough heat left in stream 2532 after using it to preheat the $CaCO_3$ stream 2130, the remaining heat could be extracted using another heat exchanger, for example to preheat boiler feed water for the boiler and desuperheater unit 2317. In some aspects, where the stream 2532 temperature is below about 150° C., further heat recovery may not be required and instead the stream could be cooled with a direct contact cooler to knockout the water and remove dust as part of the water knockout, heat recovery & solids removal unit 108.

Also in some cases, any remaining dust present is removed in unit 108 and leaves as stream 134, where it can be combined with the solid calcium oxide stream 131 and sent to downstream process units, for example a waste heat recovery unit, and then on to a slaker unit (not shown), or offsite disposal (not shown), or a combination of both.

In some aspects, water is condensed in unit 108 and sent to a boiler 2317 as stream 134 where it can be converted to steam and sent back into the BFB calciner 2507 as stream 2334 to continue fluidizing the bed. In some aspects, the boiler 2317 is heated at least in part using waste process heat, electric heat or a combination of these heat sources. In some aspects, a portion of available steam from units within other subsystems, for example excess steam from the slaker unit 106, the Fischer Tropsch unit 112, or a combination of the these units (not shown) may be combined with water in the boiler and desuperheater 2317 to produce LP steam stream 2334 that is then fed into the BFB calciner 2307 with or without additional heating. Optionally, the stream 2334 may be superheated using a heat exchange equipment (not shown), before being sent to the BFB calciner 2307.

In some aspects, the concentrated gaseous $CO_2$ stream 150 leaves the water knockout & solids removal unit 108 and is sent to a compression unit 2391. After compression, the $CO_2$ stream 2550 can be sent to downstream processing, for example to the synthetic fuel production subsystem 102, and in some cases, to an SGR unit (not shown). Both the calcium oxide solid stream 131 and calciner hot gaseous product stream 132 leaving the BFB calciner unit 2507 can have temperatures of up to approximately 900° C., and as such, methods by which their sensible heat is recycled or transferred to other process streams are employed in this implementation to reduce waste heat and improve overall process energy use.

Due to the fluidization nature of this calciner design, the heat generated by the electric elements 2589 can be transferred efficiently from the elements throughout the bed, minimizing both the risk of hot spots as well as build-up of CaO on the walls, and can allow for the unit to operate, in some cases, at slightly lower temperatures, for example within the range of between 850° C.-870° C.

This type of electrically heated calciner can be incorporated into many of the other implementations described herein, for example implementations as shown in FIGS. 3,14, 18,19, 22, 23, 27 to 29. This type of electric calciner can be substituted for the oxy-fired calciner units in implementations described in FIGS. 5,11,12, without harming the features already described in those figures, and by doing so, those implementations can take further advantage of renewable energy sources. Furthermore, this electric calciner can be incorporated within systems operating an electric SGR as described in FIGS. 19, 22, 23 and 27, further taking advantage of renewable energy sources instead of fossil fuel energy sources for the overall system thermal heat requirements, and the resulting process can have one or more of a lower carbon intensity product, lower capital costs, lower operating costs or a combination of these advantages.

In some aspects, the electric elements 2589 are sheathed and as such act more like an electric heater, such that they can be coupled to other metal surfaces within the unit without causing the elements to fail or burn out. In other cases, the electric elements 2589 are exposed, and as such must be surrounded in a housing zone 2592 or the like, such that a gap exists between any conductive surfaces/material and the element itself.

According to a twenty-fifth implementation, and referring to FIG. 26 the calciner unit 2600 includes an electric kiln calciner 2607, which is coupled with a solids removal unit 108 and a compression unit 2391.

The electric kiln calciner 2607, that serves as a kiln reactor vessel, has an internal process vessel 2685 which is wrapped in an insulation or refractory lining 2684 and encased in an outer vessel 2683. The outer vessel provides structural support to the unit and may be constructed of inexpensive carbon steel due to being shielded from the calciner operating temperature by the insulation or refractory lining 2684. The internal process vessel may be constructed of heat resistant materials such as 253MA, Inconells, hastelloy, or any other material with similar properties that can maintain structural integrity under high temperature operating conditions. The electric heating elements 2689 can be housed in an element housing zone 2692 which provides a gap between the elements and the internal process vessel wall 2685, through which heat can be conducted.

In some aspects, the electric kiln calciner 2607 can be heated with an electric element 2689 that is located in the element housing zone 2692. Optionally or additionally, the wall of the internal process vessel 2685 is coupled to the metal heat fins 2693, and the heating elements can generate heat which then conducts through the walls of the internal process vessel 2685, the metal fins 2693 or a combination of the two components into the calcination zone 2682 and solid bed material to maintain the operating temperature of up to 1000° C., for example when operating with 100% $CO_2$ atmosphere in the kiln. In some aspects, the heating elements are configured similar to electric pottery kilns.

The electric kiln calciner 2607 is fed $CaCO_3$ material stream 130 which, as it travels through the calcination zone 2682, calcines to release gaseous $CO_2$ and solid CaO. The solid CaO moves towards the bottom of the kiln 2607 and exits via the controlled discharge device 2390 as stream 131. In some aspects where stream 131 leaves the process vessel 2685 at a high temperature, for example up to 900° C., it will be discharged through a controlled discharge device 2390 such as a loop seal fluoseal, or the like. In some aspects where cooling of stream 131 is possible between the electric kiln calciner vessel 2685 and the controlled discharge device 2390, The controlled discharge device 2390 can include a wider range of discharge devices, for example a mechanical discharge device including a lock hopper, rotary valve or the like.

While the solid material moves toward the bottom portion of the internal process vessel 2685, The gaseous $CO_2$ moves up through the calcination zone 2682, as it does it also moves through and heats the solid material. In some cases, prior to exiting the electric kiln calciner, the hot calcination gases move through a bed of $CaCO_3$ material that is entering the calciner, acting to preheat these feed solids, similar to the configuration of a shaft kiln.

The cooled gas stream leaves the top portion of the electric kiln calciner via stream 2632, where it is then transferred to a solids removal unit 108. Once substantially free of any dust (stream 138), the gaseous $CO_2$ stream 150 can be transferred to a compression unit 2391 before being sent as stream 2650 to other processing units, for example an SGR unit (not shown).

In some aspects, where the electric heating elements 2689 are configured so that they can operate under direct contact with the hot $CaCO_3$/CaO material in the calcination zone 2682 without significant fouling, corrosion or the like, then inserting the elements 2689 directly into the bed would be another option for electrically heating the calciner kiln unit 2607.

In some aspects, the heat produced by the electric heating elements 2689 moves out from the exposed electric heating elements 2689, the metal fins 2693, the internal process walls 2685, or a combination of any of the above, in a radial direction towards the center of the calcination zone 2682. This electric energy can see several types of heat transfer resistance between the heating element and the targeted $CaCO_3$ material, including for example the element material itself, any solid CaO lining the internal process vessel wall or fins, the gaseous environment within the calcination zone 2682 and finally, the $CaCO_3$ material itself. The heat transfer through these layers of resistance can be slow, and therefore there is a preferred diameter range for the internal process vessel 2685 of between 6 to 18 inches internal diameter, such that sufficient heat can extend throughout the calcination zone and heat the $CaCO_3$ up to a calcination temperature of about 900° C.

This type of electrically heated kiln calciner 2607 can be incorporated into many of the other implementations described herein, for example implementations as shown in FIGS. 3,14, 18,19, 22, 23, 27 to 29. This type of electric kiln calciner 2607 can be substituted for the oxy-fired calciner units in implementations described in FIGS. 5,11,12, without harming the features already described in those figures, and by doing so, those implementations can take further advantage of renewable energy sources.

Furthermore, this electric calciner can be incorporated within systems operating an electric SGR as described in FIGS. 19, 22, 23 and 27, further taking advantage of renewable energy sources instead of fossil fuel energy sources for the overall system thermal heat requirements.

According to a twenty-sixth implementation, and referring to FIG. 27 a synthetic fuel production system 2700 includes the $CO_2$ capture subsystem 101, the hydrogen production subsystem 103 and the synthetic fuel production subsystem 102. The $CO_2$ capture subsystem includes a calciner unit 1707. The synthetic fuel production subsystem 102 has an SGR unit 2711 coupled to a ceramic heat exchanger 2714 and a Fischer Tropsch unit 2712. The SGR unit 2711 includes a boiler 2717, the SGR reactor vessel 2769 and the electric elements 2718 that produce the heat stream 2773 required for the syngas process occurring in the SGR reactor vessel 2769.

Ceramic heat exchangers are used in various high temperatures and corrosive industrial applications, including for example heat exchange units such as furnaces, boilers, and the like. Ceramic heat exchangers are capable of gas-gas heat exchange at high temperatures such as those used in the SGR unit, up to about 1100° C. in cases where for example the SGR unit 2711 is operated under ATR conditions. Ceramic heat exchangers can be made of various ceramic materials such as for example silicon carbide or alumina. Silica carbide can be less expensive than alumina but more prone to corrosion under high temperature water vapour environments. In addition to the ceramic material, ceramic heat exchangers can have metal shells and components.

In the implementation shown in FIG. 27, the ceramic heat exchanger 2714 is used to exchange heat between the SGR unit 2711 hot syngas product stream 148 and one or more of the SGR unit 2711 gaseous feed streams (including components such as $CO_2$, $H_2O$, $CH_4$, $H_2$, Fischer Tropsch light ends and the like, resulting in a hot SGR feed stream 2750 for the SGR vessel 2711 and a cooled syngas product stream

2748 that is sent as feed to the Fischer Tropsch unit 2712. In some aspects, the gaseous feed streams may enter the ceramic heat exchanger 2714 as separate streams or in a combined stream. The ceramic heat exchanger 2714 is required for this application, as common metal and alloy heat exchangers exposed to the hot SGR product gas stream conditions and temperatures would be prone to metal dusting issues, where as ceramic heat exchange materials are not prone to metal dusting. Metal dusting is a common problem in syngas and reforming processes when metal or alloy surfaces, for example mild steel, stainless steel, iron and nickel based alloys, are exposed to the process operating conditions. The result is a deterioration in the metal material, ultimately requiring replacement. Industry typically reduces metal dusting issues by cooling the gas streams to temperatures where metal dusting does not occur—this results in wasted energy and low process efficiencies.

The ceramic heat exchanger can be used in all applications where the SGR unit product gas stream 148 is used to preheat one or more of the SGR unit 2711 feed streams.

The SGR unit 2711 as shown in this implementation can use feed streams for syngas reactants including for example the calciner 1707 gaseous product stream 150 which contains at least a portion of $CO_2$ and may also contain $H_2O$. The SGR unit 2711 may also be fed a portion of $CH_4$ from stream 1759, a portion of steam stream 2755 from the boiler 2717 that is fed water from stream 2762, a portion of steam stream 2758 from the Fischer Tropsch unit 2712, or a combination of any of the above as reactants to the SGR. These streams may be provided as feedstock to the SGR unit 2711, in part to reduce or eliminate the need for the hydrogen stream 1764 supplied from the hydrogen production subunit 110.

In some implementations, a portion of the $H_2$ in stream 2748 may be separated, using for example a membrane separation unit, and recycled back to the SGR vessel 2769, via the ceramic heat exchanger 2714 (not shown). In this case, the $CH_4$ stream 1759 may be available as a less expensive reactant to the SGR vessel 2969, and when one or more of the $CH_4$ stream 1759, Fischer Tropsch light ends stream 1981 are fed with one or more of steam streams 2755 and 2758 as feedstock to the SGR reactor vessel 2769, the SGR vessel 2769 would then, in addition to RWGS reactions, include at least a portion of SMR reactions, DMR reactions or a combination of these reactions, to produce the syngas product stream 148.

In some implementations the $CH_4$ stream 1759 may be available as a less expensive reactant, and when one or both of the $CH_4$ stream 1759 and steam streams 2755 and 2758 are fed to the SGR unit 2711, the SGR unit 2711 would then, in addition to RWGS reactions, include at least a portion of SMR reactions, DMR reactions or a combination of these reactions, to produce the syngas product stream 148.

In some aspects, using $CH_4$ as feedstock for the SGR unit 2769 may be more economic, for example when renewable electricity is unavailable or expensive and using a $CH_4$ source for SGR reactor 2769 feedstock (and operating the SGR unit 2711 in for example SMR mode) is more cost effective than running the electrically driven hydrogen production subunit 110. Additionally or alternatively, this method of operation could be used when the $CO_2$ capture subsystem 101 is offline or at reduced capacity.

In the implementation shown in FIG. 27, the calciner unit 1707 may require fuel to combust with the oxygen source to provide the operating temperature for calcination. The fuel can be provided by an offsite hydrogen supply, hydrogen sourced from the hydrogen production subsystem 110, natural gas, Fischer Tropsch light end hydrocarbons from the Fischer Tropsch unit 2712 or a combination of these components as stream 1761.

In the implementation shown in FIG. 27, the calciner unit 1707 may be heated electrically as is described in FIGS. 3, 24-26. In these cases, the $CO_2$ feed stream 150 going from the calciner 1707 to the SGR unit 2711 may have substantially less or no water content than when the calciner unit 1707 is heated using combustion of a fuel source, and as a result, the calciner product gas stream 150 may not require the same downstream components, for example water removal, prior to being sent to the SGR unit 2711.

Figure 28:
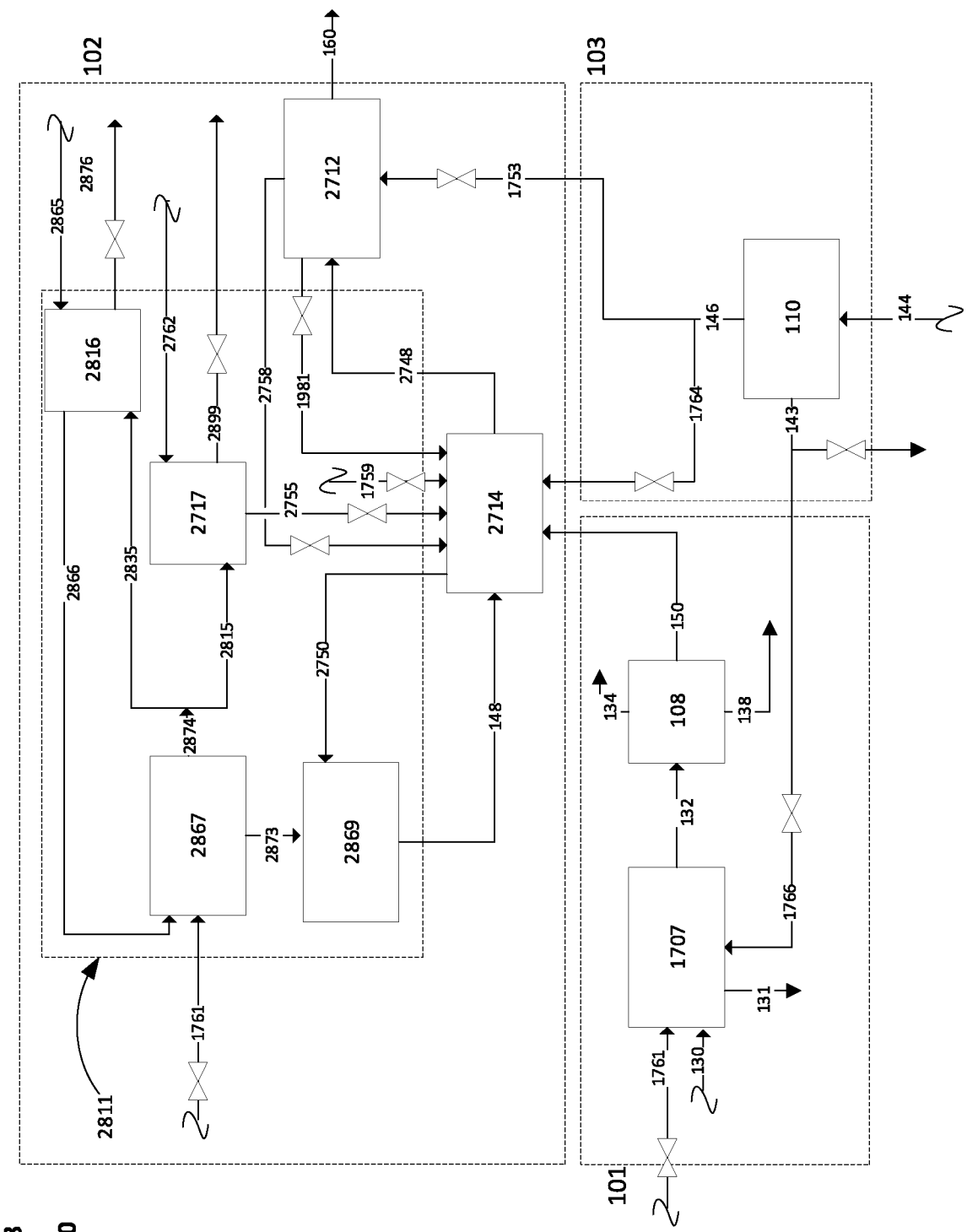
FIG. 28 is a schematic block diagram of a system for producing a synthetic fuel from hydrogen and carbon dioxide, according to a twenty-seventh implementation, illustrating a method of transferring heat energy in a product stream in the synthetic fuel production subsystem to heat at least a portion of a feed stream, generate a steam stream or both in the synthetic fuel production subsystem, where at least a portion of the heat required in the synthetic fuel production subsystem is supplied from combustion.

According to a twenty-seventh implementation, and referring to FIG. 28, a synthetic fuel production system 2800 includes the capture subsystem 101, the hydrogen production subsystem 103 and the synthetic fuel production subsystem 102. The synthetic fuel production subsystem 102 has an SGR unit 2811 coupled to a ceramic heat exchanger 2714, and a Fischer Tropsch unit 2712. The SGR unit 2811 includes an SGR burner system 2867 that is air fired with a fuel source stream 1761, which may include fuel such as natural gas, hydrogen, Fischer Tropsch light end hydrocarbons or a combination of any of the above. The SGR burner system 2867 is coupled to a heat exchanger 2816 and a boiler unit 2717. The combustion air stream 2865 is preheated by feeding through the heat exchanger 2816, before being sent to the SGR burner system 2867 as stream 2866. The SGR burner system hot exhaust gas stream 2874 is used to preheat the air and, in some cases where steam is required as a reactant for the SGR unit 2811, the SGR burner system hot exhaust gas stream 2874 is also used to produce steam 2755 in boiler unit 2717. The hot exhaust stream 2874 can be split into stream 2815 that is directed to the boiler unit 2717 and stream 2835 that is directed to the heat exchanger 2816. The split ratio of feed stream 2815 to the boiler unit 2717 and stream 2835 to the heat exchanger 2816 can be varied depending on how much heat is required for producing steam versus air preheating via heat exchanger 2816. The cooled exhaust gas leaves the boiler unit 2717 and heat exchanger 2816 as flue gas streams 2899 and 2876, respectively. In some cases, one or both of the flue gas streams 2876 and 2899 can be used as a feed stream into another subsystem process unit within the synthetic fuel production system 2800, as both streams can contain $CO_2$ and $H_2O$.

Ceramic heat exchangers are used in in various high temperatures and corrosive industrial applications, including for example heat exchange units such as furnaces, boilers, and the like. Ceramic heat exchangers are capable of gas-gas heat exchange at high temperatures such as those used in the SGR unit, ie up to 1100° C. in cases where for example the SGR unit 2811 is operated under ATR conditions. Ceramic heat exchangers can be made of various ceramic materials such as for example silicon carbide or alumina. Silica carbide can be less expensive than alumina but more prone to corrosion under high temperature water vapour environments. In addition to the ceramic material, ceramic heat exchangers can have metal shells and components.

In the implementation shown in FIG. 28, the ceramic heat exchanger 2714 is used to exchange heat between the SGR vessel 2869 hot syngas product stream 148 and one or more of the SGR unit 2811 feed streams including components such as $CO_2$, $H_2O$, $CH_4$, $H_2$, Fischer Tropsch light ends and the like, resulting in a hot SGR feed stream 2750 for the SGR vessel 2869 and a cooled syngas product stream 2748 that is sent as feed to the Fischer Tropsch unit 2712. In some aspects, the gaseous feed streams may enter the ceramic heat exchanger 2714 as separate streams or in a combined stream.

The ceramic heat exchanger 2714 is required for this application, as common metal and alloy heat exchangers exposed to the hot SGR product gas stream conditions and temperatures would be prone to metal dusting issues, where as ceramic heat exchange materials are not prone to metal dusting. Metal dusting is a common problem in syngas and reforming processes when metal or alloy surfaces, for example mild steel, stainless steel, iron and nickel based alloys, are exposed to the process operating conditions. The result is a deterioration in the metal material, ultimately requiring replacement. Industry typically reduces metal dusting issues by cooling the gas streams to temperatures where metal dusting does not occur—this results in wasted energy and low process efficiencies.

The ceramic heat exchanger 2714 can be used in all applications where the SGR unit product gas stream 148 is used to preheat one or more of the SGR reactor unit 2869 feed streams. In this implementation, the SGR unit 2811 is configured to handle RWGS reactions, DMR reactions, SMR reactions or combination of these reactions. Having a single unit configured to handle these SGR reactions is more cost effective than having a separate SMR unit and RWGS unit, for example. Also in this implementation, the ceramic heat exchanger 2714 is recycling most of the required heat of reaction by using the SGR unit 2869 hot product gas stream 148 to preheat the reactant feed gases, so that in the cases where the SGR unit 2811 is undergoing mostly an RWGS reaction, ie where feed steam is not needed and where the RWGS reaction enthalpy (+41 kJ/mol CO) is much lower than reaction enthalpies associated with SMR (+206 kJ/mol CO) and DMR (+247 kJ/mol CO) reactions, the ceramic heat exchanger 2714 can provide sensible heat while the heat of reaction can be provided by the SGR unit 2811 primary heat source, which in this case is the heat stream 2873 generated by the SGR burner system 2867. This configuration is better at heat recovery than if the same RWGS process was attempted in a standard SMR unit. In some aspects, the ceramic heat exchanger 2714 enables improved thermal efficiency of the SGR, as It is the only way to recover process heat in an SGR system where a high steam feed is not required. In a standard SMR unit, the heat from the hot syngas product is used to produce steam for the SMR feed. This configuration is not required for a RWGS reaction and thus having the hot syngas product hard piped through a boiler unit would be inefficient for an RWGS process. In the implementation shown in FIG. 28, during times when the SGR unit 2811 is in SMR operation, the steam can instead be produced from the SGR burner system hot exhaust gas 2874 if needed, and if it is not needed, as in the case where the SGR unit 2811 is used for an RWGS process, the SGR burner system hot exhaust gas stream 2874 can put the unused heat (previously used to make steam during SMR operation) into preheating the SGR burner system combustion reactants (ie air and fuel stream) instead.

The SGR unit 2811 as shown in this implementation can use feed streams for syngas reactants including for example the calciner 1707 gaseous product stream 150 which contains at least a portion of $CO_2$ and may also contain $H_2O$. The SGR unit 2811 may also be fed a portion of $CH_4$ from stream 1759, a portion of steam stream 2755 from the boiler 2717 that is fed water from stream 2762, and a portion of steam stream 2758 from the Fischer Tropsch unit 2712 as reactants. These streams may be provided as feedstock to the SGR vessel 2869, in part to reduce or eliminate the need for the hydrogen stream 1764 supplied from the hydrogen production subunit 110.

In some implementations, a portion of the $H_2$ in stream 2748 may be separated, using for example a membrane separation unit, and recycled back to the SGR reactor vessel 2869, via the ceramic heat exchanger 2714 (not shown). In this case, the $CH_4$ stream 1759 may be available as a less reactant to the SGR vessel 2869, and when one or more of the $CH_4$ stream 1759, Fischer Tropsch light ends stream 1981 are fed with one or more of steam streams 2755 and 2758 as feedstock to the SGR reactor vessel 2869, the SGR vessel 2869 would then, in addition to RWGS reactions, include at least a portion of SMR reactions, DMR reactions or a combination of these reactions, to produce the syngas product stream 148.

In some aspects, using $CH_4$ as a feedstock for the SGR reactor vessel 2869 may be more economic, for example when renewable electricity is unavailable or expensive and using a $CH_4$ source for SGR reactor vessel 2869 feedstock (and operating the SGR unit 2811 in for example SMR mode) is more cost effective than running the electrically driven hydrogen production subunit 110. Additionally or alternatively, this method of operation could be used when the $CO_2$ capture subsystem 101 is offline or at reduced capacity.

The calciner gaseous product stream 132 is sent through a solids removal and clean-up unit 108, where water is removed as stream 134 and the dust/particles are removed as stream 138. The gaseous product stream containing $CO_2$ and some $H_2O$ gets sent to the ceramic heat exchanger 2714.

In the implementation shown in FIG. 28, the calciner unit 1707 may require fuel to combust with the oxygen source 1766 to provide the operating temperature for calcination. The fuel can be provided by an offsite hydrogen supply, hydrogen sourced from the hydrogen production subsystem 110, natural gas, Fischer Tropsch light end hydrocarbons from the Fischer Tropsch unit 2712 or a combination of these components as stream 1761.

In the implementation shown in FIG. 28, the calciner unit 1707 may be heated electrically as is described in FIGS. 3,24-27. In this case, the $CO_2$ feed stream 132 going from the calciner 1707 to the SGR unit 2811 may have substantially less or no water content than when the calciner unit 1707 is heated using combustion of a fuel source, and as a result, the calciner product gas stream 132 may not require the same downstream components, for example water removal prior to being sent to the ceramic heat exchange unit 2714.

Figure 29:
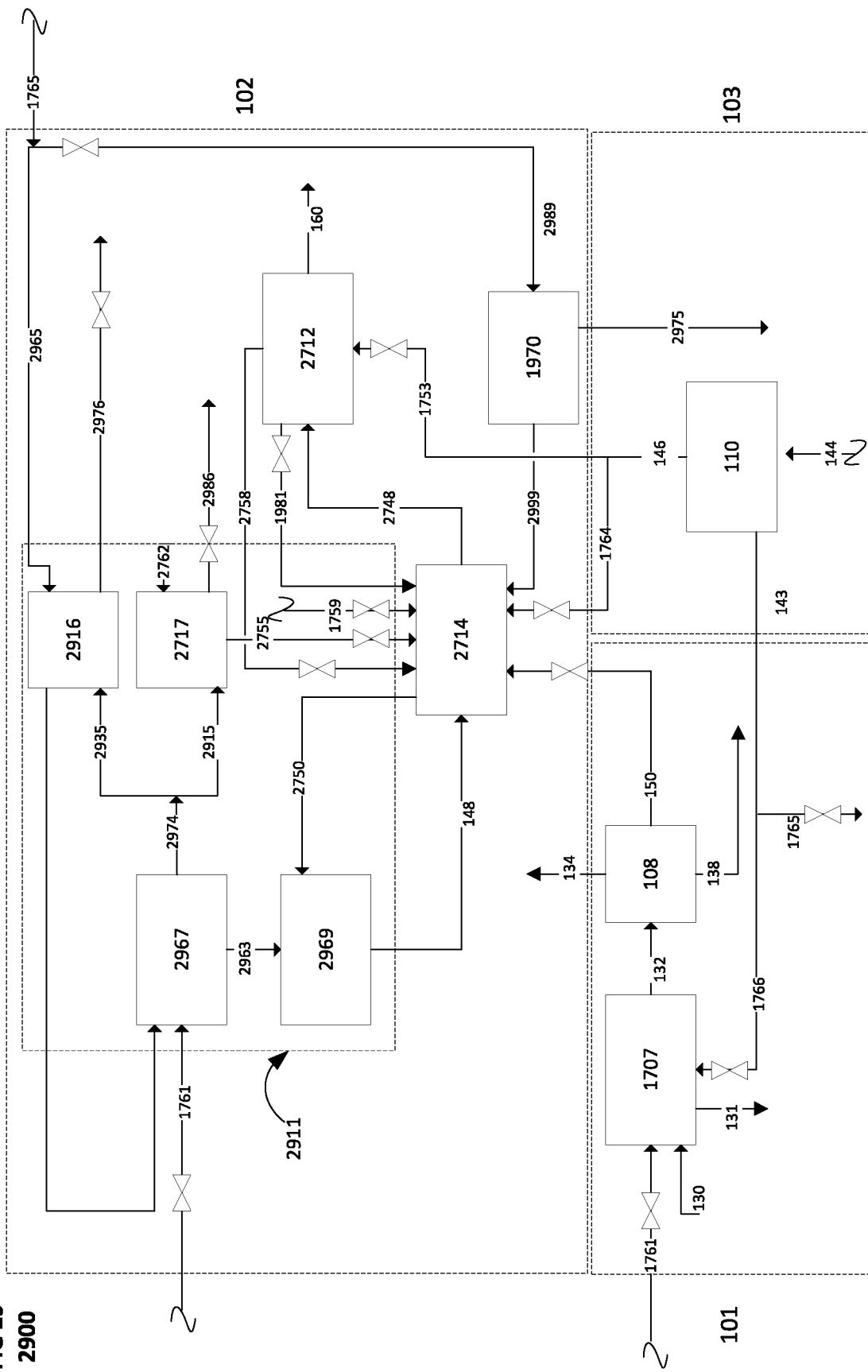
FIG. 29 is a schematic block diagram of a system for producing a synthetic fuel from hydrogen and carbon dioxide, according to a twenty-eighth implementation, illustrating a method of transferring heat energy in a product stream in the synthetic fuel production subsystem to heat at least a portion of a feed stream, generate a steam stream or both in the synthetic fuel production subsystem, where at least a portion of the heat required in the synthetic fuel production subsystem is supplied from oxy-combustion.

According to a twenty-eighth implementation, and referring to FIG. 29 a synthetic fuel production system 2900 includes the capture subsystem 101, the hydrogen production subsystem 103 and the synthetic fuel production subsystem 102. The synthetic fuel production subsystem 102 has an SGR unit 2911 coupled to a ceramic heat exchanger 2714 and a Fischer Tropsch unit 2712. The SGR unit includes a SGR burner system 2967 that is oxy-fired with a fuel source stream 1761, which may include fuel such as natural gas, hydrogen, Fischer Tropsch light end hydrocarbons or a combination of any of the above. The SGR burner system 2967 is coupled to a heat exchanger 2916, and a boiler unit 2717. The combustion oxygen stream 1765 is preheated by feeding through the heat exchanger 2916, before being sent to the SGR burner system 2967. The SGR burner system hot exhaust gas stream 2974 is used to preheat the oxygen stream 1765, any recycled flue gas from stream 2976, and in some cases where steam is required as a reactant for the SGR unit 2911, the SGR burner system hot exhaust gas stream 2974 is used to produce steam in boiler unit 2717. The hot exhaust stream 2974 can be split into stream 2915 that is directed to the boiler unit 2717 and stream 2935 that is directed to the heat exchanger 2916. The split ratio of exhaust gas stream 2915 to the boiler unit 2717 and stream 2935 to the heat exchanger 2916 can be varied depending on how much heat is required for producing steam versus oxygen preheating via heat exchanger 2916. The cooled exhaust gas leaves the boiler unit 2717 and heat exchanger 2916 as flue gas streams 2986 and 2976, respectively. In some cases, at least a portion of the flue gas stream 2976 can be recycled back through to the SGR burner system 2967 along with the combustion oxygen stream 1765, and a portion of it can be sent as stream 2989 to a compression and clean-up unit 1970 where the water is removed as stream 2975. The resulting compressed gas stream 2999 is then sent through the ceramic heat exchanger 2714 and can then be used as a feed stream for the SGR Reactor vessel 2969. In some cases, one or both of the flue gas streams 2976 and 2986 can be used as feed streams into another subsystem process unit within the synthetic fuel production system 2900, as both streams can contain $CO_2$ and $H_2O$.

Ceramic heat exchangers are used in in various high temperatures and corrosive industrial applications, including for example heat exchange units such as furnaces, boilers, and the like. Ceramic heat exchangers are capable of gas-gas heat exchange at high temperatures such as those used in the SGR unit, ie up to 1100° C. in cases where for example the SGR unit 2811 is operated under ATR conditions. Ceramic heat exchangers can be made of various ceramic materials such as for example silicon carbide or alumina. Silica carbide can be less expensive than alumina but more prone to corrosion under high temperature water vapour environments. In addition to the ceramic material, ceramic heat exchangers can have metal shells and components.

In the implementation shown in FIG. 29, the ceramic heat exchanger 2714 is used to exchange heat between the SGR vessel 2969 hot syngas product stream 148 and one or more of the SGR unit 2911 feed streams including components such as, $H_2O$, $CH_4$, $H_2$, Fischer Tropsch light ends and the like, resulting in a hot SGR feed stream 2750 for the SGR vessel 2969 and a cooled syngas product stream 2748 that is sent as feed to the Fischer Tropsch unit 2712. In some aspects, the gaseous feed streams may enter the ceramic heat exchanger 2714 as separate streams or in a combined stream. The ceramic heat exchanger 2714 is required for this application, as common metal and alloy heat exchangers exposed to the hot SGR product gas stream conditions and temperatures would be prone to metal dusting issues, where as ceramic heat exchange materials are not prone to metal dusting. Metal dusting is a common problem in syngas and reforming processes when metal or alloy surfaces, for example mild steel, stainless steel, iron and nickel based alloys, are exposed to the process operating conditions. The result is a deterioration in the metal material, ultimately requiring replacement. Industry typically reduces metal dusting issues by cooling the gas streams to temperatures where metal dusting does not occur—this results in wasted energy and low process efficiencies.

The ceramic heat exchanger 2714 can be used in all applications where the SGR unit product gas stream 148 is used to preheat one or more of the SGR reactor unit 2969 feed streams. In this implementation, the SGR unit 2911 is configured to handle RWGS reactions, DMR reactions, SMR reactions or combination of these reactions. Having a single unit configured to handle these SGR reactions is more cost effective than having a separate SMR unit and RWGS unit, for example. Also in this implementation, the ceramic heat exchanger is recycling most of the required heat of reaction by using the SGR vessel 2969 hot product gas stream 148 to preheat the reactant feed gases, so that in the cases where the syngas production subsystem 2911 is forming syngas by undergoing mostly an RWGS reaction, ie where feed steam is not needed and where the RWGS reaction enthalpy (+41 Id/mol CO) is much lower than reaction enthalpies associated with SMR (+206 Id/mol CO) and DMR (+247 kJ/mol CO) reactions the ceramic heat exchanger 2714 can provide sensible heat while the heat of reaction can be provided by the SGR unit 2911 primary heat source, which in this case is the heat stream 2963 generated by the SGR burner system 2967. This configuration is better at heat recovery than if the same RWGS process was attempted in a standard SMR unit. In some aspects, the ceramic heat exchanger 2714 enables improved thermal efficiency of the SGR, as It is the only way to recover process heat in an SGR system where a high steam feed is not required. In a standard SMR unit, the heat from the hot syngas product is used to produce steam for the SMR feed. This configuration is not required for a RWGS reaction and thus having the hot syngas product hard piped through a boiler unit would be inefficient for an RWGS process. In the implementation shown in FIG. 29, during times when the SGR unit 2911 is in SMR operation, the steam can instead be produced from the SGR burner system hot exhaust gas 2974 if needed, and if it is not needed, as in the case where the SGR unit 2911 is used for an RWGS process, the SGR burner system hot exhaust gas stream 2974 can put the unused heat (previously used to make steam during SMR operation) into preheating the SGR burner system combustion reactants (ie oxygen and fuel stream) instead.

The SGR unit 2911 as shown in this implementation can use feed streams for syngas reactants including for example the calciner 1707 gaseous product stream 150 which contains at least a portion of $CO_2$ and may also contain $H_2O$. The SGR unit 2911 may also be fed a portion of $CH_4$ from stream 1759, a portion of steam stream 2755 from the boiler 2717 that is fed water from stream 2762, and a portion of steam stream 2758 from the Fischer Tropsch unit 2712 as reactants. These streams may be provided as feedstock to the SGR vessel 2969 in part to reduce or eliminate the need for the hydrogen stream 1764 supplied from the hydrogen production subunit 110.

In some implementations, a portion of the $H_2$ in stream 2748 may be separated, using for example a membrane separation unit, and recycled back to the SGR vessel 2969, via the ceramic heat exchanger 2714 (not shown). In this case, the $CH_4$ stream 1759 may be available as a less expensive reactant to the SGR vessel 2969, and when one or more of the $CH_4$ stream 1759, Fischer Tropsch light ends stream 1981 are fed with one or more of steam streams 2755 and 2758 as feedstock to the SGR reactor vessel 2969, the SGR vessel 2969 would then, in addition to RWGS reactions, include at least a portion of SMR reactions, DMR reactions or a combination of these reactions, to produce the syngas product stream 148.

In some aspects using $CH_4$ as the hydrogen source for the SGR vessel 2969 may be more economic, for example when renewable electricity is unavailable or expensive and using a $CH_4$ source SGR reactor vessel 2969 feedstock (and operating the SGR unit 2911 in for example SMR mode) is more cost effective than running the electrically driven hydrogen production subunit 110. Additionally or alternatively, this method of operation could be used when the $CO_2$ capture subsystem 101 is offline or at reduced capacity.

The calciner gaseous product stream 132 is sent through a solids removal and clean-up unit 108, where water is removed as stream 134 and the dust/particles are removed as stream 138. The gaseous product stream containing $CO_2$ and some $H_2O$ gets sent to the ceramic heat exchanger 2714.

In the implementation shown in FIG. 29, one or more of the SGR unit 2911 and calciner unit 1707 may require fuel to combust with the oxygen source to provide the operating temperature for syngas production and calcination, respectively. The fuel can be provided by an offsite hydrogen supply, hydrogen sourced from the hydrogen production subsystem 110, natural gas, Fischer Tropsch light end hydrocarbons from the Fischer Tropsch unit 2712 or a combination of these components as stream 1761.

In the implementation shown in FIG. 29, the calciner unit 1707 may be heated electrically as is described in FIGS. 3, 24-26. In this case, the $CO_2$ feed stream 132 going from the calciner 1707 to the SGR unit 2911 may have substantially less or no water content than when the calciner unit 1707 is heated using combustion of a fuel source, and as a result, the calciner product gas stream 132 may not require the same downstream components, for example water removal, prior to being sent to the ceramic heat exchange unit 2714.

Referring to FIG. 30 and according to a twenty-ninth implementation, a synthetic fuel production system 3000 includes a hydrogen production subsystem 103, a synthetic fuel production subsystem 102, and the $CO_2$ capture subsystem 1501 as described in FIG. 15.

In this implementation, the energy required for one or more of the regeneration unit 1507 and the SGR unit 1511 may be derived at least in part from oxy-combustion of a fuel source including hydrogen, Fischer Tropsch light ends, natural gas or a combination of these components. For example, light end hydrocarbon byproducts stream 1523 produced by the Fischer-Tropsch unit 1512 can be used as fuel for combustion to generate heat for one or more of the regeneration unit 1507 and the SGR unit 1511. Additionally or alternatively, some of the $H_2$ and $O_2$ produced by the hydrogen the production subsystem 103 may be used to heat one or more of the regeneration unit 1507 and the SGR unit 1511 via combustion of a portion of $H_2$ stream 1525 and a portion of the $O_2$ stream 1527.

In some aspects, one or more of the regeneration unit 1507 and the SGR unit 1511 may be electrically driven processes, where electrical source 1518 provides the input heat 1529 for the regeneration unit 1507 and electrical source 1552 provides the input heat 1551 required by the SGR unit 1511. For example, equipment such as boilers in the regeneration unit 1507 can be configured to generate heat from electricity, and the SGR unit 1511 can be electrically configured at least in part as described in implementations 18 (FIG. 19) and 26 (FIG. 27) for example. In some cases, the electrical energy could be provided by a renewable source.

In the implementations described herein, oxygen produced within the system (for example in the hydrogen production system) could be used to oxy-fire any combustion process within the plant for example within any on-site power generation systems, within the SGR, in particular the RWGS reactor, in addition to or instead of the calciner. In some aspects, the oxidant used for combustion processes within the plant may be sourced from more dilute forms, such as air or more concentrated forms such as $O_2$ produced in an electrolyzer.

As discussed in the implementations above, the $CO_2$ capture subsystems 101, 1501, 1601, can capture $CO_2$ from large volumes of gas in a way that is decoupled from industrial (point emission) sources, can be located on non-agricultural or inexpensive land, and can provide a source of cooling medium (process solution), a source of high grade waste heat (calciner and slaker outputs), may have the ability to remove water from gas streams (slaker) and it may have the ability to consume intermediate or byproduct streams from the hydrogen production system and the synthetic fuel production system, for example, oxygen, hydrogen and lighter end fuels may be consumed in equipment such as the oxy-fired calciner, in the heating and/or feedstock requirements of SGR units, and in power generation systems where combustion is used, such as combustion turbines, and/or boilers.

Furthermore, the oxygen demands of the oxy-fired calciner can be significantly less than the total oxygen byproduct stream produced in the electrolysis process, in particular when the electrolysis process is sized to provide all the hydrogen demands of the synthetic fuel system. In scenarios where hydrogen electrolysis is used to produce hydrogen for a fuel synthesis system including RWGS and FT units, and where Fischer-Tropsch reactor feedstock requires an $H_2$:CO ratio of ~2, and where the $CO_2$ source is from a $CO_2$ capture subsystem including an oxy-fired calciner where some $CO_2$ is captured from the calciner combustion as well as from the air, the stoichiometric amount of oxygen byproduct produced from the hydrogen unit can be approximately 2-3 times greater than what is needed in the calciner. This leads to the potential of utilizing the excess oxygen byproduct in other units/areas where oxy-firing could be employed. For example, in the heating requirements of SGR units, and in particular RWGS units, in power generation systems where combustion is used, such as combustion turbines, and/or boilers.

In some implementations, the produced synthetic fuel can be blended into existing fossil fuel inventory such that transitioning a hydrocarbon production system, such as a refinery and distribution system, from fossil fuel feedstock to completely synthetic fuel feedstock can be timed in accordance with the demand for low carbon intensity fuels, with no blending restrictions like those that exist with most biofuels.

Biofuels in large scale production include Biodiesels or "FAME" (fatty acid methyl ester) and Renewable Diesel or "HVO" (hydrotreated vegetable oil). Emerging pathways include biomass and waste based Fischer-Tropsch "BFT" diesel and jet fuel created through the pyrolysis, hydrolysis/catalysis, or fermentation of materials such as municipal waste, energy crops, and crop residues. FAME, HVO and BFT fuels work at small penetration but social, chemical and environmental limits can drive up their costs steeply. Specific issues include the following:

FAME fuels based on rendered animal fat, waste cooking oils, and vegetable oils may only be blended 5-10% with fossil diesel, can have a lower energy density and cannot be distributed through pipelines due to corrosion issues. The feedstocks are commodities with alternative uses and their costs are tightly correlated with the cost of crude oil.

Biomass feedstocks such as crop and forest wastes have low energy density, high collection/transport cost, require very large crop areas and compete with food uses.

FAME, HVO, and BFT diesel fuels all have carbon intensities in the range of 20-70 $gCO_2e/MJ$ (with the exception of site specific small sources in the 10-20 $gCO_2e/MJ$).

In some implementations, the production of synthetic fuels can be designed to support an economical means of transitioning from fossil fuel based systems, such as GTL processes, to air-to-fuels systems, and in so doing, the resulting overall process energy requirements, capital cost, carbon intensity or a combination of the above may be reduced. In these implementations, the SGR unit can be operated, for example, as an SMR or DMR, taking in feedstocks such as methane and steam (in addition to $CO_2$ as applicable), to produce syngas for downstream processes, such as Fischer Tropsch liquid fuels production.

This mode of operation can be carried out for a period of time, after which the SGR unit can operate, for example as an RWGS reactor, taking in $CO_2$ and $H_2$ feedstocks, to produce syngas for downstream processes. These different modes of operation can be alternated, depending on the need and availability to process certain feedstocks. In some implementations, separate RWGS, SMR and DMR units are not necessary—these reactions can be carried out in the same catalyzed SGR reactor, simply by changing the feedstock streams.

In some implementations, the system may be designed to facilitate a dynamic transition from GTL to air to fuels, or to facilitate operation as a hybrid GTL and air to fuels system, utilizing a combination of fossil fuels as well as dilute source carbon dioxide and a hydrogen source. The system may be designed to shift back and forth between GTL inputs and air to fuels inputs depending on a number of conditions. In some of these implementations, the existing challenges of the fossil fuel based processes like the GTL processes mentioned herein can be alleviated using the byproducts from the on-site air-to-fuels system. For example, GTL systems have challenges in producing favorable hydrogen to carbon (H:C) ratios in their synthetic gas product for downstream users such as Fischer-Tropsch and methanol systems. Dry methane reforming (DMR) tends to produce a low H:C ratio (~1:1), steam methane reforming tends to produce a high H:C ratio (~3:1), and while autothermal reforming can achieve something in between (~2:1), the $O_2$ feed source from an air separation unit (ASU,) can be prohibitively expensive at smaller scales. If the GTL process is on a site that also houses air-to-fuels system componentry, such as electrolysis and DAC systems (capable of producing additional feedstocks of hydrogen, oxygen and $CO_2$), the GTL hydrogen-to-carbon ratio issues could be alleviated, and use of additional (and expensive) ASU equipment could be avoided.

Furthermore, the carbon intensity of the resulting fuel may be reduced relative to a GTL fuel that only utilizes natural gas as an input.

A system such as this could shift the balance between inputs from fossil fuels to dilute source carbon dioxide and hydrogen in response to a number of factors, for example, the price and availability of electricity: in an example implementation, a system could be operated in air to fuels mode at times when excess or affordable electricity is available, such as in a case where electricity is intermittently produced by renewable energy sources and excess electricity is not required by the grid. Similarly, the system could transition to operate in GTL mode, or in a mode where the majority of fuel is produced using fossil fuel, at times when electricity is not available, or is in high demand elsewhere, effectively allowing the air to fuels production system to act as an arbitrage to absorb excess electricity capacity through production and use of hydrogen for air to fuels.

In some of these GTL transitional implementations, the transition of the GTL unit may, for example, involve changing the catalyst material within some or all of the reactors, changing the operation regime within some or all of the reactors, adding or removing equipment around the reactors, rerouting streams within the plant, and possibly changing the quantities of feedstocks.

In some implementations, the system 100 can include components such as air contactor units, fluidized bed reactive crystallizers, slakers, oxy-fired calciners, hydrogen production systems such as a high temperature SOEC cell, a proton exchange membrane (PEM), an alkaline electrolyzer, synthetic fuel production components such as syngas generation reactors (SGRs), for example dry methane reformers (DMRs), steam methane reformers (SMRs), auto thermal reformers (ATRs), RWGS reactors, and partial oxidation reactors, as well as synthetic fuel processing units including Fischer-Tropsch reactors, methanol to gasoline (MTG) units, methanol to olefin (MTO) units, methanol synthesis units, $CO_2$ hydrogenation to hydrocarbon units, power cycles, or a combination of these components.

In some of these implementations, the reactors can include an external combustion zone, whereby the combustion process is kept separate from the internal reaction process, thereby allowing for the combustion components to be collected separately from the reaction products without impacting the reaction environment or composition within the reactor.

In some implementations, heat exchanger means used in the system 100 can include shell and tube heat exchangers, plate and frame heat exchangers, tube bundle heat exchangers, heat recovery systems, boilers, reboilers, cooling towers, cooling fins, baffles, microchannel heat exchangers, coils, radiator coils, spiral heat exchangers, fluidized beds, spray towers, bubbling columns, gas sparging, counter current, co-current or cross flow heat exchangers or a combination of these components. In some implementations, steam is used as a heat exchange medium and the incorporation of steam desuperheater equipment can be employed.

In some implementations, the total capacity of the hydrogen production subsystem 103 is sized so as to meet the feedstock requirements of the downstream fuel synthesis subsystem 102 (such as the Fischer-Tropsch or methanol synthesis units). The required hydrogen production capacity depends on both the production capacity of the fuel synthesis subsystem 102, and on the ratio of $H_2$:CO that the process requires. In implementations where water electrolyzers are used for producing all of the hydrogen and the $CO_2$ capture subsystem supplies all of the CO, the quantity of oxygen co-produced by the water electrolyzers is about three times the oxygen demand of the calciner.

In some implementations, all or part of the system's heat requirements are met with oxy-fired combustion, air fired combustion with post $CO_2$ capture, electric heating, or a combination of these methods.

In yet some other implementations, fuel used in the combustion processes may include hydrogen, methane, biomethane, pyrolysis oil, natural gas, syngas, products from a Fischer-Tropsh process, or a combination of these components.

In some of the implementations, water from the clean-up unit can be fed to the water treatment and source unit.

In some of the implementations, the $CO_2$ capture subsystem may incorporate a high temperature hydrator or steam slaker within the slaker unit.

The term "couple" and variants of it such as "coupled", "couples", and "coupling" as used in this description is intended to include indirect and direct connections unless otherwise indicated. For example, if a first device is coupled to a second device, that coupling may be through a direct connection or through an indirect connection via other devices and connections. Similarly, if the first device is communicatively coupled to the second device, communication may be through a direct connection or through an indirect connection via other devices and connections. In particular, a fluid coupling means that a direct or indirect pathway is provided for a fluid to flow between two fluidly coupled devices. Also, a thermal coupling means that a direct or indirect pathway is provided for heat energy to flow between to thermally coupled devices.

A number of implementations of the invention have been described. Nevertheless, it will be understood that various modifications may be made without departing from the spirit and scope of the invention.

Accordingly, other implementations are within the scope of the following claims. Further modifications and alternative implementations of various aspects will be apparent to those skilled in the art in view of this description. Accordingly, this description is to be construed as illustrative only. It is to be understood that the forms shown and described herein are to be taken as examples of implementations. Elements and materials may be substituted for those illustrated and described herein, parts and processes may be reversed, and certain features may be utilized independently, all as would be apparent to one skilled in the art after having the benefit of this description. Changes may be made in the elements described herein without departing from the spirit and scope as described in the following claims.

The invention claimed is:

1. A method for producing a synthetic fuel from hydrogen and carbon dioxide, comprising:
   extracting hydrogen molecules from at least one hydrogen compound in a hydrogen feedstock to produce a hydrogen-containing feed stream;
   extracting carbon dioxide molecules from a dilute gaseous mixture in an atmospheric carbon dioxide feedstock, where extracting the carbon dioxide molecules comprises:
      contacting the dilute gaseous mixture with a carbon dioxide capture solution,
      precipitating at least some captured carbon dioxide into $CaCO_3$ solids, and
      operating a calciner to calcine the $CaCO_3$ solids to produce a calciner product gas stream comprising a carbon dioxide-containing feed stream; and
   processing the hydrogen-containing feed stream and the carbon dioxide-containing feed stream to produce a synthetic fuel, where at least some material used in at least one of the steps of extracting hydrogen molecules, extracting carbon dioxide molecules, or processing the hydrogen and carbon dioxide containing feed streams comprises material produced in another one of the steps of extracting hydrogen molecules, extracting carbon dioxide molecules, or processing the hydrogen and carbon dioxide containing feed streams.

2. The method of claim 1, wherein the hydrogen feedstock comprises water.

3. The method of claim 1, wherein the produced material produced in the another one of the steps of extracting hydrogen molecules, extracting carbon dioxide molecules, or processing the hydrogen and carbon dioxide containing feed streams includes water produced during at least one of the step of extracting carbon dioxide molecules or the step of processing the hydrogen and carbon dioxide containing feed streams, and at least some of the produced water is used for at least some of the hydrogen feedstock.

4. The method of claim 3, further comprising extracting water from the calciner product gas stream to produce at least some of the produced water.

5. The method of claim 4, wherein at least some of the produced water comprises steam.

6. The method of claim 1, wherein the step of processing the hydrogen and carbon dioxide containing feed streams comprises:
   combining and heating the hydrogen and carbon dioxide containing feed streams,
   producing a syngas stream, and
   extracting water from the syngas stream to produce at least some of the produced water.

7. The method of claim 1, further comprising feeding at least a portion of the calciner product gas stream to a solid oxide electrolyzer cell used in the step of extracting hydrogen molecules.

8. The method of claim 1, wherein the step of extracting carbon dioxide molecules further comprises a slaker, the material produced in the another one of the steps of extracting hydrogen molecules, extracting carbon dioxide molecules, or processing the hydrogen and carbon dioxide containing feed streams includes water produced during the step of processing the hydrogen and carbon dioxide containing feed streams and at least some of the water produced is used by the slaker.

9. The method of claim 1, wherein the material produced in the another one of the steps of extracting hydrogen molecules, extracting carbon dioxide molecules, or processing the hydrogen and carbon dioxide containing feed streams includes oxygen molecules produced during the step of extracting hydrogen molecules, and the method further comprises:
   combusting a fuel using at least a portion of the produced oxygen molecules during at least one of the steps of extracting carbon dioxide molecules or processing the hydrogen and carbon dioxide containing feed streams.

10. The method of claim 9, wherein combusting at least a portion of the produced oxygen molecules and the fuel produces heat for producing a calciner product gas stream during the step of extracting carbon dioxide molecules.

11. The method of claim 1, wherein the material produced in the another one of the steps of extracting hydrogen molecules, extracting carbon dioxide molecules, or processing the hydrogen and carbon dioxide containing feed streams includes a fuel produced during the step of processing the hydrogen and carbon dioxide containing feed streams, and the method further comprises:
   combusting at least a portion of the produced fuel during at least one of the steps of extracting carbon dioxide molecules and processing the hydrogen and carbon dioxide containing feed streams.

12. The method of claim 1, wherein at least some energy for performing the steps of extracting hydrogen molecules, extracting carbon dioxide molecules, and processing the hydrogen and carbon dioxide containing feed streams is provided by an electricity source.

13. The method of claim 1, wherein the step of processing the hydrogen and carbon dioxide containing feed streams comprises operating a syngas generation reactor ("SGR") unit at a pressure selected to enable the SGR unit to receive the carbon dioxide containing feed stream from the calciner without being cooled and compressed between the calciner and the SGR unit.

14. The method of claim 13, wherein the SGR unit is operated at a pressure of between 1 and 10 bar, and the received carbon dioxide containing feed stream has a temperature of between 850-900° C.

15. The method of claim 1, wherein the step of processing the hydrogen and carbon dioxide containing feed streams comprises operating a syngas generation reactor ("SGR") unit, and the method further comprises:

feeding the carbon dioxide containing feed stream and one or more reactant feed streams into the SGR unit, the one or more reactant feed streams comprising at least one of a hydrogen reactant feed stream, a $CH_4$ reactant feed stream, a water reactant feed stream, or a Fischer Tropsch light end hydrocarbon reactant feed stream.

16. The method of claim 15, further comprising operating the SGR unit to produce a syngas product stream by at least one of a reverse water gas shift (RWGS) reaction, steam methane reforming (SMR) reaction, or a direct methane reforming (DMR) reaction.

17. The method of claim 16, further comprising treating the syngas product stream to produce one or more recycle streams that provide reactant to the SGR unit.

18. The method of claim 17, further comprising electrically heating at least one or more of the recycle streams and the reactant feed streams.

19. The method of claim 13, further comprising heating the SGR unit with thermal energy produced by electricity.

20. The method of claim 13, further comprising heating a $CaCO_3$ material stream used in extracting carbon dioxide molecules with thermal energy from a syngas product stream from the SGR unit.

21. The method of claim 20, further comprising directly contacting the $CaCO_3$ material stream with the syngas product stream and operating the SGR in a reverse water gas shift (RWGS) mode, with at least one of a steam methane reforming (SMR) mode or a dry methane reforming (DMR) mode.

22. The method of claim 13, further comprising heating the calciner with thermal energy produced by electricity.

23. The method of claim 1, wherein the step of calcining $CaCO_3$ material comprises:

operating a fluidized bed reactor vessel of the calciner, and discharging a hot CaO solids stream from the calciner.

24. The method of claim 23, further comprising preheating the $CaCO_3$ material prior to entry into the calciner with thermal energy from a calciner product gas stream.

25. The method of claim 24, further comprising:

extracting water from the calciner product gas stream, boiling the extracted water to produce steam, and fluidizing the fluidized bed reactor vessel with the steam.

26. The method of claim 1, wherein the step of processing the hydrogen and carbon dioxide containing feed streams comprises operating a syngas generation reactor ("SGR") unit, and the method further comprising preheating at least one SGR reactant feed stream before feeding to the SGR unit, with thermal energy from a syngas product stream discharged from the SGR unit; and the SGR reactant feed stream comprises at least one of a carbon dioxide reactant feed stream, a hydrogen reactant feed stream, a $CH_4$ reactant feed stream, a water reactant feed stream, or a Fischer Tropsch light end hydrocarbon reactant feed stream, wherein the carbon dioxide reactant feed stream includes at least some of the carbon dioxide containing feed stream, and the hydrogen reactant feed stream comprises at least some of the hydrogen containing feed stream.

* * * * *